Dec. 1, 1970 L. L. RAKOCZI ET AL 3,544,969
LANGUAGE INDEPENDENT COMPUTER
Filed Nov. 27, 1967
30 Sheets-Sheet 1

MAIN ENGINE ZONE CONTROL CODES

LASZLO L. RAKOCZI
DAVID E. KEEFER
INVENTORS.
GARY J. GOSS
ERNEST J. PORCELLI
BY
Lyon & Lyon
ATTORNEYS

LASZLO L. RAKOCZI
DAVID E. KEEFER
INVENTORS.
GARY J. GOSS
BY ERNEST J. PORCELLI

Lyon & Lyon
ATTORNEYS

INVENTORS.
LASZLO L. RAKOCZI
DAVID E. KEEFER
BY GARY J. GOSS
ERNEST J. PORCELLI

Lyon & Lyon
ATTORNEYS

LASZLO L. RAKOCZI
DAVID E. KEEFER
GARY J. GOSS
ERNEST J. PORCELLI
INVENTORS.
BY Lyon & Lyon
ATTORNEYS LASZLO L. RAKOCZI
DAVID E. KEEFER
GARY J. GOSS
ERNEST J. PORCELLI
INVENTORS.
BY
Lyon & Lyon
ATTORNEYS LASZLO L. RAKOCZI
DAVID E. KEEFER
GARY J. GOSS
ERNEST J. PORCELLI
INVENTORS.
BY Lyon & Lyon
ATTORNEYS LASZLO L. RAKOCZI
DAVID E. KEEFER
GARY J. GOSS
ERNEST J. PORCELLI
INVENTORS.
BY Lyon & Lyon
ATTORNEYS LASZLO L. RAKOCZI
DAVID E. KEEFER
INVENTORS.
GARY J. GOSS
ERNEST J. PORCELLI
BY
Lyon & Lyon
ATTORNEYS INVENTORS.
LASZLO L. RAKOCZI
DAVID E. KEEFER
BY GARY J. GOSS
ERNEST J. PORCELLI
Lyon & Lyon
ATTORNEYS Dec. 1, 1970 L. L. RAKOCZI ET AL 3,544,969

LANGUAGE INDEPENDENT COMPUTER

Filed Nov. 27, 1967 30 Sheets-Sheet 10

INVENTORS.
LASZLO L. RAKOCZI
DAVID E. KEEFER
BY GARY J. GOSS
ERNEST J. PORCELLI
Lyon & Lyon
ATTORNEYS

LANGUAGE INDEPENDENT COMPUTER

Filed Nov. 27, 1967

LASZLO L. RAKOCZI
DAVID E. KEEFER
GARY J. GOSS
ERNEST J. PORCELLI
INVENTORS.

BY Lyon & Lyon
ATTORNEYS

INVENTORS.
LASZLO L. RAKOCZI
DAVID E. KEEFER
GARY J. GOSS
ERNEST J. PORCELLI
BY Lyon & Lyon
ATTORNEYS INVENTORS
LASZLO L. RAKOCZI
DAVID E. KEEFER
BY GARY J. GOSS
ERNEST J. PORCELLI
Lyon & Lyon
ATTORNEYS LASZLO L. RAKOCZI
DAVID E. KEEFER
GARY J. GOSS
ERNEST J. PORCELLI
INVENTORS.
BY Lyon & Lyon
ATTORNEYS INVENTORS.
LASZLO L. RAKOCZI
DAVID E. KEEFER
BY GARY J. GOSS
ERNEST J. PORCELLI
Lyon & Lyon
ATTORNEYS INVENTORS.
LASZLO L. RAKOCZI
DAVID E. KEEFER
BY GARY J. GOSS
ERNEST J. PORCELLI
Lyon & Lyon
ATTORNEYS

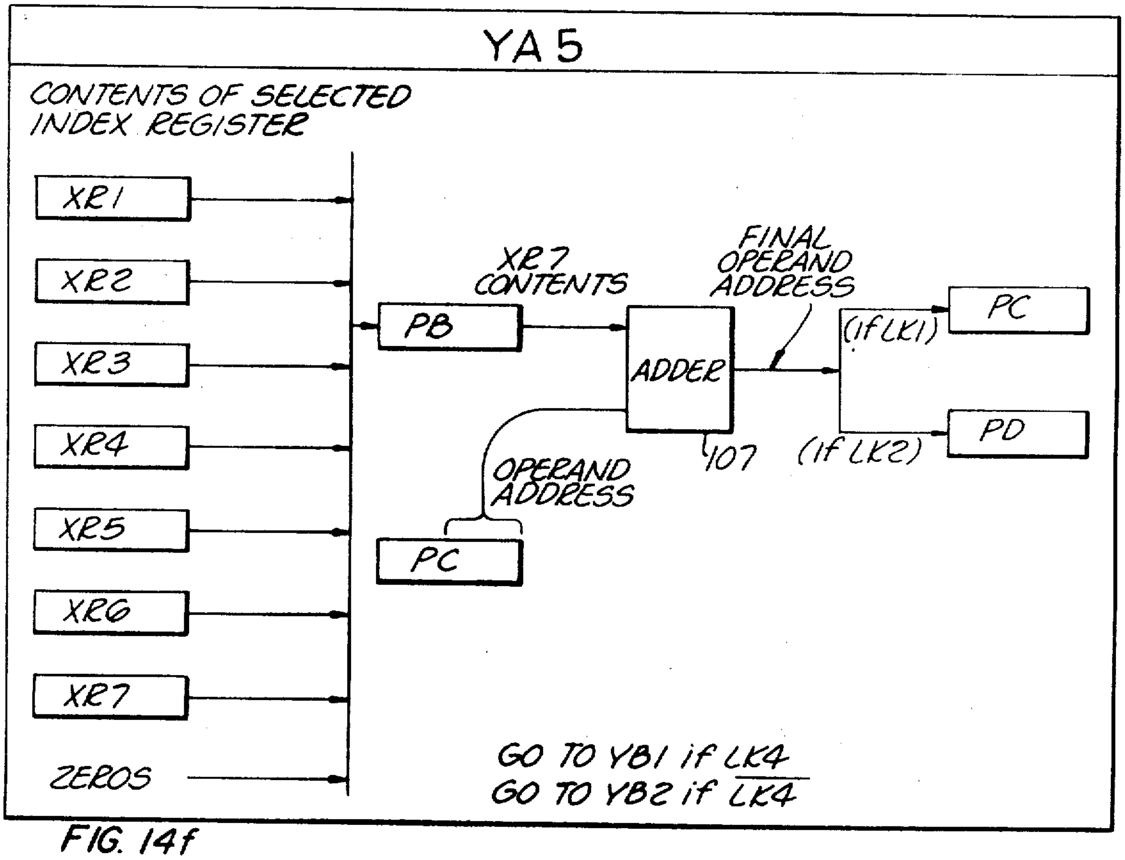
FIG. 14f
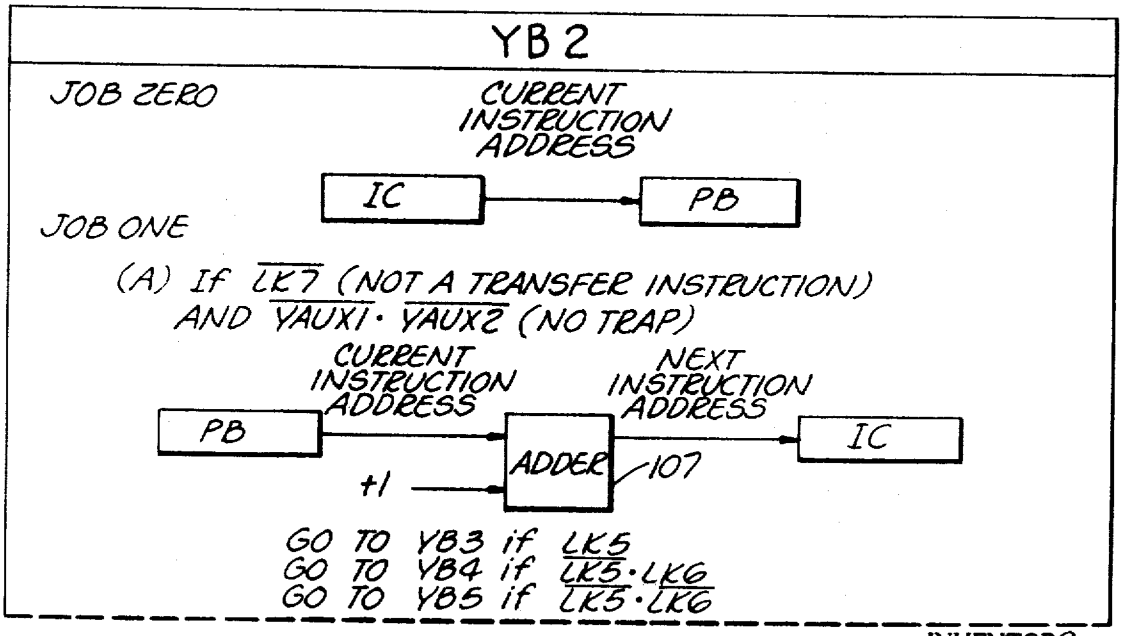
FIG. 15b1
INVENTORS.
LASZLO L. RAKOCZI
DAVID E. KEEFER
GARY J. GOSS
ERNEST J. PORCELLI
BY Lyon & Lyon
ATTORNEYS INVENTORS.
LASZLO L. RAKOCZI
DAVID E. KEEFER
BY GARY J. GOSS
ERNEST J. PORCELLI
Lyon & Lyon
ATTORNEYS LASZLO L. RAKOCZI
DAVID E. KEEFER
INVENTORS.
GARY J. GOSS
ERNEST J. PORCELLI
BY
Lyon & Lyon
ATTORNEYS Dec. 1, 1970 L. L. RAKOCZI ET AL 3,544,969
LANGUAGE INDEPENDENT COMPUTER
Filed Nov. 27, 1967 30 Sheets-Sheet 20
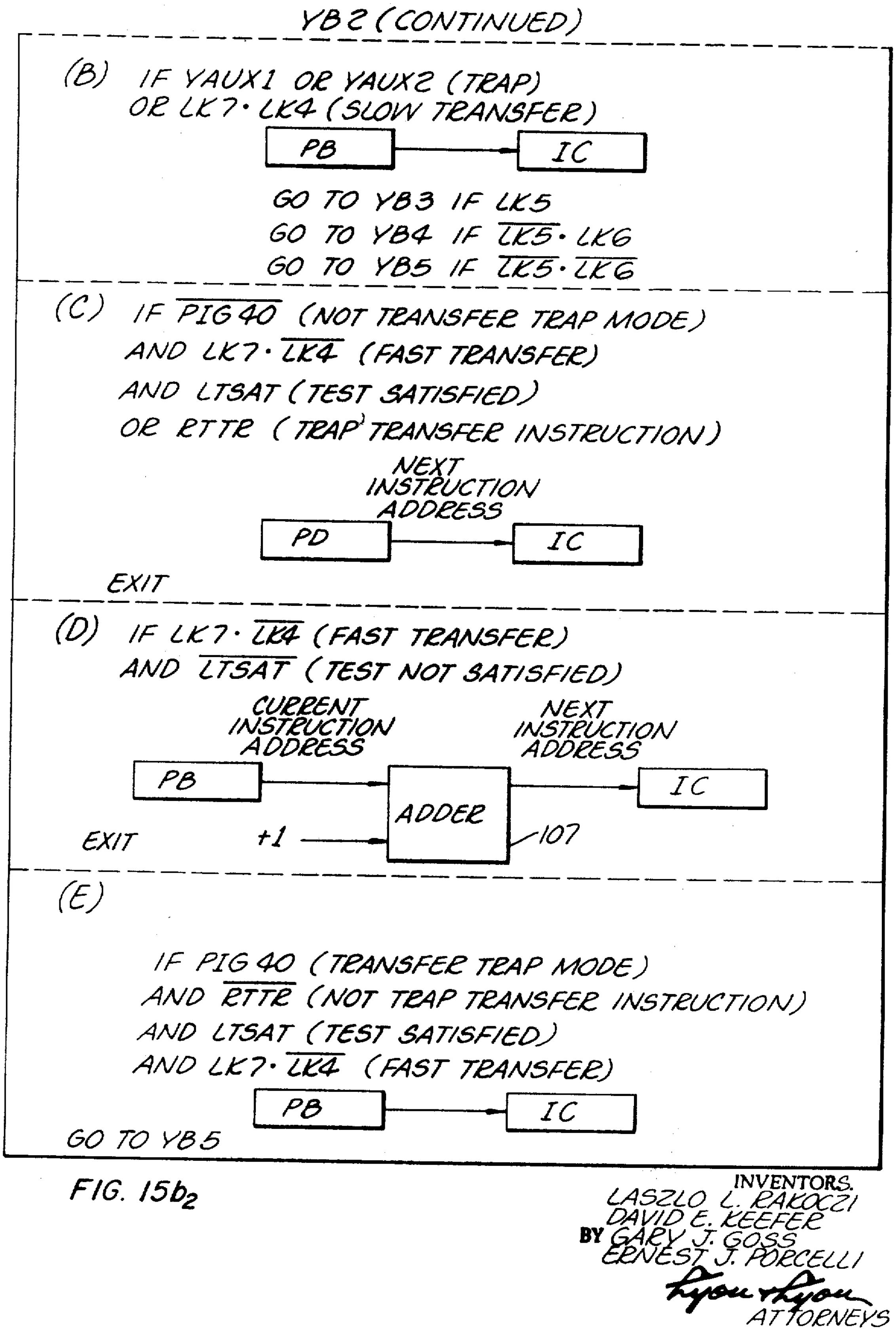
FIG. 15b2
INVENTORS.
LASZLO L. RAKOCZI
DAVID E. KEEFER
BY GARY J. GOSS
ERNEST J. PORCELLI
Lyon & Lyon
ATTORNEYS

LASZLO L. RAKOCZI
DAVID E. KEEFER
GARY J. GOSS
ERNEST J. PORCELLI
INVENTORS.

BY Lyon & Lyon
ATTORNEYS

TRANSLATOR B

LASZLO L. RAKOCZI
DAVID E. KEEFER
GARY J. GOSS
ERNEST J. PORCELLI
INVENTORS.

BY Lyon & Lyon
ATTORNEYS

LASZLO L. RAKOCZI
DAVID E. KEEFER
INVENTORS.
GARY J. GOSS
ERNEST J. PORCELLI
BY
Lyon & Lyon
ATTORNEYS

LANGUAGE INDEPENDENT COMPUTER

LASZLO L. RAKOCZI
DAVID E. KEEFER
INVENTORS.
GARY J. GOSS.
ERNEST J. PORCELLI
BY
Lyon & Lyon
ATTORNEYS INVENTORS.
LASZLO L. RAKOCZI
DAVID E. KEEFER
BY GARY J. GOSS
ERNEST J. PORCELLI
Lyon & Lyon
ATTORNEYS LASZLO L. RAKOCZI
DAVID E. KEEFER
GARY J. GOSS
ERNEST J. PORCELLI
INVENTORS.
BY Lyon & Lyon
ATTORNEYS LASZLO L. RAKOCZI
DAVID E. KEEFER
INVENTORS.
GARY J. GOSS
ERNEST J. PORCELLI
BY
Lyon & Lyon
ATTORNEYS INVENTORS
LASZLO L. RAKOCZI
DAVID E. KEEFER
BY GARY J. GOSS
ERNEST J. PORCELLI
Lyon & Lyon
ATTORNEYS LASZLO L. RAKOCZI
DAVID E. KEEFER
GARY J. GOSS
ERNEST J. PORCELLI
INVENTORS.
BY
Lyon & Lyon
ATTORNEYS INVENTORS.
LASZLO L. RAKOCZI
DAVID E. KEEFER
GARY J. GOSS
ERNEST J. PORCELLI
BY Lyon & Lyon
ATTORNEYS

United States Patent Office 3,544,969
Patented Dec. 1, 1970

3,544,969
LANGUAGE INDEPENDENT COMPUTER

Laszlo L. Rakoczi, Irvine, and David E. Keefer, Gary J. Goss, and Ernest J. Porcelli, Mission Viejo, Calif., assignors to Standard Computer Corporation, Santa Ana, Calif., a corporation of Arizona Filed Nov. 27, 1967, Ser. No. 685,857
Int. Cl. G06f *15/16, 9/00*
U.S. Cl. 340—172.5 21 Claims

ABSTRACT OF THE DISCLOSURE

A digital computer which may be viewed as a computer within a computer and which can interpret a variety of machine languages permitting direct execution of program libraries compiled for other computers without modifications or reprogramming. The inner computer has its own memory and registers and acts as an interpreter. The inner computer is programmed to interpret the language of another computer and to set up the necessary logic for processing data, while the outer computer essentially acts as though it were the computer it is intended to emulate. Generalized console apparatus and circuitry enables duplication of operating conditions.

The present invention relates generally to digital data processors and more particularly to digital data processors that emulate new or prior art computer systems or the like.

As is well-known to those skilled in the art, a program consisting of a series of computational procedures are written in order to permit the computerized solution of a problem. This program is eventually translated (either by a programmer or the computer itself) into a sequence of steps called machine-language instructions before being executed by the computer. The machine language of a particular computer is the collection of all permissible machine instructions it can understand and execute. The number, meaning, and format of these machine-language instructions varies greatly from one make or model computer to the next. For example, one computer system may have a machine language expressed in terms of 48 binary digits (bits); whereas another may be expressed as a variable number of 8-bit characters. Furthermore, one computer model may require only one instruction to direct it to take two numbers from memory, add them together, and put the results back into memory. On the other hand, it might require three sequential instructions to perform the same computation on a different computer. It has been estimated that more than a hundred different programming languages are used with the thousands of computers in the United States.

One of the most important qualities of a particular machine language is its ability to control communications between the various functional stations or subsystems (memory, register, arithmetic units, input/output devices, etc.) of the computer system. Generally speaking, in present day computer systems the relationships among the functional stations is frozen completely, or to a large extent, by the design and wiring of the system. Since the machine language format of a particular computer is generally predicated upon the logic and wiring of the system, such fixed relationships mean that a particular computer can execute only one machine language in an economical manner, and thus is unable to utilize the full potential of each functional station.

As new and improved computing hardware is developed, it is almost imperative to use a new and improved format for the machine-language instructions in order to take advantage of the improved features of the new generation equipment. Thus, the newer generation computing equipment will not understand and will not be able to directly execute programs written for the older generation computers. The user of older generation computers often finds it desirable to trade the older equipment for a newer model to benefit from the improved speed and computing techniques built into the newer equipment. In doing so, however, he often finds it costly and time consuming to rewrite his proven and useful programs so that they can be used with the newer generation computer. As related problem is faced by users of large scale computer installations who have a number of computer systems. These computer systems frequently have different machine-language repertoires which are not compatible with each other. That is, a program written for one computer system of the user will not perform on another computer system of the same user.

Accordingly, it is a principal object of this invention to provide a machine-language independent data processor for emulating other data processors and which can employ the program libraries thereof without modifications or reprogramming.

Another object of the present invention is to provide a data processor having the capability to duplicate the instruction repertoire of other computers.

An additional object of this invention is to provide a data processor capable of assuming the identity of another data processor in a flexible manner but which is lower in cost.

A further object of this invention is to provide a data processor for emulating other data processors and which can run programs directly from the programming media used by the processor it emulates.

Another object of this invention is to provide a data processor having what may be termed an outer computer and an inner computer for emulating a number of different computer systems.

A still further object of this invention is to provide a console system for a data processor which emulates the operational environment of other computers.

Another object of this invention is to provide a programable man-machine interface enabling an improved operating environment and which facilitates relatively simple on-line program debugging, analysis and diagnostics.

An additional object of this invention is to provide a data processor in which the machine-language repertoires of a number of computers may be stored as desired at various times to allow the execution of programs written for several different and incompatible computer systems.

Another object of this invention is to provide a data processor having the capability to include new and improved machine instructions which may be used in addition to, or in place of, regular machine instructions without requiring hardware changes in the data processor.

Another object of this invention is to provide a data processor system having the capability to be optimized for various types of problems.

A further object of this invention is to provide an upward and downward compatible series of data processors capable of variable performance by tailoring system configurations to particular data throughput requirements.

A still further object of this invention is to provide a data processor capable of executing higher level language statements without the same first being translated into a machine language.

An additional object of this invention is to provide a method of emulating computers.

These and other objects and advantages of the present invention will become more apparent upon reference to the following description and the accompanying drawings in which.

Figure 1:
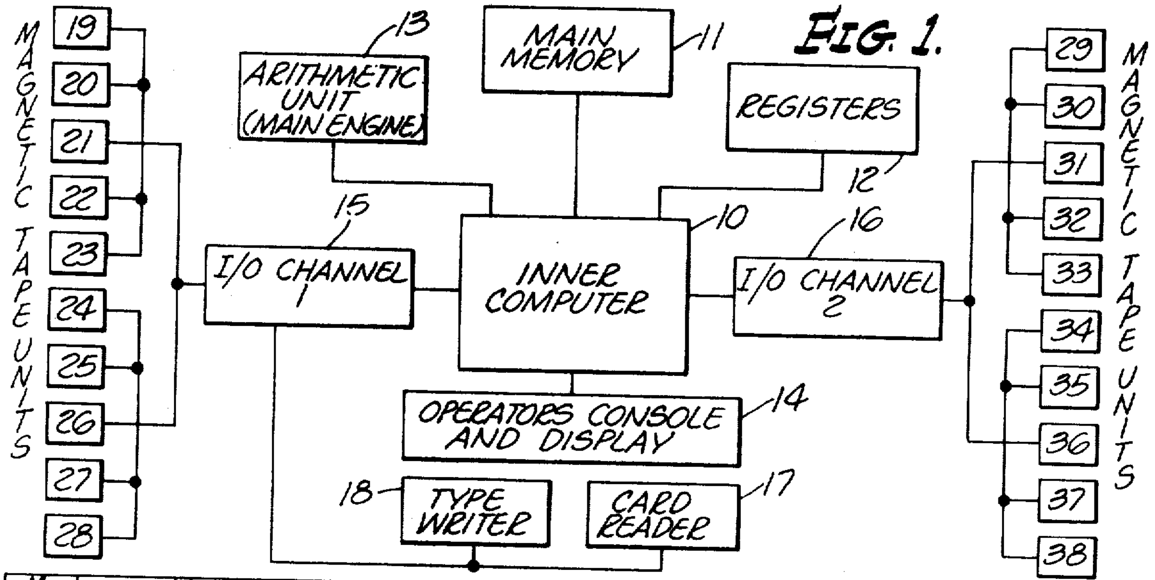
FIG. 1 illustrates in general block diagram form a computing system according to the present invention.
Figure 4:
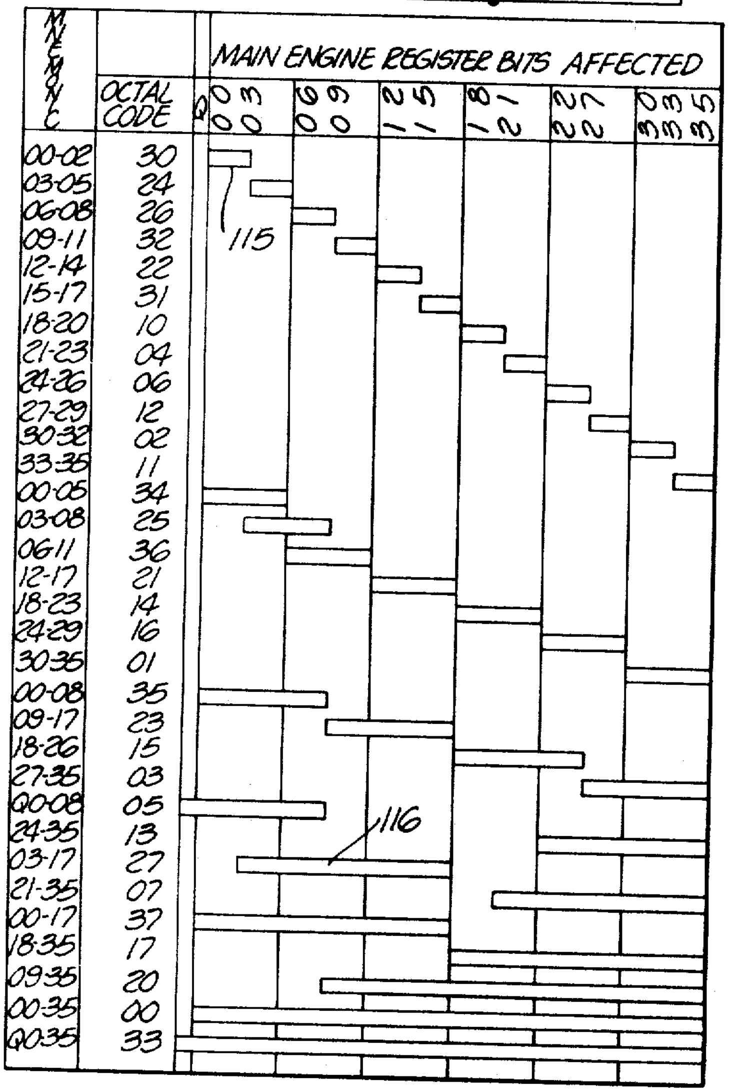
Figure 2:
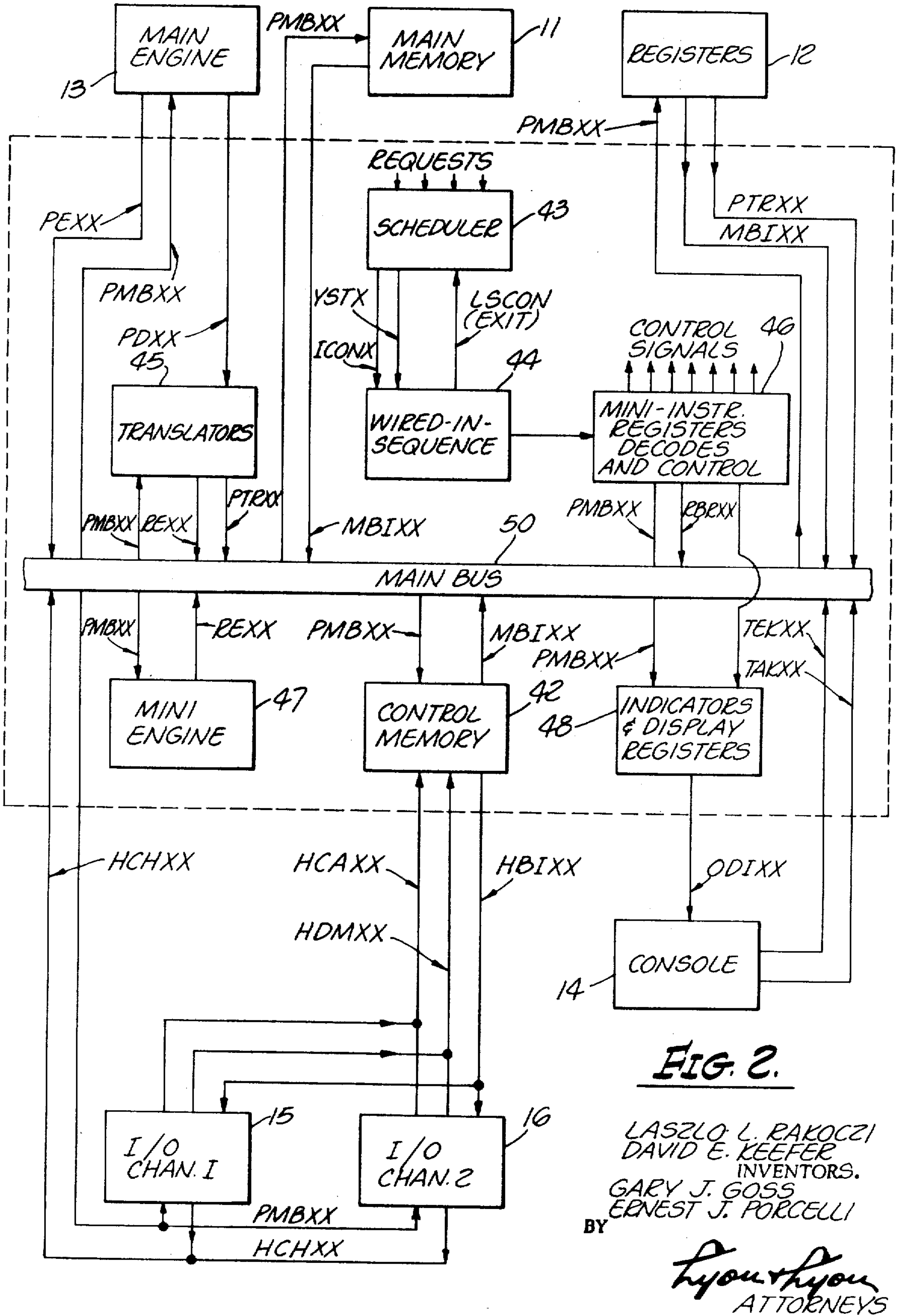
FIG. 2 shows the system of FIG. 1 but illustrates the components of the inner computer in block diagram form.
Figures 5A, 5C:
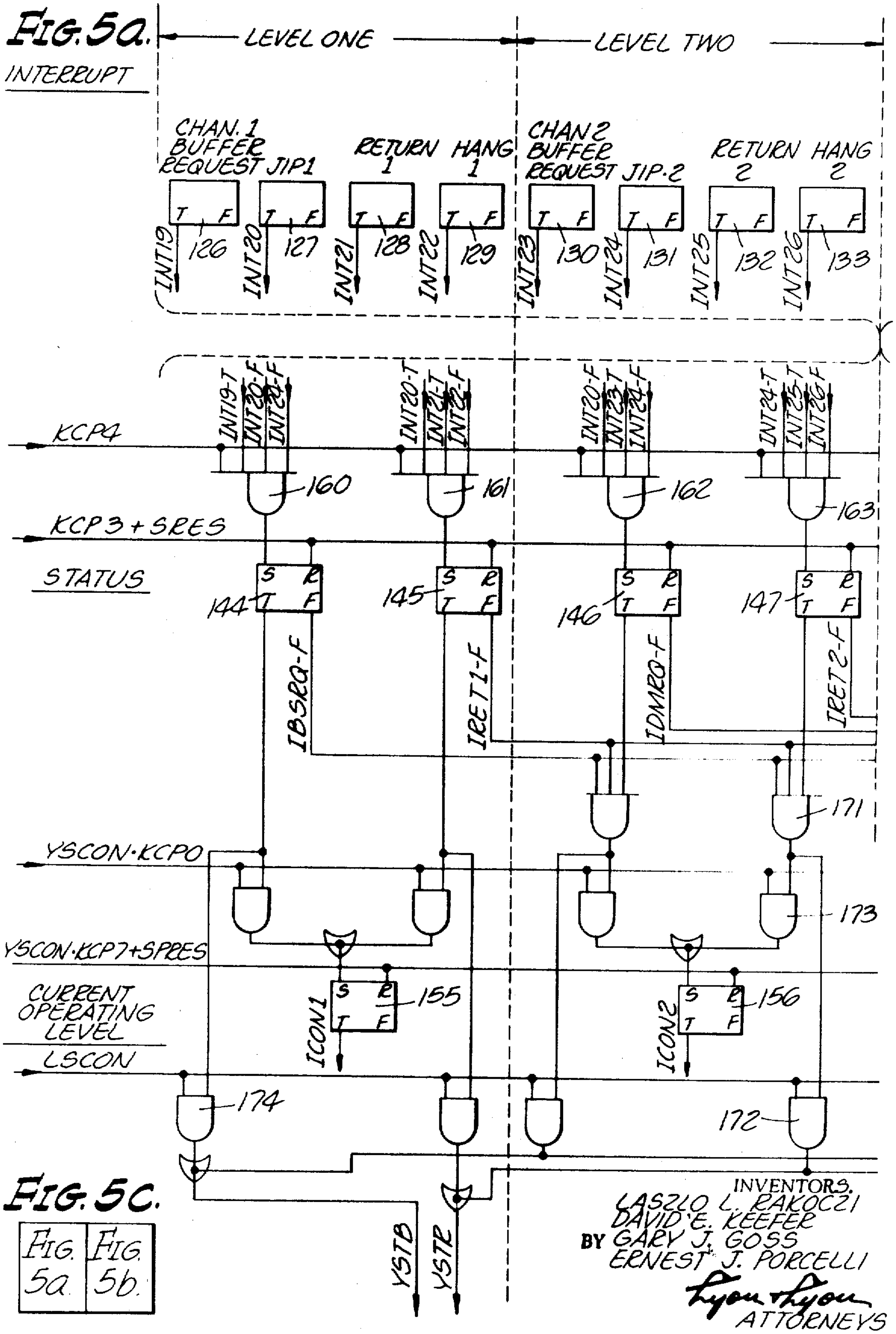
Figure 5B:
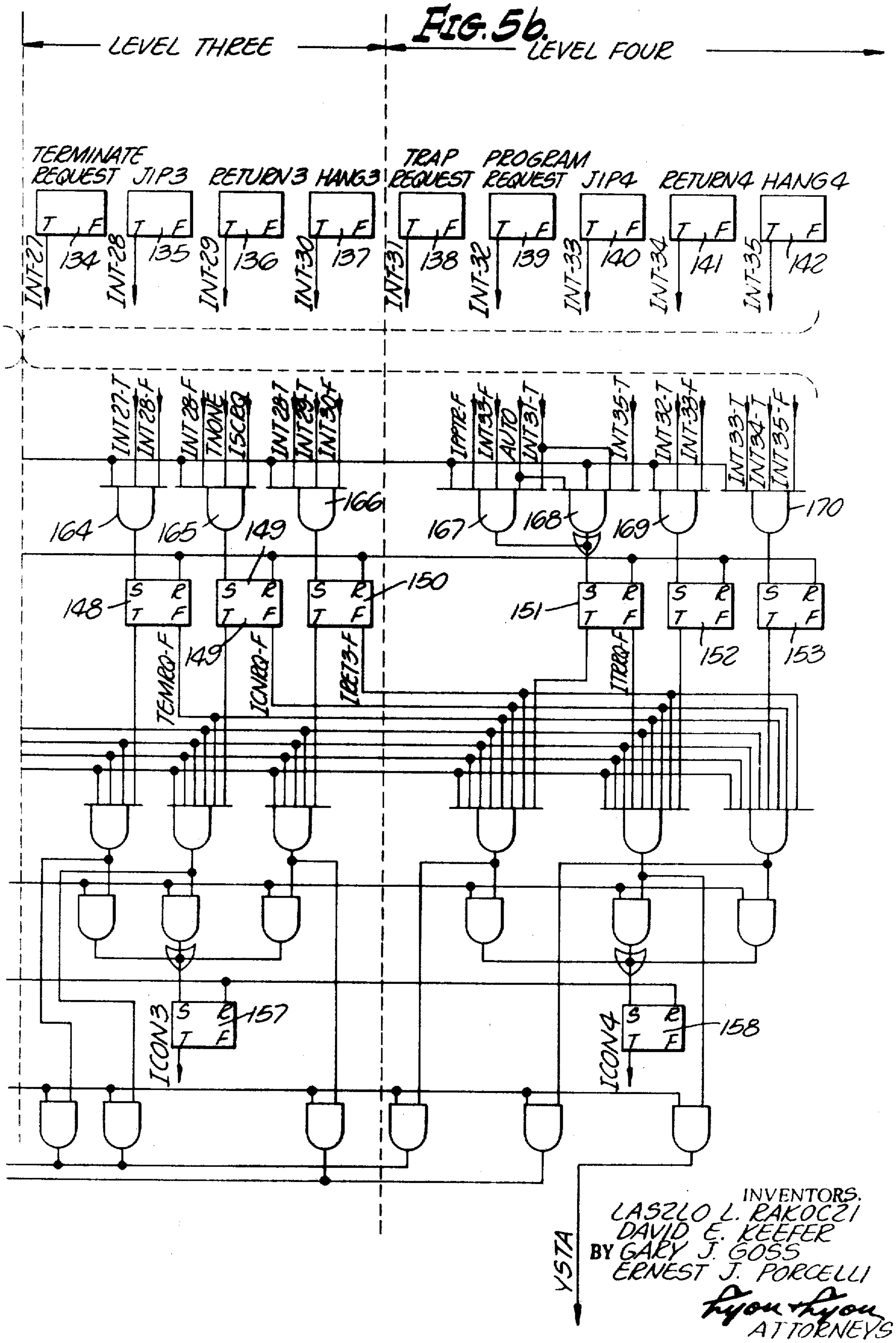
Figure 12:
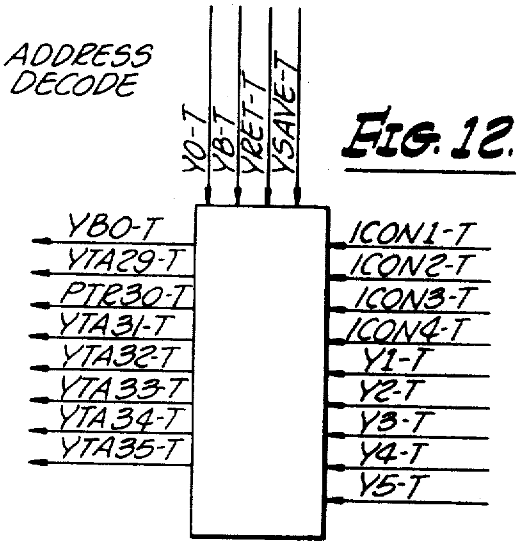
Figure 6:
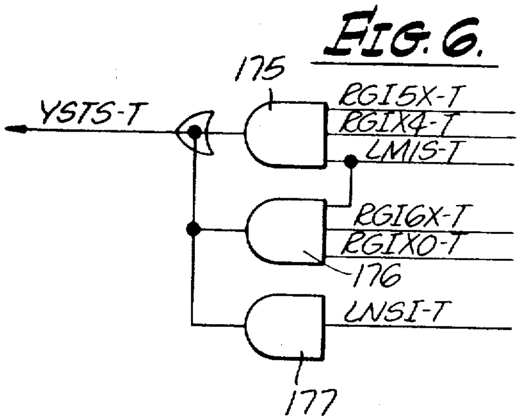
Figure 11:
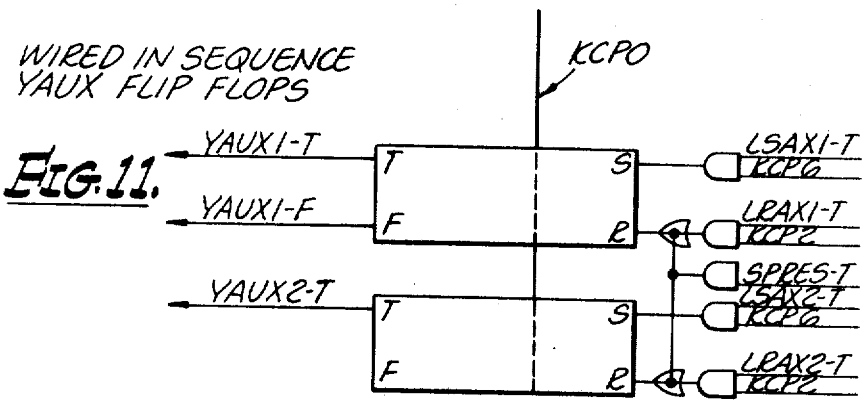
Figure 21:
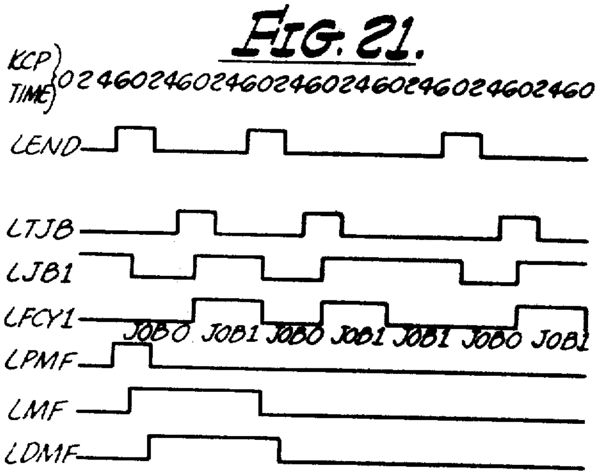
Figure 7:
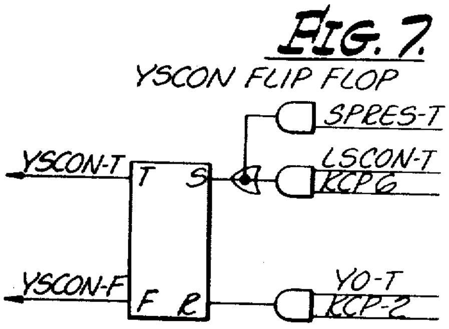
Figures 8A, 8B:
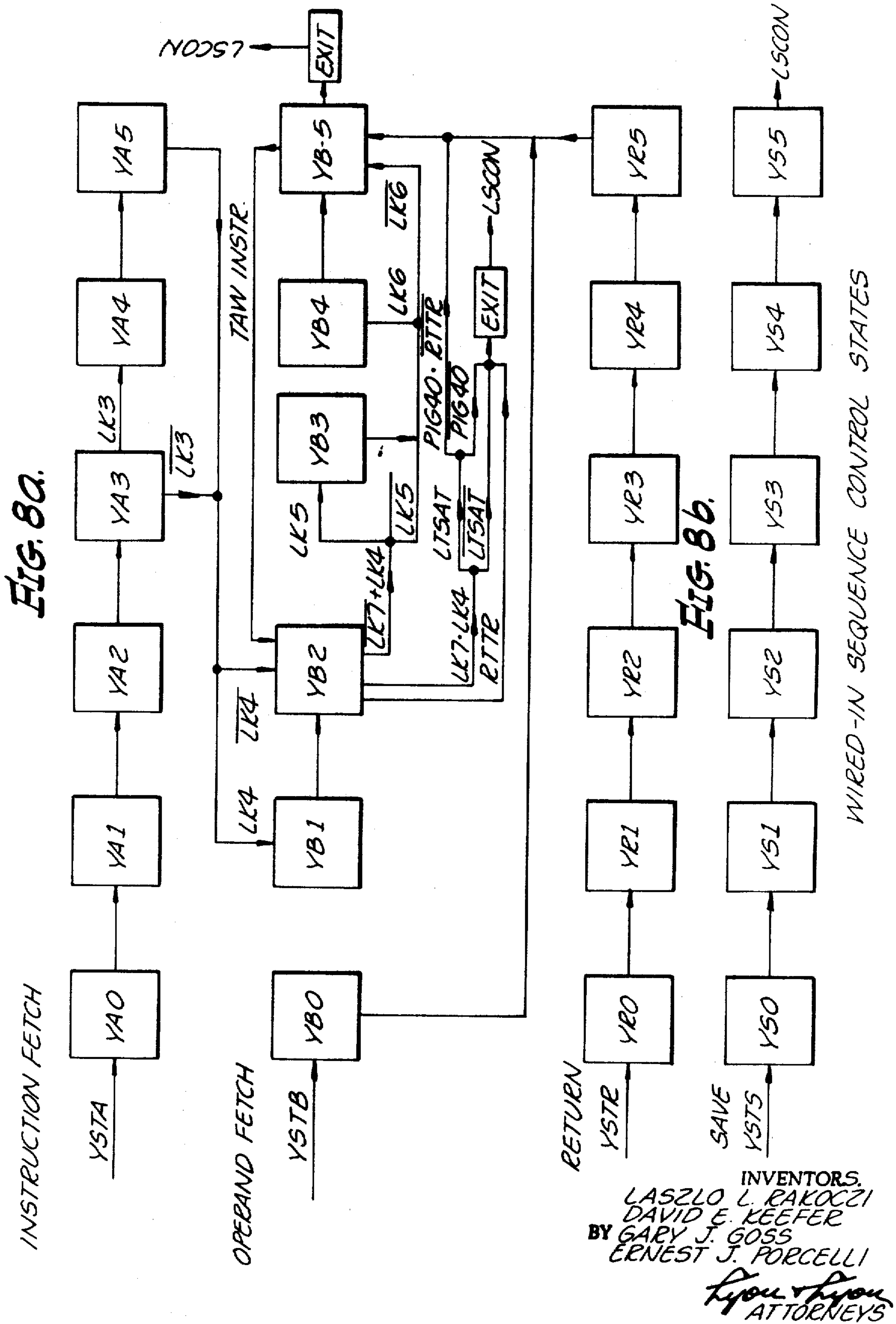
Figure 9:
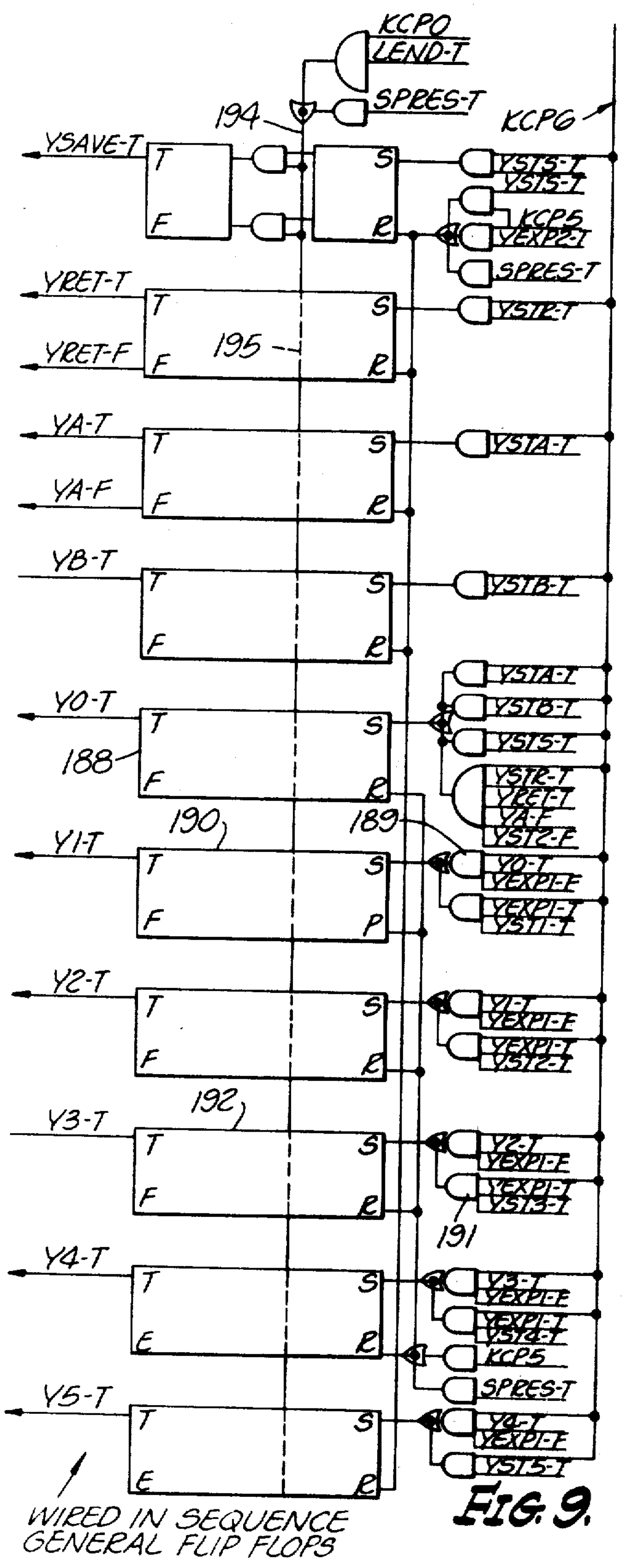
Figure 10:
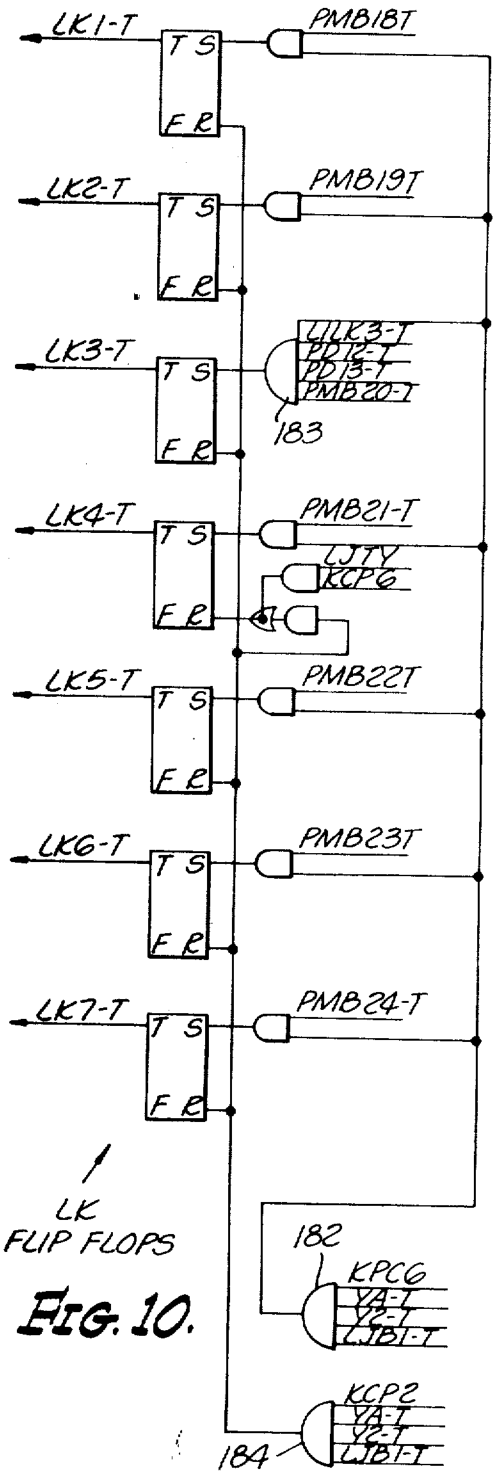
Figure 13:
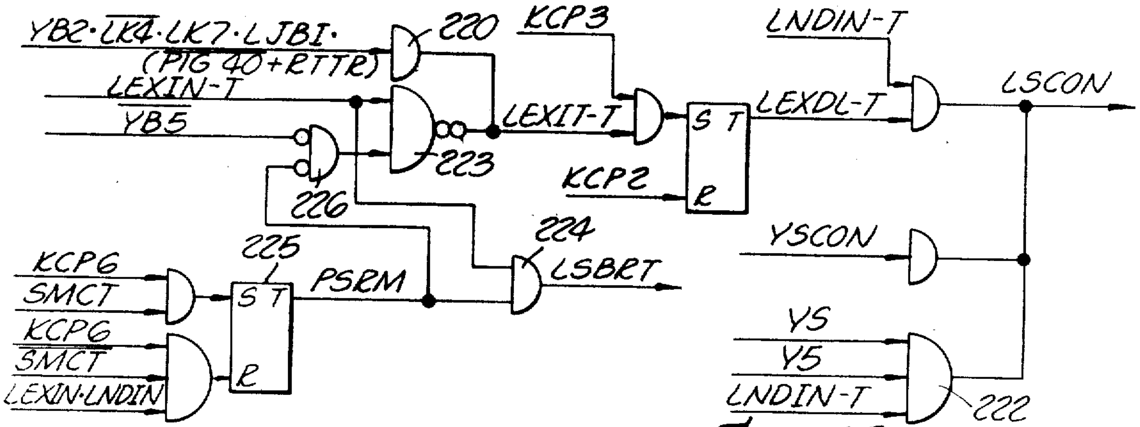
Figures 16A, 16B:
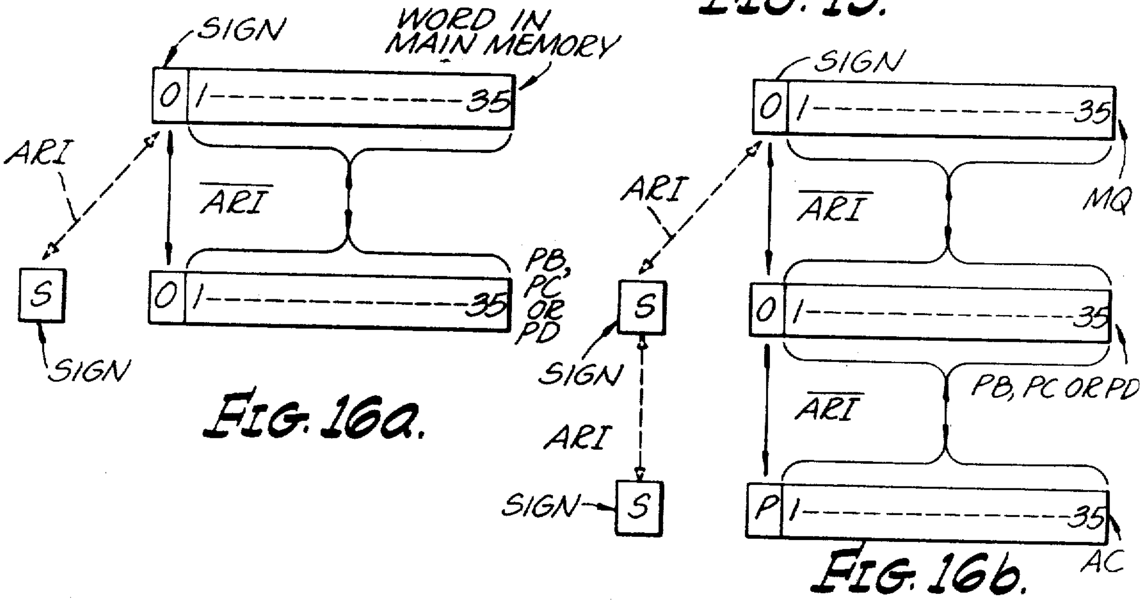
Figure 16C:
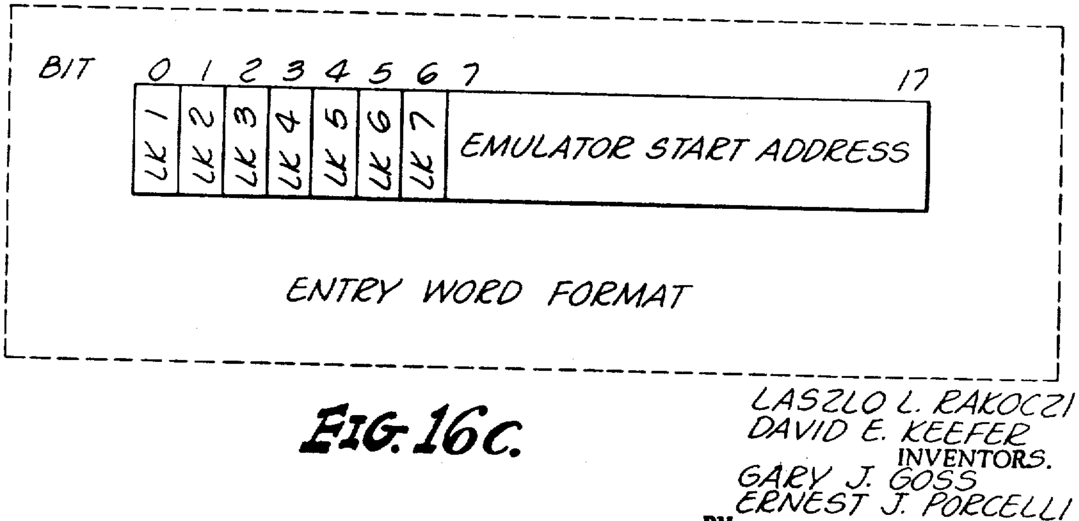
Figure 17:
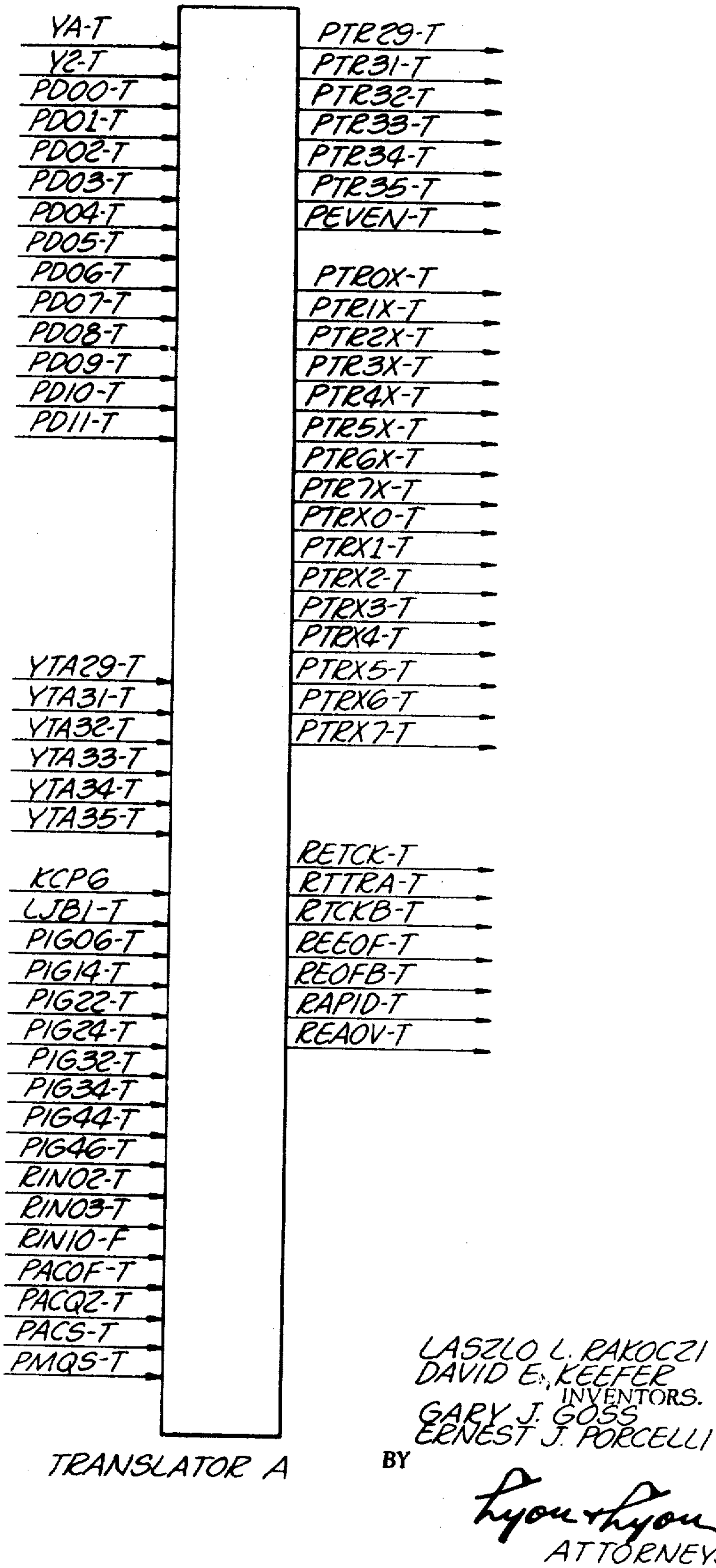
Figure 18:
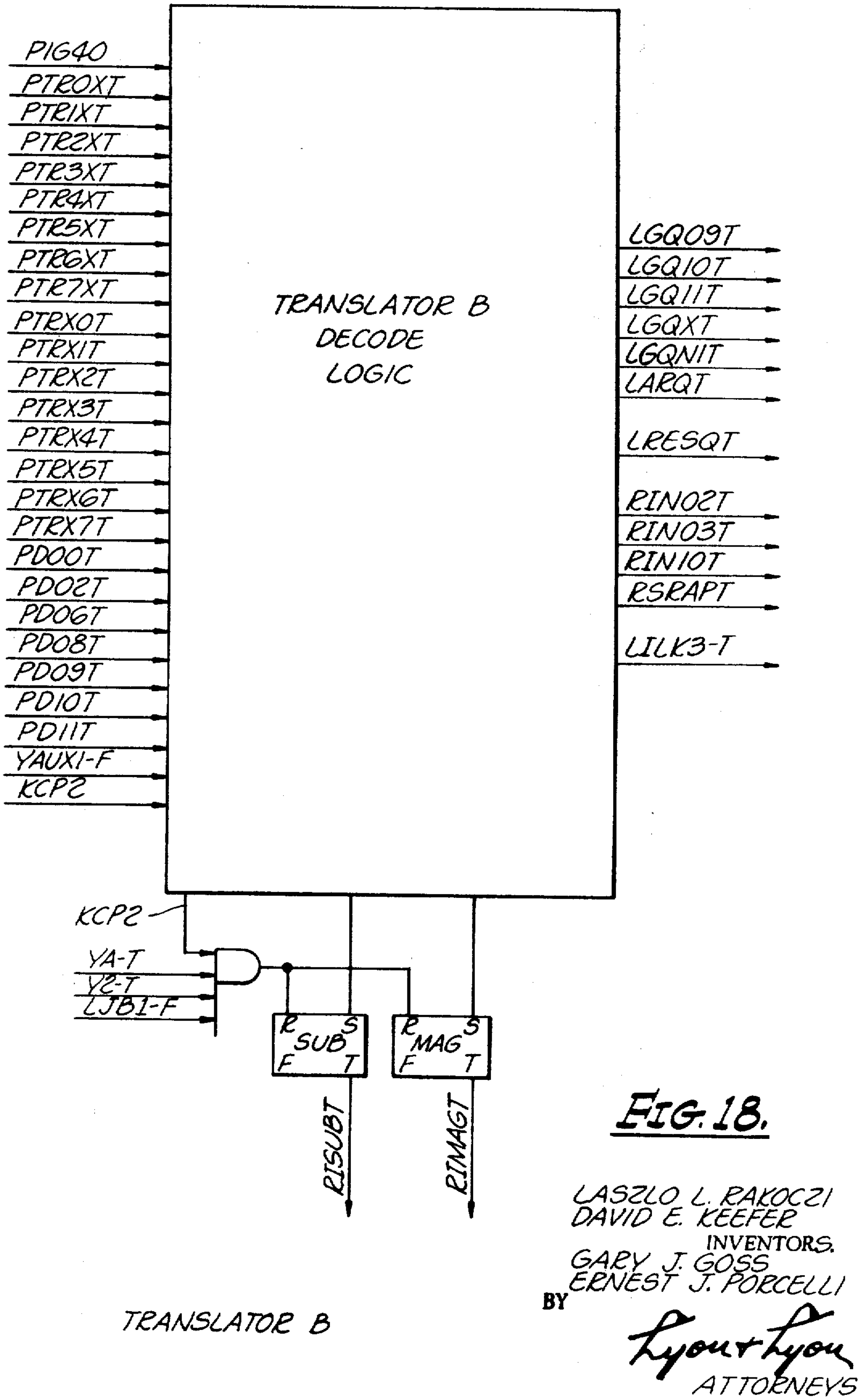
Figure 19A:
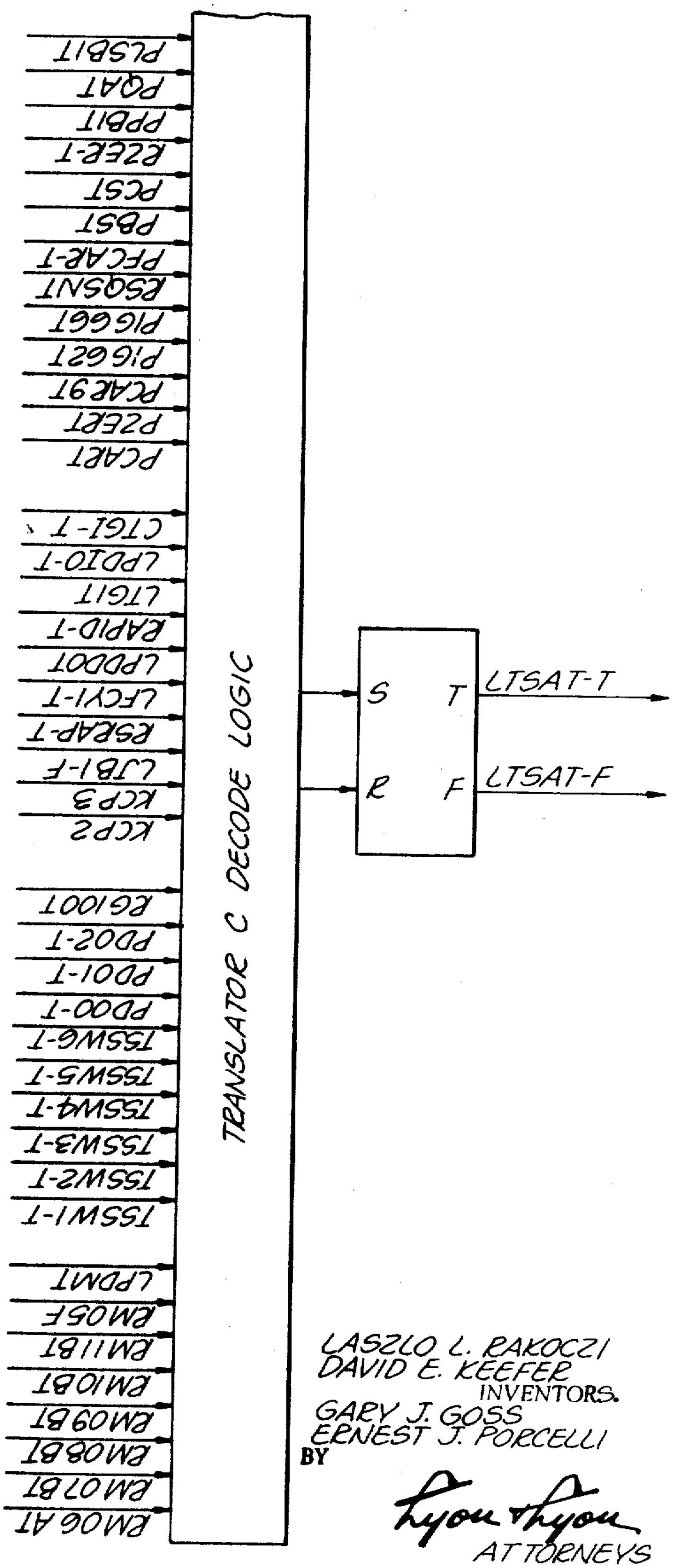
Figure 19C:
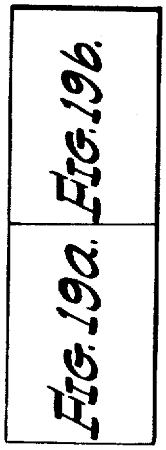
Figure 19B:
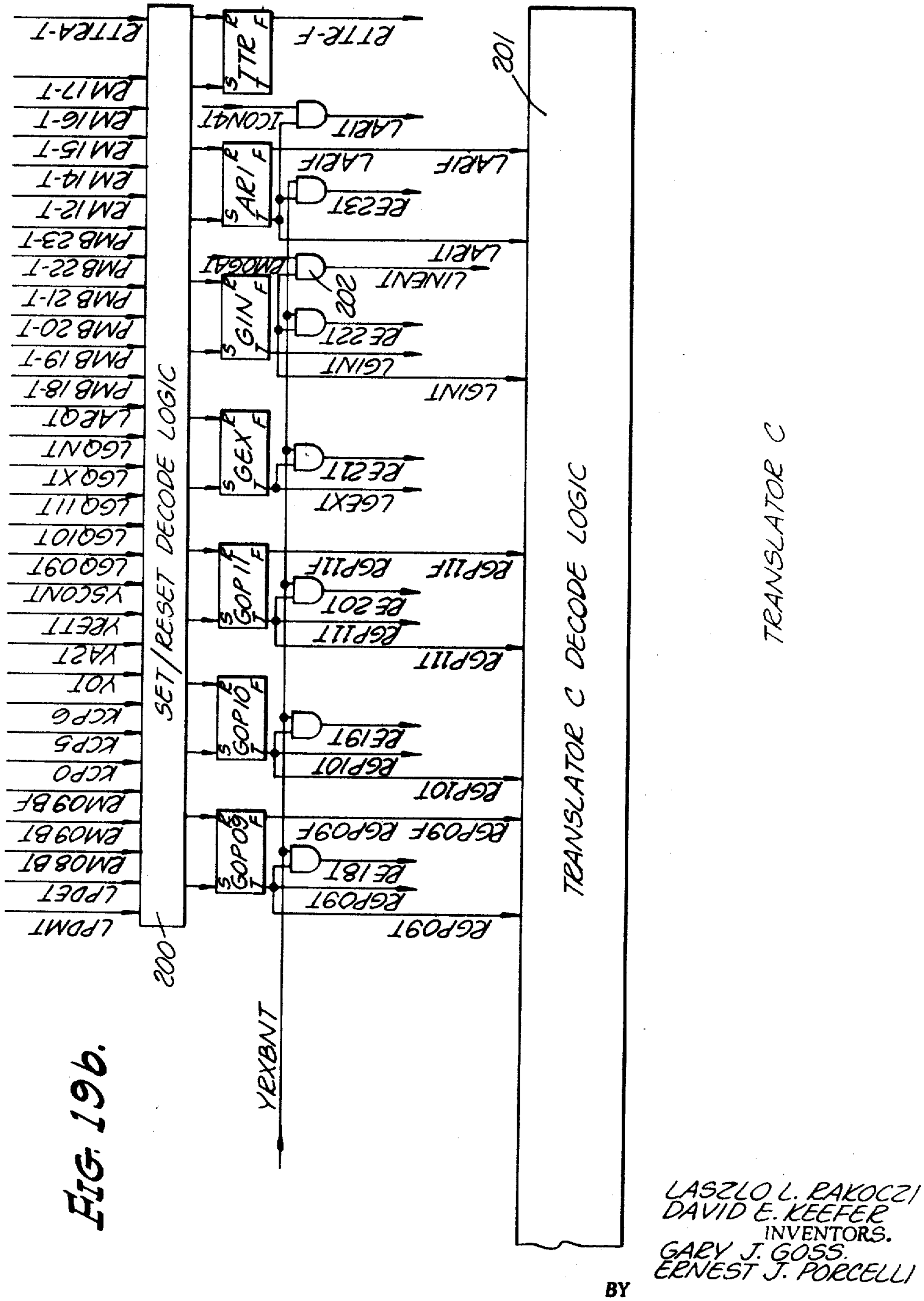
Figure 22:
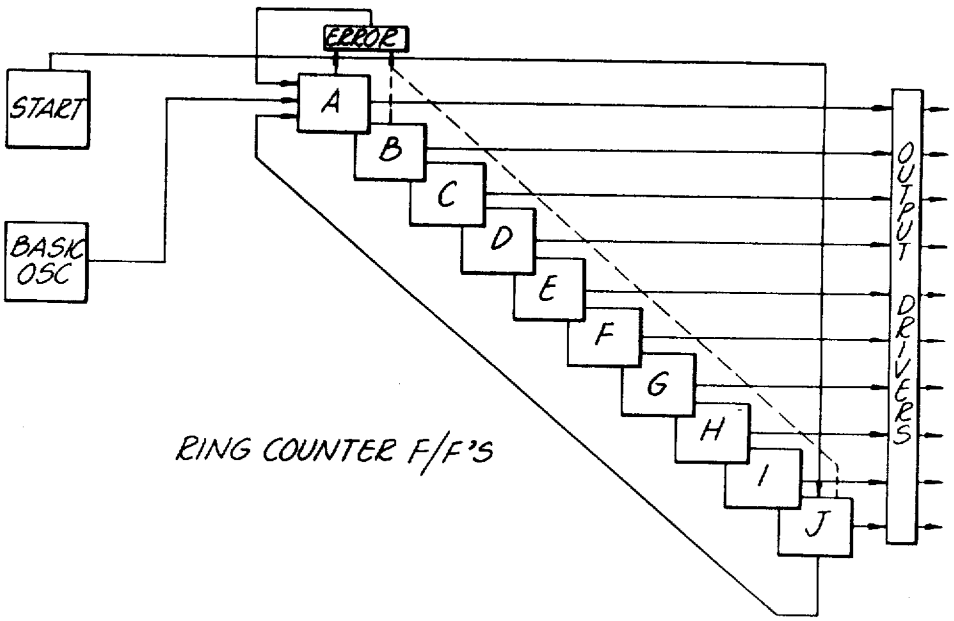
Figure 23:
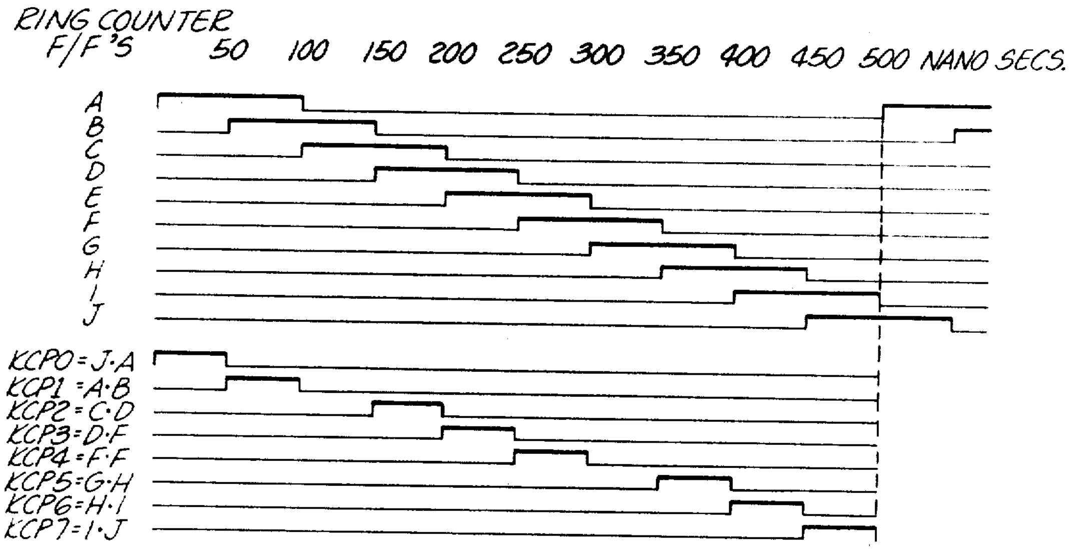
Figure 24:
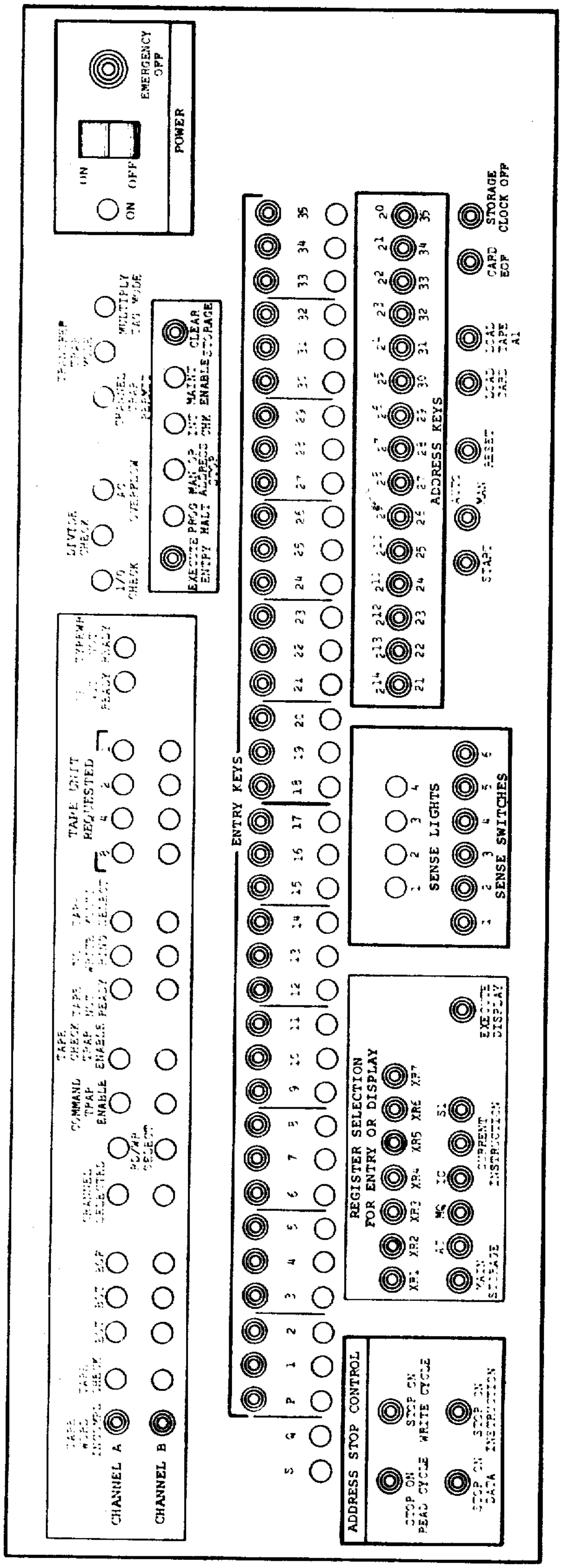
Figure 25:
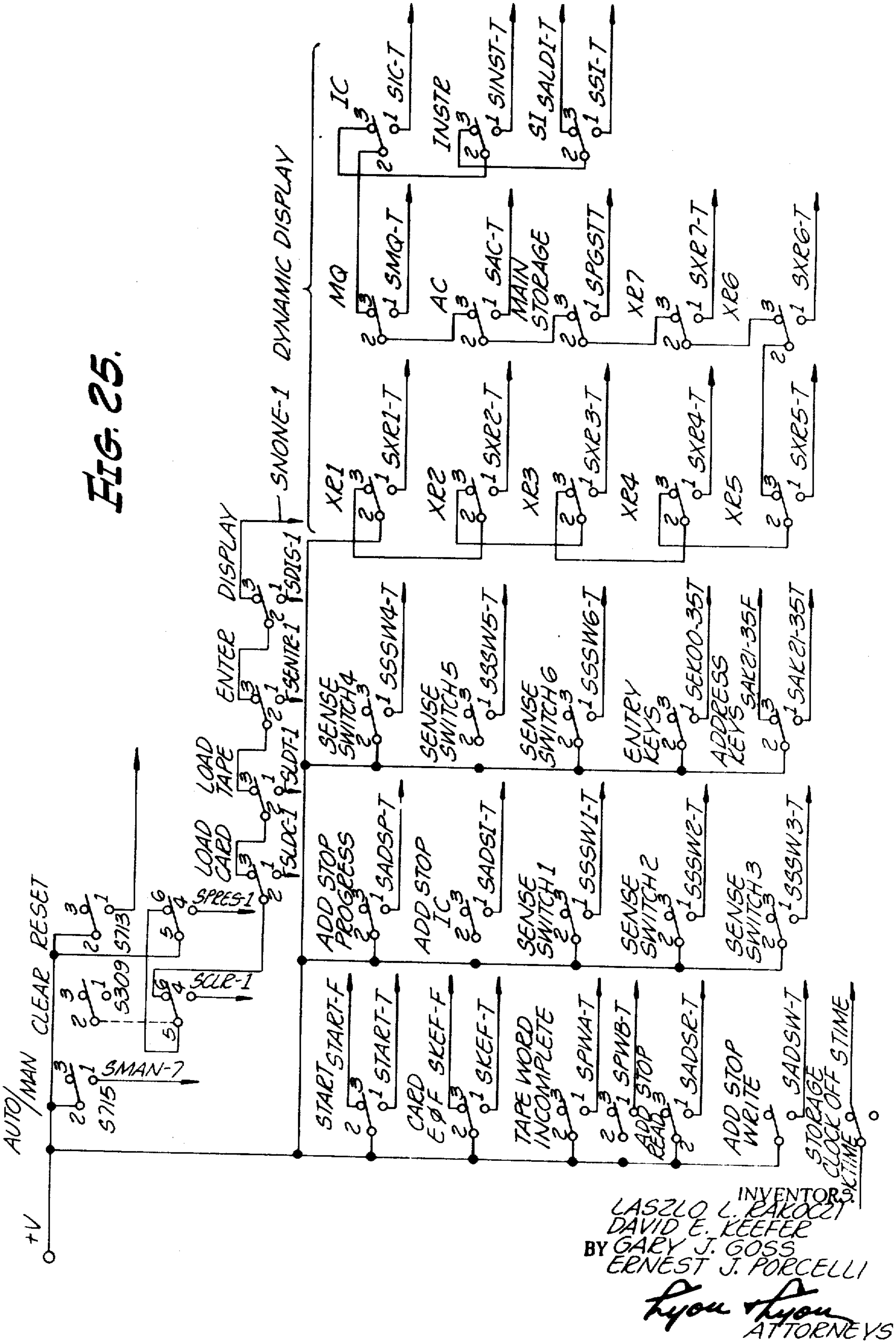

FIGS. 3*a*–3*g* are more detailed block diagrams of the computing system shown in FIGS. 1 and 2;

FIG. 4 is a diagram of main engine zone control codes;

FIGS. 5*a*–5*c* are logic diagrams of a scheduler;

FIGS. 6 and 7 are logic circuits;

FIGS. 8*a* and 8*b* are flow diagrams of wired-in-sequence control states;

FIG. 9 is a logic diagram of flip-flops used in a wired-in-sequence;

FIG. 10 is a logic diagram of LK flip-flops;

FIG. 11 is a logic diagram of wired-in-sequence auxiliary flip-flops;

FIG. 12 is an address decode logic diagram;

FIG. 13 is an exit conditions logic circuit;

FIGS. 14*a* through 14*f* and FIGS. 15*a*, 15*b*, $15b_2$ and 15*c* through 15*f* are flow diagrams explaining operations by the wired-in-sequence;

FIGS. 16*a* through 16*b* is a sign control flow diagram;

FIG. 16*c* is a diagram on an entry word format;

FIG. 17 is a logic diagram of a translator A;

FIG. 18 is a logic diagram of a translator B;

FIGS. 19*a*–19*c* are logic diagrams of a translator C;

FIGS. 20*a* through 20*d* are diagrams illustrating the operations performed in emulating certain instructions;

FIG. 21 is a diagram of mini-control timing;

FIG. 22 illustrates the system clock;

FIG. 23 is a clock timing diagram;

FIG. 24 is a diagram of a console display unit;

FIG. 25 is a diagram of console switches; and

Figures 26A, 26C:
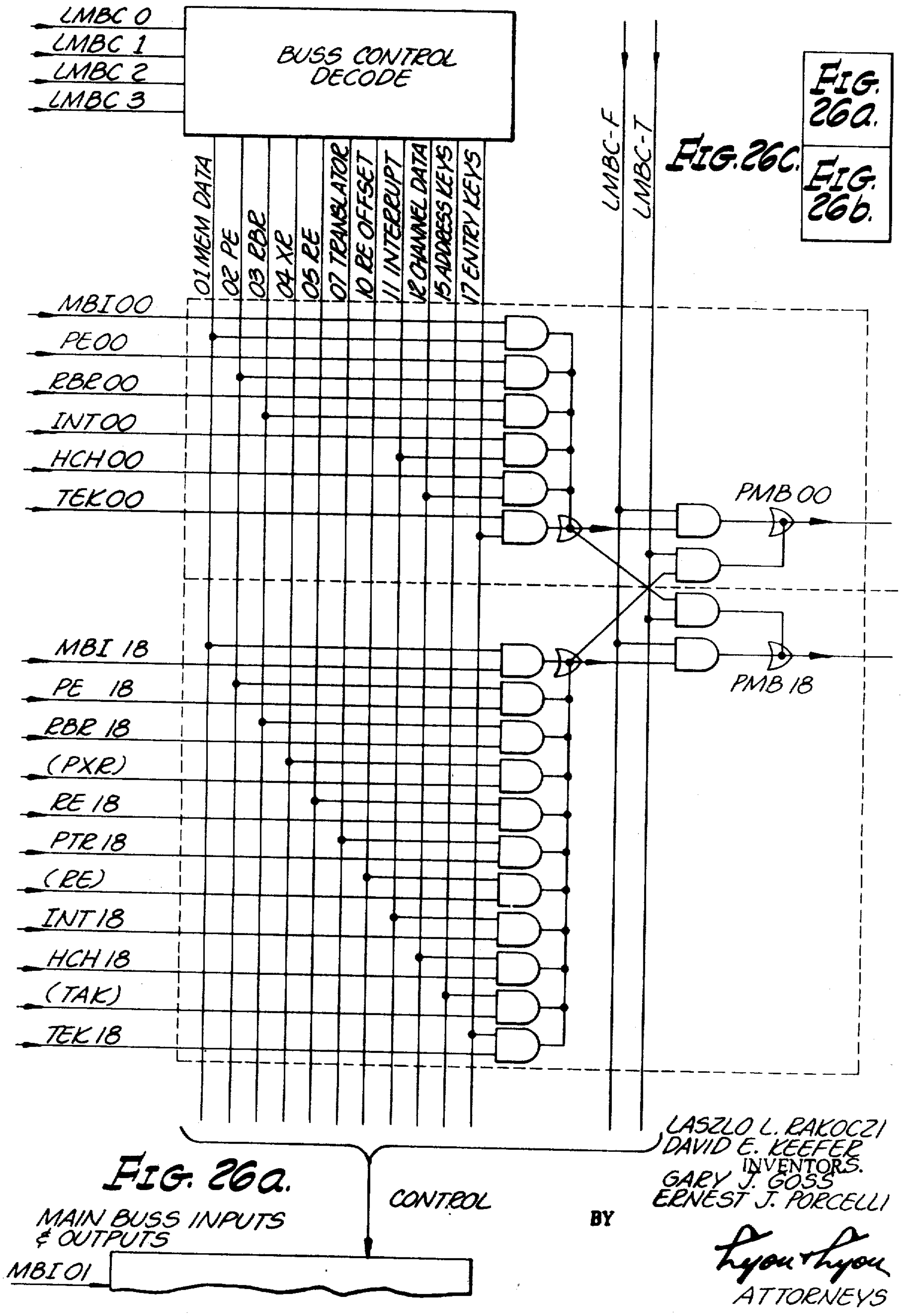
Figure 26B:
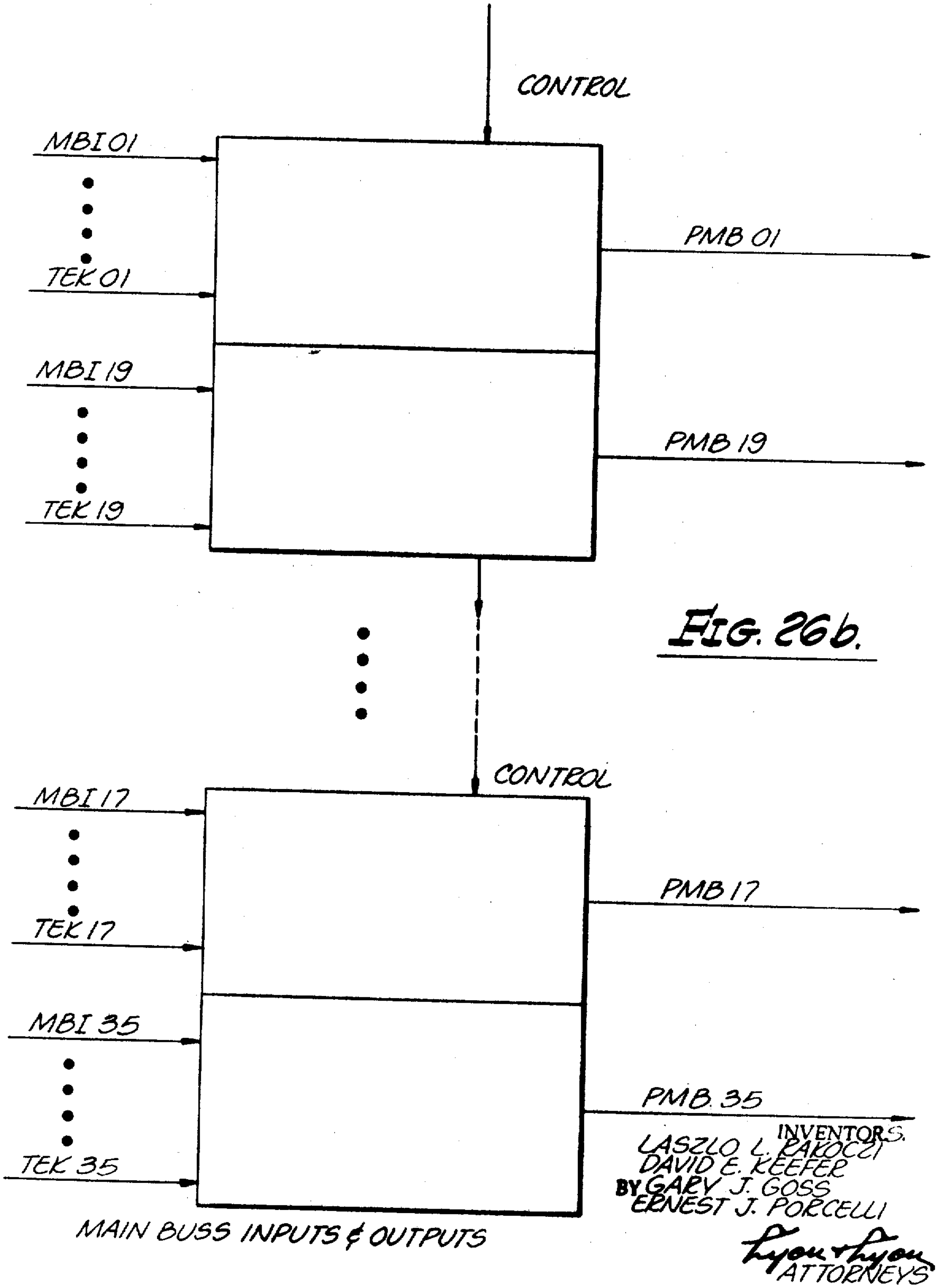

FIGS. 26*a*, 26*b* and 26*c* illustrate the main buss in more detail.

The above and related objectives are achieved in an embodiment of the present invention which is a computing system composed of a number of different and specialized functional stations as well as conventional functional stations which are connected to each other by means of a controlling arrangement such that together they are capable of executing a total computational task. In accordance with one form of the invention some of the functional stations may be considered small specialized computers or data processors.

The broad concept of the present invention may be referred to as a computer-within-a-computer. This concept eliminates the permanent bond between the various functional stations heretofore experienced in conventional computers because of the fixed wiring and logic of the system. With the present invention all functional stations communicate with each other through the inner computer, allowing each functional station to behave in its most natural and economical fashion. The inner computer, having its own control memory, control units, and registers, can be set up to emulate the instruction repertoire and program capacity of new or prior art computers. This multi-lingual capability, implemented by an emulation process allows the use of existing program libraries without reprogramming or hardware modification.

In keeping with the computer-within-a-computer concept, the present invention may be considered to be divided into two parts, namely, the external functional stations, and the inner computer. The external functional stations include a main memory, arithmetic units, and registers, input/output channels, input/output devices, and an operator's console. These stations perform the functions of similar devices on the computers being emulated. The inner computer, including a scheduler, wired-in-sequence, control memory, translators, mini-instruction registers and decoders, indicators and display registers, and mini-engine, takes the place of much of the wiring and control logic in a conventional system. The overall computer may be said to contain its own interpreter such that it can process data in the language of other computer systems. The control memory in the inner computer is used to convert the data used by the other computer into terms it can then supply to its own logic. Thus, the inner computer essentially is loaded with a program to interpret the language of the other computer and to set up the logic for processing the data. The computer of the present invention interprets rather than merely translates.

Programs written in the language of the machine being emulated are stored in the main memory. When the program is to be run, the inner computer fetches and instruction from the main memory, and performs the necessary indexing and indirect addressing operations by means of an emulator hardware sequence. The instruction is decoded and an emulator routine in the control memory is entered which directs the inner computer through all the steps necessary to execute this particular instruction. The next instruction is then fetched from main memory and the entire process is repeated until the program is completed or terminated. The inner computer thus acts as an interpreter thereby directing the total system to respond as though it were the computer it is intended to model.

BRIEF SYSTEMS DESCRIPTION

A brief description of an embodiment of the invention will be given first in order to provide a general understanding of the various functional stations and the manner in which they operate together in executing a program written for another computer. This will be followed by a more detailed description of the system and the emulation process as it is handled by the inner computer, as well as a more detailed description of the functional stations, including various features and unique concepts embodided therein.

A typical configuration of the invention as it is used to emulate a well-known second generation data processing machine is illustrated in FIG. 1 and includes the inner computer 10 with its associated registers and control memory, and external functional stations; namely a main memory 11, high speed registers 12, arithmetic and logical unit 13, operator's console and display unit 14, and two input/output channels 15 and 16 as shown in FIG. 1. One channel 15 typically controls a card reader 17, I/O typewriter 18, and up to ten magnetic tape units 19 through 28, and the other channel 16 typically handles up to ten tape units 29 through 38. A brief description of each of the various units now will be given.

The external functional stations include the main memory 11, registers 12, the arithmetic unit 13, the operator's console and display unit 14, input/output channels 15 and 16, the peripheral units (tape units, card reader and typewriter). The main memory 11 functions as the core storage of the computer being emulated. It is used to store data and instructions which are in the form of a program in the machine language of the computer being emulated. The main memory typically contains 32,768 words consisting of 36 bits plus one parity bit.

The registers 12 are high speed storage elements available to the operator and programmer on the same basis as those in the computer being emulated. The inner computer 10 assigns certain functions to certain of the registers as required to duplicate those available on the computer being emulated. Typical assignments are: Accumulator (AC), 38 bits; Multiplier-Quotient (MQ), 36 bits; Index Registers, (XR1–XR7), 15 bits each; Instruction Counter (IC), 15 bits, and so forth.

The arithmetic and logical functions such as fixed and floating point addition, multiplication, logical AND, OR, and masking operations are performed in the arithmetic unit 13. The unit is called the "main engine," and is also used by the inner computer 10 for internal operations. It contains registers PB, PC, PD, PE, and PF (to be described subsequently) which are 36 bits in length plus additional bits for overflow and sign control.

The operator's console 14 is a flexible unit which simulates all the console functions of the computer being emulated. The console contains the keys, switches, and lamps necessary for manual and semiautomatic control and the visual checking of information in the system. Power to the system may be controlled from the console. All memory and register locations can be displayed. An execute entry function permits execution of console-keyed instructions without disturbing main memory. Address stop control provides several optional stop modes.

The input/output channels 15 and 16 control the quantity and destination of all data transmitted between the inner computer 10 and the peripheral units (e.g., input/output units). The channels may be considered small specialized data processors since they perform their functions independently of the inner computer and each other.

The peripheral units on a typical system are magnetic tape units 19 through 28 and 29 through 38, a card reader 17, and an I/O typewriter 18. The tape units are fully compatible with the tape units of the computer being emulated. The card reader and typewriter formats, where they differ from that of the computer being emulated are converted within the inner computer 10 to a compatible format by means of a combination of hardware and software emulation techniques.

The inner computer (see FIG. 2) includes a control memory 42, a scheduler 43, a wired-in-sequence 44, translators 45, mini-instruction register and decoders 46, a mini-engine 47, and indicators and display registers 48. The control memory 42 contains, for example, 1,024 words consisting of 36 data bits and one parity bit. The control memory is used primarily to store emulator routines, to store data and constants used by the routine and the hardware while executing emulator instructions, and as a transient input/output area for data transmitted between main memory 11 and the input/output channels 15 and 16. The control memory 42 and the main memory 11 are completely independent and fully overlapped, with the control memory 42 functioning significantly faster than the main memory, e.g., the former has a cycle time of two microseconds and the latter has a cycle time of four microseconds.

Since certain processes in the external functional stations may be taking place simultaneously, it is necessary for the inner computer 10 to take action promptly when some device needs attention. This function is performed by the scheduler 43, which receives requests for action from the input/output channels 15 and 16, the operator's console 14, and from circuitry which indicates that a program in main memory 11 is in progress. The scheduler 43 passes control to certain entry points in the wired-in-sequence 44 depending on the type of priority of the request honored. The wired-in-sequence 44 contains a number of wired subroutines or sequences, for example four, consisting of six steps each. These sequences, for example, are (see FIG. 8) YA (instruction fetch), YB (operand fetch), YS (save), and YR (restore). The scheduler 43 passes control to state zero of one of these sequences depending upon the type of request which has been honored. From there, the sequence is stepped from one state to another, although not necessarily in a sequential manner. Steps may be skipped within a sequence and control may be passed from one sequence to another. The purpose of the YA sequence is to fetch the instruction to be emulated from main memory 11, decode it, and perform indexing and indirect address operations. The primary purpose of the YB sequence is to update an instruction counter (IC) and to fetch the operand or operands required by the instruction being emulated. The YS sequence is used to save the contents of certain registers by storing them in predetermined locations in the control memory 42 when an emulator interrupt or hang conditions occurs. The function of the YR sequence is to restore the registers which are saved during the save sequence.

The translators 45 include three translators (A, B, and C). The function of the translators is to decode the instruction being emulated and to determine (by means of an entry table in the control memory) the starting address of the emulator routine necessary to complete the emulation and to set certain general control flip-flops (in translator C) in order to pass on specific information about instruction characteristics to the emulator routine.

The inner computer 10 has stored therein a specialized, hardware-oriented, machine language which is designed for interpretive work. This is the language in which emulator routines are written. An individual instruction in this internal language typically is 18 bits long and is called a mini-instruction. When an emulator routine is being executed, mini-instructions are brought from the control memory 42 to the mini-instruction register 46 from whence the bit configuration is passed to the mini-instruction decoders. The decoders determine the operation or operations to be performed and accordingly send control signals to the various units of the overall system.

The mini-engine 47 is similar in construction to that of the main engine or arithmetic unit 13 except that no shifting operations (and hence multiply, divide, and floating point operations) are performed. The mini-engine 47 controls shifting in the main engine 13, and contains several registers RB (mini-instruction counter), RC (shift counter), RD (save counter for subroutine mode), RE, and RF, all of which typically are eleven bits in length, except RC which is eight bits.

The indicators and display registers 48 are sets of flip-flops and high speed storage elements which are used to store hardware and emulator program status, the occurrence of certain events within the system and the like. The registers in this unit are a display register (36 bits), general indicators 1 and 2 (32 bits each) and secondary indicators 1 and 2 (32 bits each). Most of the bits in these registers may be individually set, reset, or both by emulator instructions, and many are connected to lamps on the operator's console 14.

Before turning to a more extensive discussion of an exemplary embodiment of a computer according to the concepts of the present invention, a number of the principal concepts or features thereof will first be outlined. The inner computer is switched to serve the various facilities of the emulated computer, such as, instruction execution, I/O initiate-terminate, real time clock, console functions, and I/O data flow. This switching is accomplished by the scheduler which has been briefly described above. The utilization of a switchable inner computer to serve the various facilities of the system in a flexible manner by means of emulator routines permits a computer according to the present invention to emulate a number of different computer systems. The scheduler serves to schedule each task and to service the various facilities, and this is accomplished through the emulator routines. For example, to perform a particular task the scheduler may transfer control to the wired-in-sequence which controls, for example, translators, control memory and other functional units, and emulations requiring actions by means of an emulator program which interprets the instruction of a computer being emulated. Eventually, control is returned to the scheduler.

In order to provide an efficient system and enable the control memory of the inner computer to be kept within economical limits, a single emulator routine may be utilized in many different types of emulation procedures by allowing the return at the end of the routine (exit point) either to the scheduler or to another emulator routine. In other words, although control is normally returned to the scheduler after execution of an emulator routine, the control need not be returned to the scheduler, but by means of a subroutine mode another routine may be first executed.

Machine-instruction decoding may be accomplished in a flexible and changeable manner by means of a translator and an entry table in the control memory. Additionally, machine-instruction fetch, indexing and indirect addressing also may be controlled by the wired-in-sequence. These aspects provide flexibility in the emulator program memory allocation and facilitate changing emulator routines. As an example, the translator may point to the control memory where the entry table is stored which in turn points to a routine in the control memory. The entry table includes an address along with modifier bits, which are used to prime an emulator routine contained in the wired-in-sequence to vary the same.

Of particular significance is the emulation of the operating environment of various computers by a single computer. In order to accomplish this, the console switches are executed in an interpretive mode. The console switches are connected to the inner computer and their function is controlled through emulator routines. The switches thus are not hard-wired to specific functional units of the system as with conventional computers.

In order to eliminate the need for many time consuming jump emulator instructions (also referred to as ministeps) and to permit a higher speed straight line coding, as well as to provide an economical system, a single emulator routine may be utilized for emulating multiple machine instructions. This type of operation is accomplished by control flip-flops, which will be discussed in greater detail subsequently, under the control of a translator. As an example, a number of instructions being emulated have common and uncommon portions. Flip-flops are used to store the nature of the uncommon portions, and thereby enables either instruction to be executed by sensing the state of these flip-flops.

The emulator programs can be loaded and overlayed in order to permit a computer according to the present invention to emulate multiple machine languages in an economical manner. This is accomplished through utilization of the control memory providing both control read and write capabilities. This memory can be loaded from external devices, such as card reader or magnetic tape units. This approach, for example, enables the present system to be quickly changed (within a few minutes) so that it can emulate different computers. Since this memory has a write capability, storage areas thereof can be used for storing intermediate results generated by emulator routines, and may be used for input/output buffer purposes.

In some applications, it is important to permit the system to work on any subfield or a memory word without disturbing the remaining part of the word. This approach allows machine-language independency to be accomplished through emulation of machines with fixed words as well as machines with variable words. The same is accomplished through "zone" functions of the various arithmetic unit oriented mini-steps. For example, it may be desired to add a one to three bit field of one word with a similar length field of another word to emulate a particular machine.

Execution of the emulation process may be sped up by providing self-repeat capabilities for certain multicycle mini-steps. Control of the repetition is accomplished by the mini-engine. For example, the main engine may operate under control of the mini-engine to perform variable length add-shift and subtract-shift cycles. In this manner operations can be repeated without returning control to the control memory.

The specific manner in which the various principal concepts and features discussed above are made possible in a computer according to the present invention will become more apparent as the detailed discussion of the overall system progresses. The components of the system and their functions now will be considered in more detail with particular reference to FIG. 3 as well as the other more detailed figures of subsystems of the computer.

THE INNER COMPUTER

Turning now to the inner computer 10 in more detail, this unit has the general capabilities of typical stored program computers, but has a specialized hardware-oriented machine-language designed for interpretive operations. Basically, this unit schedules and controls the various functional stations of the system according to an emulator program comprising a number of mini-instructions stored in the control memory 42. A routine is made up of emulator, or mini, instructions, and these instructions include one or more emulator, or mini, steps. As discussed before, the main functional components of the inner computer are the scheduler 43, wired-in-sequence 44, control memory 42, translators 45, mini-instruction registers and decoders 46, mini-engine 47, and the indicators and display registers 48. The main engine 47, also referred to as the arithmetic unit, has been shown as a portion of the outer computer, but this engine operates extensively in conjunction with the inner computer and may also be regarded as a part thereof. The components of the inner computer are shown within the dotted line in FIG. 2. The principal communication paths between functional units also are illustrated, and these communicate through a main buss 50 which includes gates for appropriately gating data and signals between units. Such busses are well-known to those skilled in the art, and a buss is used as shown rather than complicating the system and drawings with each connection between the various stations.

Before proceeding with an explanation of the units of the inner computer 10, it may be desirable to discuss further the emulator process. In order to emulate a new or prior art computer, an emulator is first loaded into the inner computer 10. Briefly, this is accomplished by pressing a switch which causes a loader program to be read into the control memory, for example, from a card reader or tape unit, which program in turn causes all the necessary emulator routines and entry tables to be loaded into control memory from said card reader or tape unit. The emulator "system" consists of sets of programs or routines which correspond to families of machine-language instructions of the computer to be emulated. After the emulator system is loaded, control is passed to the scheduler at which time the computer of the present invention for all practical purposes acts just like the computer it is intended to model, i.e., the complete set of machine language instructions, and the input, output, and console functions thereof are available.

For each instruction in the program (which is loaded in main memory) of the machine being emulated, the inner computer 10 executes a routine or group of routines which are made up of sequences of mini-steps or mini-instructions. Similarly, for each input/output operation and each console function to be performed, the inner computer 10 executes still another set of routines. Most of these routines are stored in the inner computer's control memory 42, but for the sake of speed some of these which are used most frequently are "stored" or implemented into a portion of the logic called the wired-in-sequence 44. The entire collection of routines present in the inner computer 10 at any one time is called an emulator system. It is the emulator system which tells the inner computer how to interpret the machine-language instructions of some new or prior art computer. It follows that in order to emulate a different computer it is only necessary to change the emulator system which, for the most part, consists of a program resident in the control memory 42.

In a typical sequence of operations, the scheduler 43 passes control to the wired-in-sequence 44 which in turn causes execution of one or more mini-instructions which are taken from the control memory 42 and executed from the mini-instruction register 46. When the execution is completed, control is returned to the scheduler 43.

When a program request is honored by the scheduler 43, control is passed to a YA phase (to be discussed subsequently) of the wired-in-sequence 44. At this time, an instruction from the main memory 11 is brought to the main engine 13. The address of the next instruction to be emulated is kept in the instruction counter register. The operation code portion of the instruction is sent to the translators 45 which generate an address pointing to a word in an entry table in the control memory 42. This word, which is the starting address of the emulator routine needed to complete the emulation, is sent from the control memory 42 to the mini-engine 47. The address portion of the instruction is then modified if necessary by index registers and indirect addressing. A YB phase of the wired-in-sequence is then entered where the operands, if any, are brought from main memory 11 or the registers 12 to the main engine 13. An emulator program is then executed starting at the control memory address specified by the word just loaded into the mini-engine 47. When the emulator program is completed, an exit is generated which returns control to the scheduler 43. The process is repeated again when the scheduler 43 honors a program request.

The above explanation is somewhat simplified, but provides a general understanding of the manner in which the inner computer 10 interprets an instruction. It should be noted that not all instructions being emulated require the same wired-in-sequence operations, and a few instructions require no emulator routine for their execution. In addition, operations such as input/output and console functions which are not directly connected with the emulation of a specific instruction use a different portion of the wired-in-sequence and a different set of emulator routines, but the process is similar to that described above.

Turning now to a consideration of the manner in which the inner computer intercommunicates and communicates with the outer computer, the main buss 50 provides a common data path through the machine. The main buss can accept data from a majority (for example eleven) of the inner and outer units, and gate data into the output lines (PMB00 through PMB35). Main buss decode control signals (LMB0 through LMB3) determine which of the eleven inputs are gated onto the output lines. The code for these control signals and a description of each of the inputs will be discussed subsequently. Each device or functional station that is connected to the main buss outputs contain its own gates so that the data from the main buss will enter a particular functional station when an appropriate control signal is enabled.

The main buss also can perform a half-exchange, in which the data on the main buss is divided in half and the halves exchanged, i.e., output bits 00 through 17 are exchanged with output bits 18 through 35. When a control signal LMBC is false, the main buss output is normal and when this control signal is true a half exchange occurs.

The main buss is used in the exemplary embodiment of the invention to simplify the logic, and used in the description and illustration in order to facilitate understanding of the present invention. Improved performance can be realized by making direct connections between the various functional units but this increases the complexity of the control logic. In a version of the invention, for example, greater speed can be realized by making a direct connection between the registers 12 and the main engine 13, rather than using the main buss 50 and its gates to transfer the data between these two functional stations.

The control memory 42 contains, for example, 1024 words consisting of 36 data bits and one parity bit. The control memory is used primarily to store emulator routines, to store data and constants used by the emulator system and the hardware while executing emulator instructions, and as a transient input/output area for data transmitted between the main memory 11 and input/output channels 15 and 16. The control memory 42 and the main memory 11 are independent and fully overlapped, with the control memory functioning significantly faster than the main memory as noted previously. The control memory is protected during system operation, i.e., neither the operator nor the program being emulated can destroy the data in the control memory.

Emulator instructions may be only 18 bits long and stored two per control memory word. As far as the emulator instructors are concerned, the control memory 42 contains 2,048 18-bit mini-locations. These mimi-locations have mini-addresses numbered from 0000 through 3777 in octal notation. Certain portions of the control memory 42 are reserved for specific purposes, as set forth below:

| Mimi-Address (octal) | Description |
|---|---|
| **0000–0077** | Temporary Storage & Soft Registers. |
| **0100–0117** | Register Save Area, Level **1**. |
| **0120–0137** | Register Save Area, Level **2**. |
| **0140–0157** | Register Save Area, Level **3**. |
| **0160–0177** | Register Save Area, Level **4**. |
| **0200–0277** | Entry Table. |
| **0300–0377** | Duplicate Entry Table. |
| **0400–0477** | I/O Buffer, Channel A. |
| **0500–0577** | I/O Buffer, Channel B. |
| **0600–3777** | Emulator Routines. |

Figure 3G:
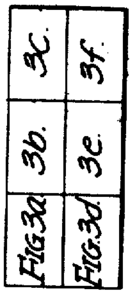
Figure 3A:
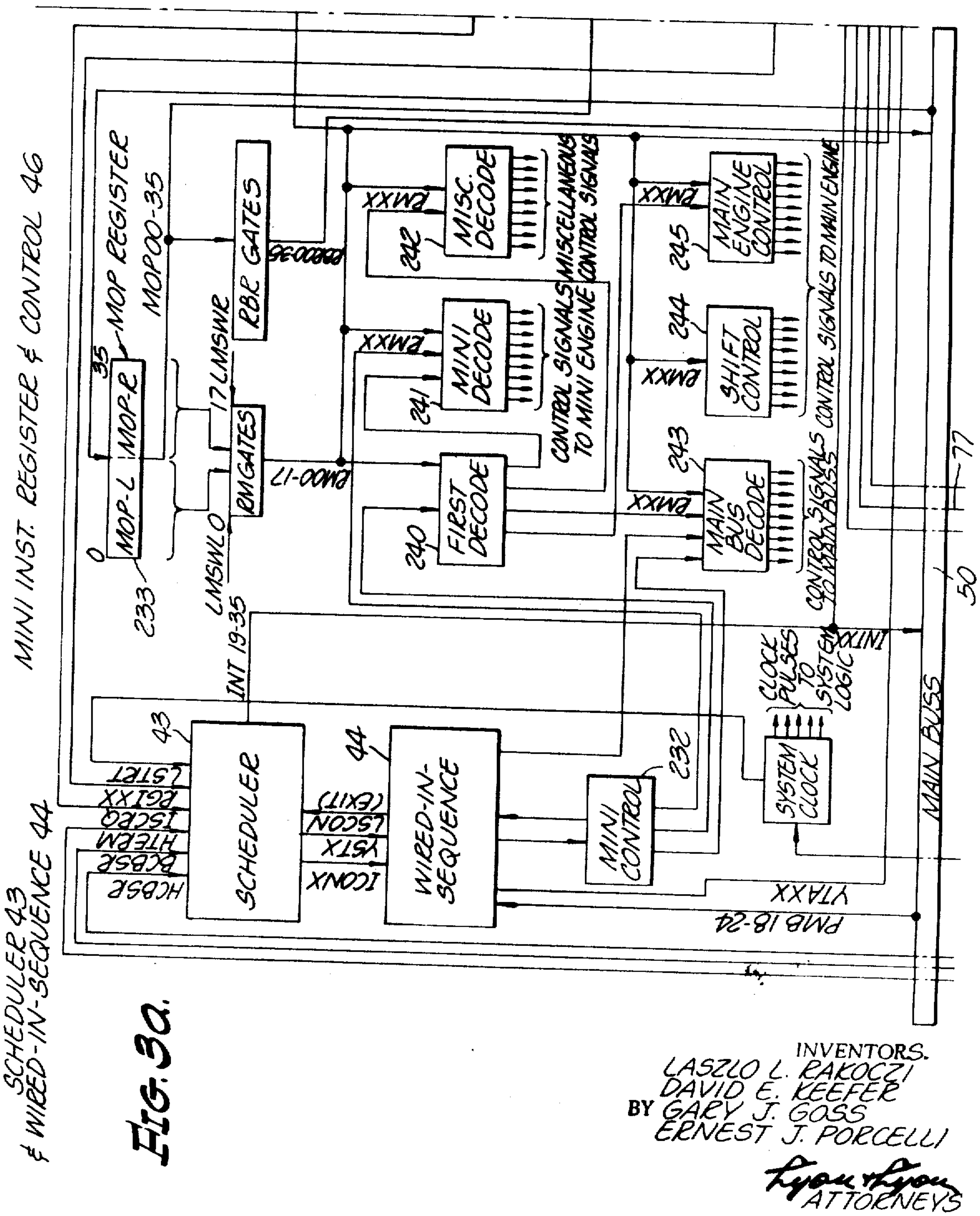
Figure 3B:
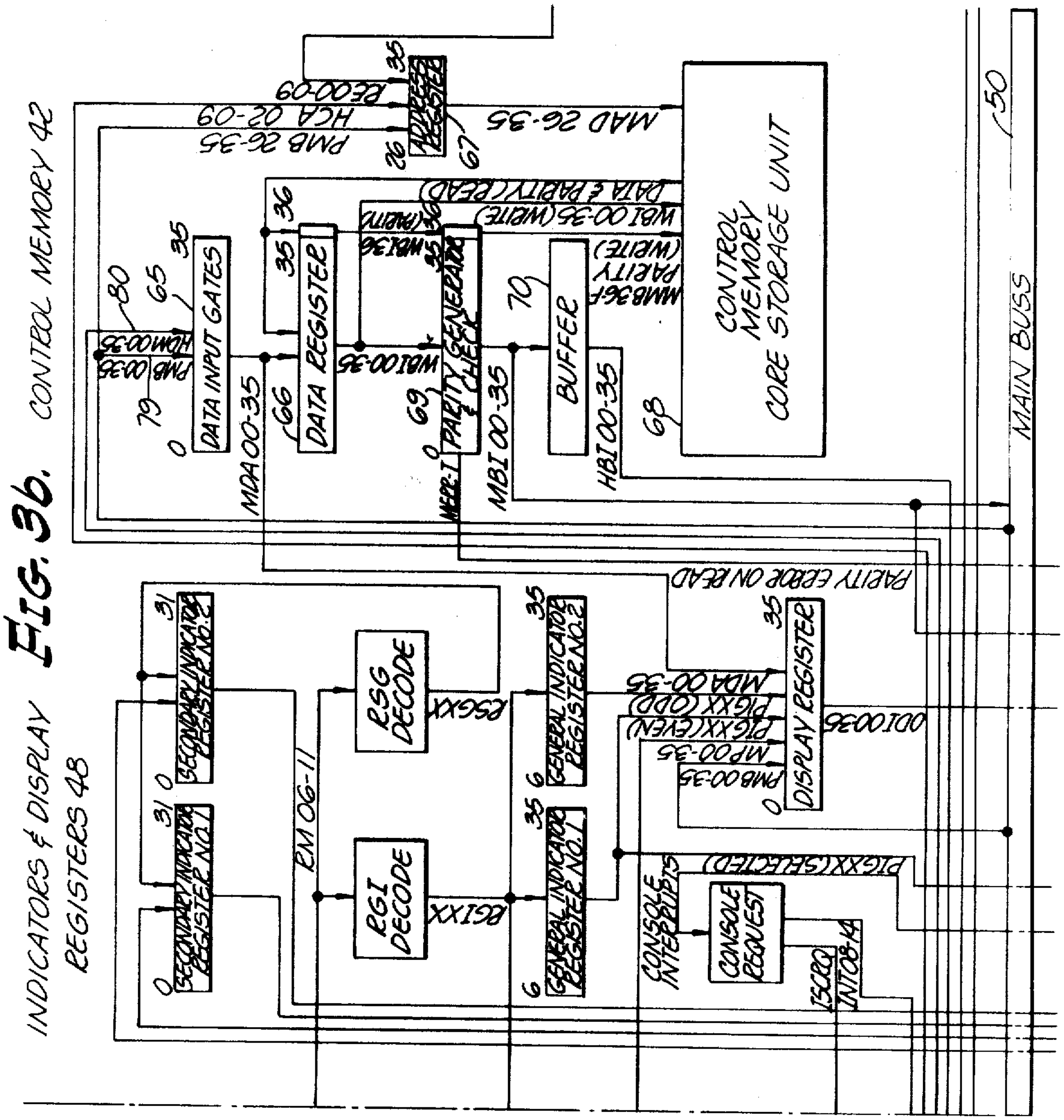

The control memory 42 as seen in FIG. 3*b* includes data input gates 65, data and address registers 66 and 67, a core storage unit 68, a parity generator and check circuit 69 and a buffer 70. The memory 42 receives data from two sources: (1) the main buss 50 (lines PMB00–35); and (2) the I/O channels 15 and 16 (lines HDM00–35). The outputs of the channel word buffers 74 and 75 (FIG. 3*d*) in I/O channels 1 and 2 are ORed together as indicated at 76 before they appear at control memory data input gates 65. The dashed line 77 in line HDM00–35 from the buffers 74 and 75 extending across the main buss 50 indicates that the line bypasses the buss. In reference to the nomenclature used in FIG. 3, which illustrates an exemplary embodiment in detail, it should be noted that in order to prevent cluttering up the drawings with a maze of lines which would tend to obscure the system and interconnections thereof, single lines with alphanumeric relations are shown. These notations indicate the data and signal flow. For example, two lines 79 and 80 into the control memory 42 in FIG. 3*b* are shown as inputs to data input gates 65 and are labelled respectively "PMB00–35" and "HDM00–35", and thereby indicate thirty six inputs to the gates 65 respectively from the main buss 50 and from the I/O channels 15 and 16. These types of notations are used throughout the specification and drawings rather than reference numerals alone in order to more clearly designate the interconnections of the various units and the data and signal flow therebetween. Although a single line is used between components of the system, it will be understood that multiple lines are used (e.g., PMB00–35) to transfer multiple bits. The various inputs and outputs of the main buss 50 will be covered in greater detail subsequently along with a more detailed discussion of the main buss.

Figure 3C:
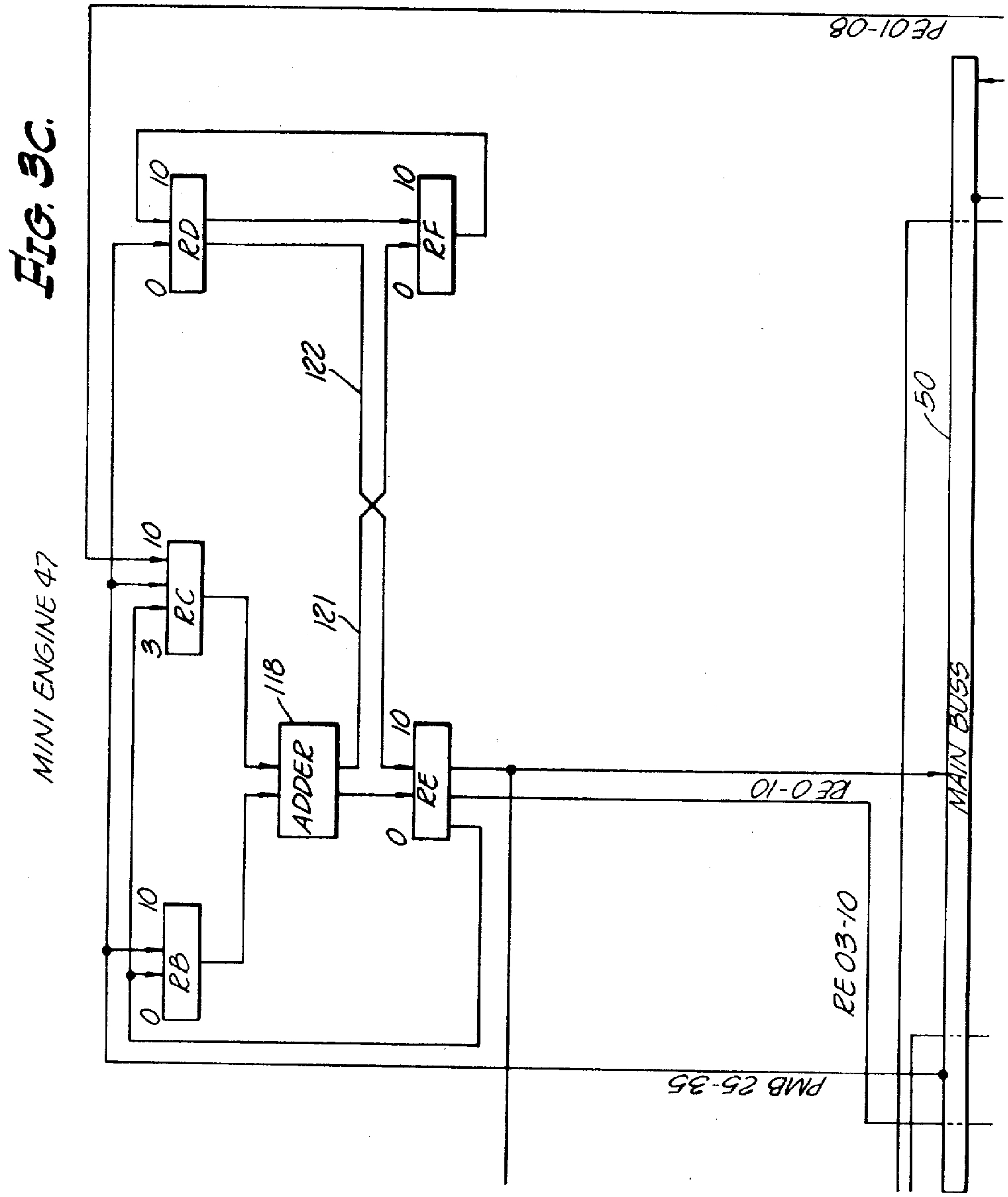

The address of the memory area in the storage unit 68 to be written into or read from comes to the control memory address register 67 from three sources: (1) the mini-engine 47 (line RE00–09) (FIG. 3*c*); (2) the main buss 50 (lines PMB26–35); and (3) the I/O channels 15 and 16 (lines HCA02–09). The outputs of the channel controls 82 and 83 of the I/O channels 1 and 2 (FIG. 3*d*) are ORed together as indicated at 84 before appearing at the input of the control memory address register 67. These channels will be discussed subsequently. Each of the controls 82 and 83 includes an address counter for selecting the desired words.

During a write to memory, data from one of the above sources is transmitted through the data input gate 65 to the data register 66. The data goes to the parity generator and check circuit 69 and on a line 86 to the core storage unit 68. The circuit 69 generates a parity bit (MMB36–F) and passes this to the unit 68. Odd parity is used.

During a read operation data is passed through the line 86 to the register 66, with the parity bit going to bit position 36. This data is transferred to the parity circuit 69 where parity is checked. The data (without the parity bit) is passed (lines MBI00–35) from the circuit 69 to the main buss 50, and through the buffer 70 (lines HBI00–35) as a separate data path to the channel word buffers 74 and 75 of the respective I/O channels 15 and 16. An error signal (MERR–T) is generated by the parity circuit 69 if an even number of bits are read out. This error signal is ORed at 88 (FIG. 3*e*) with a similar signal (NERR–T) from the main memory 11 and supplied (OERR–T) to the console 14.

Figure 3D:
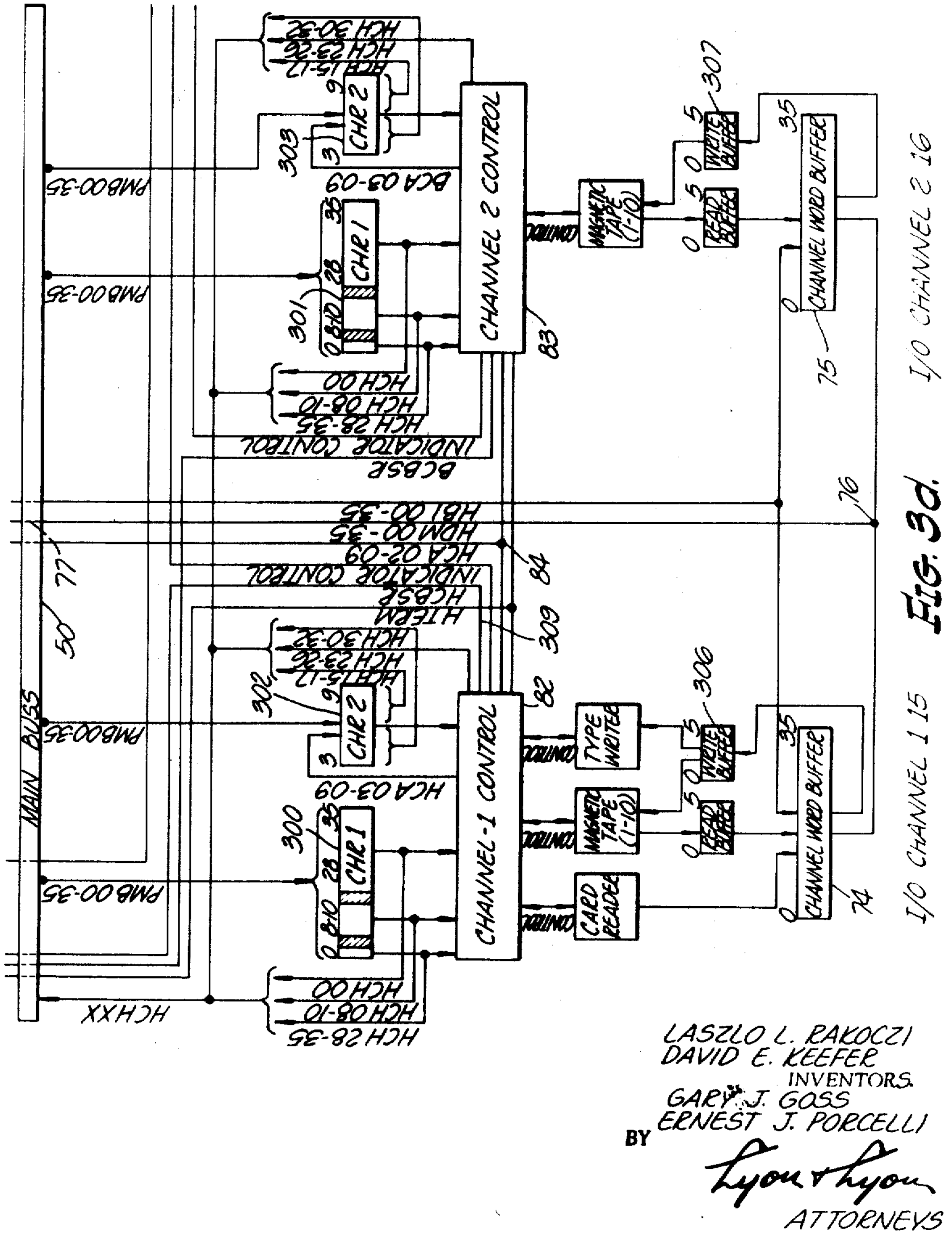
Figure 3E:
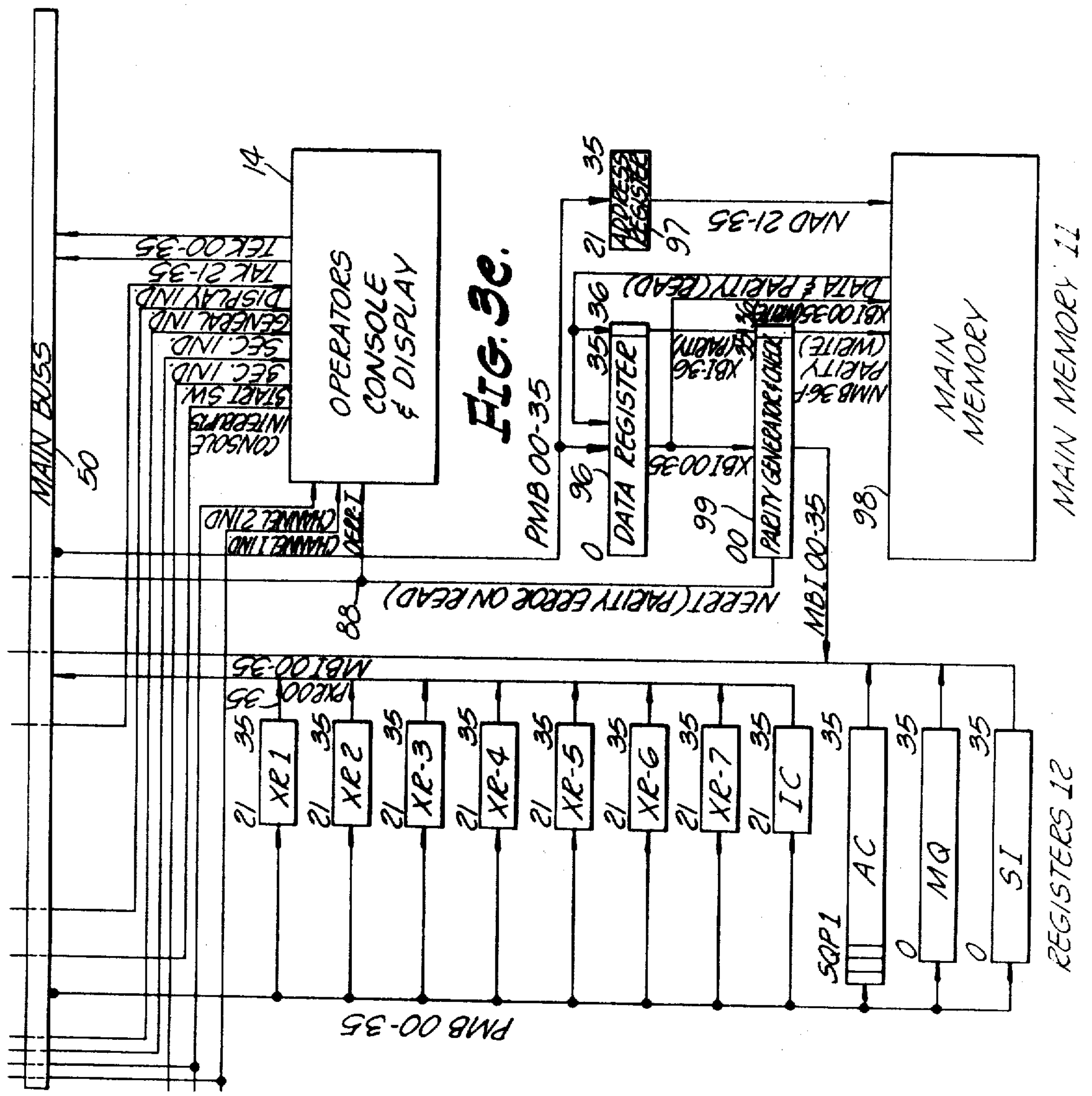

Turning briefly to the main memory 11, it will be seen from FIG. 3*e* that the data flow to and from the main memory is similar to that of control memory 42. The main memory 11 includes similar data and address registers 96 and 97 respectively, a core storage unit 98 and a parity generator and check circuit 99. No data input gates (like gates 65 in the control memory 42) are used; otherwise, data flow is the same as in the control memory.

Figure 3F:
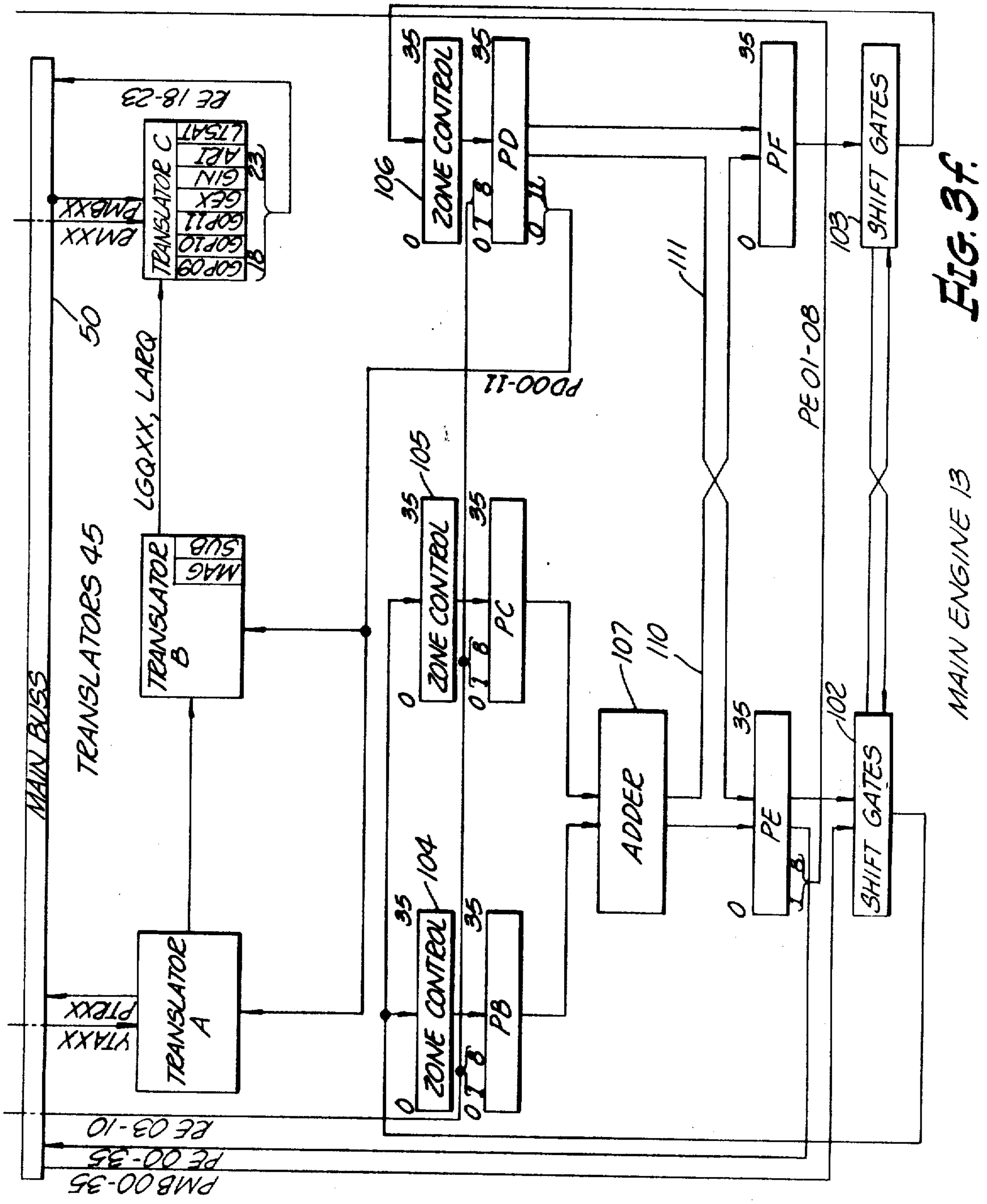

Turning for the moment to the main engine 13 (FIG. 3*f*), although it is shown as part of the outer computer, it also performs functions for the inner computer. The main engine performs all required storage and data manipulations when emulating an instruction taken from the main memory 11. This engine may be controlled in a conventional manner to perform single and multiple precision, fixed and floating point arithmetic, and shift operations. The main engine consists of five registers (PB, PC, PD, PE, PF), an adder, zone control circuitry, and shift circuitry as seen in FIG. 3*f*. The registers are 36 bits long, with additional bits for overflow and sign control. The PE and PF registers are used strictly as data paths or a temporary storage. Data sent from the main engine 11 to other parts of the system passes through the PE register to the main buss 50. The input (lines PMB00–35) to the main engine is through shift gates 102. The shift gates 102 and shift gates 103 are interconnected so that information may be transmitted from the main engine input PE register or PF register to the PB, PC, or PD registers. At any one time, a number may be shifted 1, 2, 3, or 4 positions either right or left or transferred straight through without shifting by the shift gates 88 and 89. Zone controls 104 through 106 perform operations on the data as it is transferred to the PB, PC, or PD registers. There are 32 different zone control codes which will be discussed subsequently. The adder 107 allows a large number of different arithmetic and logical operations to be performed on data residing in the PB and PC registers.

The principal function of the main engine is to store data, but it also contains the adder and shift control circuits, and performs arithmetic and logical manipulations of 36 bit binary words. The main engine registers may be called the working registers of the system. The main engine is used during operation of the wired-in-sequence 44 and during execution of emulator routines to perform all the required storage and data manipulations when emulating another computer's instruction. As noted before, inputs to the main engine are from the main buss 50. Outputs from the main engine go to the main buss 50 and to the translators 45 to begin the emulation.

Data flow during a straight transfer is from the adder 107 to the PE register and from the PD register to the PF register. During a cross transfer, which is provided by lines 110 and 111, the data flow is from the adder 107 to the PF register and from the PD register to the PE register. This enables the contents of the PD register to be used as an operand for the adder 107 by first passing through the PE register and then being loaded into either the PB or PC registers. It also allows results from the adder 107 to be loaded into the PD register via the PF register.

The adder 107 may do more than just add, it allows all logical combinations of data in the PB or PC registers. For example, control signals may be supplied to the adder to provide data combinations called PXBN, PXBC, PXNC, and PXNN, the meanings of which are set forth below:

PXBC=exclusive OR, PB and PC;
PXBN=exclusive OR, PB and $\overline{\text{PC}}$;
PXNC=exclusive OR, PC and $\overline{\text{PB}}$;
PXNN=exclusive OR, $\overline{\text{PC}}$ and $\overline{\text{PB}}$.

Thus, for any data bit combinations, the adder outputs are as shown below:

| INPUT | | OUTPUT | | | |
|---|---|---|---|---|---|
| PB BIT | PC BIT | PXBC | PXBN | PXNC | PXNN |
| 0 | 0 | 0 | 0 | 0 | 1 |
| 0 | 1 | 0 | 0 | 1 | 0 |
| 1 | 0 | 0 | 1 | 0 | 0 |
| 1 | 1 | 1 | 0 | 0 | 0 |

The shift gates 102 and 103 are coupled with the outputs of the PE and PF registers, and each is in two stages, shift three bits and shift one bit. At each state, control signals are used to specify shift left, shift right or no shift. Control comes from the mini-instruction registers and control 46 which will be described subsequently. The RC register on the mini-engine 47 (FIG. 3*c*) holds the shift count which is monitored during shift operations. On any one data pass through the shift gates, nine combinations are possible in one clock cycle as follows: left four, left three, left two, left one, none, right one, right two, right three, or right four. More shifts can be provided over a number of clock cycles. Note that the shift gates are the entry point for data from the main buss entering the main engine. In entry, no shift occurs as data is gated from main buss 50 to the PB, PC or PD registers.

The zone controls 104 through 106 allow the thirty six bit PB, PC and PD registers to perform arithmetic, logical and masking operations. For example, a six bit add operation may be performed by zoning off unnecessary or unwanted bits; e.g., the desired six bits of words stored in the PB or PC registers may be added together in the adder 107 while ignoring the remaining bits of these words. A carry flip-flop (not shown) preferably is provided to receive any carry or overflow from the most significant bit of the specified zone in a conventional manner for use as desired (e.g., to enable the system to test for overflow). The blocked in portions of FIG. 4 show the allowable zones (of several bits) for main engine operations. The octal code given in the left hand column is incorporated as a part of certain mini-instructions to specify which zone is to be used. In loading the registers PB, PC and PD, zone control can be used to load only desired bits of a thirty six bit word. For example, the instruction "502030" means to take the contents of the PD register and load them into the PB register, but load only bits 0, 1 and 2 (discarding bits 3–35). The "50" in the instruction means the PB register is the destination of the data, the "20" means the PD register is the source, and the "30" means to load only the first three bits of the word in the PB register (as indicated in FIG. 4 at 115). Another instruction, for example, "533627" means to add bits 3–17 of the PB register to bits 3–17 of the PC register and store the results in the PD register. The "53" in the intsruction means to store the result in the PD register, the "36" means to add PB to PC, and the "27" means to operate on only bits 3–17 of the affected registers (as seen in FIG. 4 at 116). The entire contents of the PB and PC registers are brought into the adder in this case, but the zone control 106 only allows bits 3–17 of the result to be stored in the PD register. By substituting other digits (i.e., 24) for the middle two digits of the above instruction, the logical AND of the PB and PC registers can be performed on the specified zone. More examples will be apparent later when specific "primary operation codes" (POP) and "secondary operation codes" (SOP) are discussed.

The mini-engine 47 (FIG. 3*c*) is similar to the main engine 13 except that no shifting or zoning operations are performed. The registers employed are RB, RC, RD, RE, and RF as seen in FIG. 3*c*. These registers are, for example, eleven bits in length, except the RC register which is eight bits in length. The output (lines RE00–10) of the mini-engine 47 is through the RE register. Inputs (lines PMB25–35) from the inner computer go directly to the RB, RC or RD registers from the main buss without going through shift circuits as is the case with the main engine 13. The adder 118 functions in a manner similar to the adder in the main engine 13.

The functions of the various mini-engine registers will be explained in more detail in conjunction with other sections of the system. The RB register functions as the mini-instruction counter, and may be loaded from the buss or from the RE register. The contents of the RB register specify the mini-address of a mini-instruction located in the control memory 42. The most significant ten bits (bits 0–9) indicate the address of a pair of mini-instructions residing in the control memory, and the least significant bit (bit 10) specifies which instruction of the pair is to be executed.

The register RC is used as a shift counter to control shifting in the main engine 13, i.e., it counts the number of bits data is to be shifted in the main engine. The RC register also serves to hold a skip distance when a skip instruction is executed. The RC register is decremented during shifting operations which are discussed below. No shifting of data takes place within the mini-engine. A shifting operation (including multiply and divide operations) may be performed on the data contained in one or more of the main engine PB, PC or PD registers, i.e., the contents of PB, PC, or PD may be shifted individually, or PB with PD, or PC with PD. Shifting takes place through the shift gates 102 and 103 of the main engine. During a shift, a shift count from bits 12–17 of a shift mini-instruction is loaded into the mini-engine RC register. The remaining bits of the mini-instruction specify which main engine register or registers is to be shifted and whether to shift left or right. This shift count stored in the mini-engine RC register controls the number of places the data is to be shifted. For example, if the RC register contains a count of 4 or greater, the data is shifted 4 places by the shift gates, and the register is decremented by 4. This process is repeated during subsequent clock cycles until the RC register contains a count less than 4. If the contents of the RC register is zero, the shifting operation is complete. If it is a 1, 2, or 3, the data is then shifted 1, 2, or 3 places, respectively, and the RC register is cleared to zero. Consider a mini-instruction "662605." The "66" specifies a shift operation, the "26" specifies that the PC and PD registers are to be shifted together and the entire contents of both shifted left as one data group, and the "05" specifies that the registers are to be shifted five bits. When this instruction is executed, the 05 is loaded into the RC register. Since it is greater than 4, the PC and PD registers are shifted 4 places left during the first clock cycle, and RC is decremented by 4, becoming a 1. Then the contents of PC and PD are shifted 1 place left during the next clock cycle, and RC is cleared to zero, completing the operation. In the shifting operation, the data from the PC and PD registers are transferred through the PE and PF register to the shift gates 102 and 103. The first shift of 4 occurs and the shifted results are returned to the PC and PD registers. It will be apparent that the most significant bits of PC are lost and the most significant bits of PD become the least significant bits of PC. A similar operation occurs for the remaining one bit shift.

During a floating point normalize operation, the number of places to be shifted is determined by the data itself, i.e., the data is to be shifted left an undetermined number of times until a "one" appears in the most significant bit position. For this type operation, bits 9–35 of the PB register are shifted along with bits 9–35 of the PD register, and shifted left until a one appears in the bit 9 position of the PB register. Bits 0–8 in each register are not involved in a normalize operation and are not disturbed. Bits shifted out of the most significant bit positions of the PD register are shifted into the least significant bit positions of the PB register. The normalize operation is started as a result of executing the normalize mini-instruction "6614*xx*", where the "66" specifies shift, the "14" specifies a floating normalize operation using the PB and PD registers in the manner described above, and the"*xx*" may be any octal number ranging from 00 through 77. If the latter is any number from 00–76, it will be loaded into the RC register as described previously for a shift count. If it is 77, the contents of the RC register will not be altered. The normalize operation is performed as follows. If the PB register bits 9–12 do not contain a "one," the contents of PB and PD as described above are shifted 4 places left and a 4 is added to the contents of the RC register. This process takes one clock cycle, and is repeated until a "one" appears in bits 9–12 of PB. If the one is in bit position 9, the normalize operation has been accomplished; otherwise, bits 9–12 are decoded to cause a shift 1, 2, or 3 places left and a 1, 2, or 3, respectively, is added to the contents of the register. This completes the operation. During each clock cycle the data from the PB and PD registers passes through the PE and PF registers and is shifted by the shift gates 102 and 103, with the results being returned to the PB and PD registers. This is repeated for as many clock cycles as necessary to complete the required operation.

A masking operation is performed on the mini-engine RC register under the following conditions. Whenever any test mini-instruction is decoded, the skip distance portion of the instruction is loaded into the RC register. The purpose of a skip instruction is to jump up or down an instruction list, or emulator routine, to fetch another instruction. Inasmuch as the skip distance is five bits long, and the RC register is eight bits long, the three most signicant bits of the RC register are cleared to zero during this particular loading operation to ensure that the register does not contain any bits not involved in the skip operation. Under test conditions which will cause a skip, the contents of the RC register are added to the contents of the RB register and the result is stored in the RB register thereby giving the location of the next instruction. A simple example of the use of a skip operation may occur where the sign of a number is tested to determine if it is plus or minus. If the sign is minus, it may be desired to skip a part of a routine dealing with positive numbers and thus use only the steps of the routine dealing with negative numbers.

The register RD is used to save the contents of the mini-instruction counter (RB register), incremented by one, when the emulator program enters a subroutine mode. That is, the address of the next instruction to be executed after completion of a subroutine is saved in the RD register. During execution of an emulator routine it often is desirable to branch from the emulator routine temporarily and execute an emulator subroutine, subsequently returning to the next instruction in the emulator routine. This is accomplished through use of a SMCT mini-instruction which signals a branch or jump to the subroutine. When the SMCT instruction is encountered within a list of instructions in the emulator routine, the mini-address of the next instruction following the SMCT instruction is saved by incrementing the contents of the RB register by one in the adder 118, and transferring the result to the RD register. The start address of the subroutine as specified by the SMCT instruction is loaded into the RB register, and the subroutine is executed under control of the RB register until completion of the subroutine. When the subroutine is completed, the contents of the RD register are then loaded back into the RB register in order to continue execution of the emulator routine commencing with the next instruction following the SMCT instruction.

The registers RE and RF are used when a transfer within the mini-engine occurs, and thus are used for temporary storage and data paths within the mini-engine. Data flow during a straight transfer is from the adder 118 to the RE register and from the RD register to the RF register. During a cross transfer provided by lines 121 and 122, the data flow is from the adder to the RF register and from the RD register to the RE register.

The scheduler 43 (FIG. 3*a*) is the basic controller of the inner computer. The scheduler receives requests from the various functional stations and determines the appropriate action to be taken based upon a system of priorities. By this means, the facilities of the system are switched and controlled in a flexible manner to perform the operations corresponding to those of the computer being emulated, such as, instruction execution, input/output initiation and termination, input/output data flow, console functions, and real time clock. In general, the scheduler 43 determines the request which is to be serviced, and passes control to the wired-in-sequence 44 which in turn causes execution of the appropriate emulator routine. The utilization of a switchable inner computer to serve the various systems facilities in a flexible manner by means of emulator routines permits a computer embodying the concepts of this invention to emulate a number of different computer systems. The scheduler is of principal importance in accomplishing this objective.

The requests to the scheduler 43 are divided into four levels according to their urgency. When several requests are simultaneously present, the scheduler selects the request which has the highest priority. Control is then passed to the appropriate state of the wired-in-sequence 44. The following is a list of the scheduler requests in descending order or priority, and the corresponding wired-in-sequence states to which control is passed.

| Priority level | Flip-flop set | Request or interrupt | First W-I-S state |
|---|---|---|---|
| 1 | I CON 1 | Return | YRO |
| | | Channel 1 buffer service | YBO |
| 2 | I CON 2 | Return | YRO |
| | | Channel 2 buffer service | YBO |
| 3 | I CON 3 | Return | YRO |
| | | Terminate | YBO |
| | | Console | YBO |
| 4 | I CON 4 | Return | YRO |
| | | Trap | YBO |
| | | Program | YAO |

The channel one buffer service request may be indicated by an emulator instruction, or as a result of the I/O channel filling one of its buffers. The object of this request is to inform the inner computer to remove the data from the buffer before the channel has a chance to overlay the buffer with new data. When the buffer service request is recognized by the scheduler 43, wired-in-sequence state YBO is enabled. The wired-in-sequence states and the resulting action will be described subsequently.

The channel two buffer service request is similar to the channel one buffer service request except that it is used to service channel two on two channel systems and has a lower priority than the channel one buffer service request. When this request is recognized by the scheduler 43, wire-in-sequence state YBO is enabled.

The terminate request may be set by an emulator instruction or by a signal from one of the I/O channels indicating the end of an input/output operation. When the scheduler 43 recognizes this request, it enables wired-in-sequence state YBO.

There are six keys on the operator's console 14 which will cause a console request. These are the interval timer, reset, clear, load card, load tape, execute entry, and execute display. If any of these keys are on, a flip-flop in the scheduler 43 will be set. When this request is recognized by the scheduler, control will be passed to state YBO of the wired-in-sequence.

If a condition occurs which would cause a trap on the computer being emulated, the trap request may be set by an emulator instruction. When the trap request is recognized by the scheduler 43, state YBO of the wired-in-sequence is enabled. When emulating a certain present day computer, there are some conditions under which it is desirable to delay the recognition of a trap request. This may be accomplished by providing a postpone trap flip-flop which is set by means of an emulator instruction in addition to setting the trap request. This allows one program request to be recognized before the trap request will be recognized. In effect, this reverses the priority of the program and trap requests for the duration of one instruction in the language of the computer being emulated.

The program request may be set by an emulator instruction or by the operator when he presses the start key of the console. When a program request is recognized by the scheduler 43, sequence state YAO of the wired-in-sequence 44 is enabled.

It is sometimes necessary to temporarily interrupt the operation of one level until some later event takes place. To control this activity, each level has what is called a "hang" and a "return request." A hang condition may be set for any scheduler level by an emulator instruction. This also sets a return request, but causes all requests occurring at that level to be temporarily ignored. When the hang is cleared, the return request will be honored according to its level's priority. If in any one level there exists both an "original" request and a return request, the return request will be honored first. When the scheduler 43 recognizes any return request, step YR0 of the wired-in-sequence is entered.

Within each scheduler priority level there are three groups of flip-flops as seen in FIGS. 5*a* and 5*b*. These flip-flops are the interrupt (INT*xx*) flip-flops 126 through 142, and status flip-flops 144 through 153, and the current operating level flip-flops (ICON*x*) 155 through 158. Briefly, the interrupt flip-flops are used to store any one or more conditions or requests (such as a program request) which requires servicing by the scheduler 43. One or more interrupt flip-flops are set whenever such conditions occur. The outputs of these flip-flops are coupled as inputs to the following AND gates 160 through 170 as indicated by the designations on outputs of these gates in FIGS. 5*a*–5*b*. As will be described later, each cycle of the system clock includes pulses KCP0 through KCP7, the "KCP" indicating a clock pulse and the numeral (e.g., 7) indicating the clock time. At KCP4 time of each clock cycle, as indicated by line 172, all of the interrupts present at each level are gated into the status flip-flops 144 through 153 by the gates 160 through 170 which are coupled to the set inputs of these flip-flops. At this time, all the requests present are "frozen," so to speak, in the status flip-flops 144 through 153 so that there will be no further changes in the states of these flip-flops until KCP3 time of the next clock cycle when these flip-flops are reset. After KCP4 time noted above, if the scheduler gains control it will use the outputs of the status flip-flops at KCP0 time to set the proper current operating level flip-flop (ICON*x*) 155 through 158 according to the logic shown in FIGS. 5*a* and 5*b*.

More specifically, there are four basic interrupt flip-flops (level four contains five) for each level as shown below:

| Flip/Flop | Level 1 | Level 2 | Level 3 | Level 4 |
|---|---|---|---|---|
| Request | 126(INT19) | 130(INT23) | 134(INT27) | 138(INT31)<br>139(INT32) |
| Job-In-progress | 127(INT20) | 131(INT24) | 135(INT28) | 140(INT33) |
| Return | 128(INT21) | 132(INT25) | 136(INT29) | 141(INT34) |
| Hang | 129(INT22) | 133(INT26) | 137(INT30) | 142(INT35) |

The "request" flip-flops 126, 130, 134, 138 and 139 (INT19, INT23, INT27, INT31 and INT32) are set and reset in the following manner:

INT19 (SET)=Channel 1 Buffer Service Request (HCBSR), OR "Set Level 1 Buffer Service Request" mini-instruction;
INT19 (RESET)="Reset all Hangs and Requests" mini-instruction, OR Machine Reset (SRES);
INT23 (SET)=Channel 2 Buffer Service Request (BCBSR), OR "Set Level 2 Buffer Service Request" mini-instruction;
INT23 (RESET)=same as INT 19 Reset;
INT27 (SET)=Terminate Request (HTERM–T) AND Level 3 not in operation (ICON3–F), OR "Set Terminate Request" mini-instruction;
INT27 (RESET)=same as INT19 Reset;
INT31 (SET)="Set Channel Trap Request" mini-instruction;
INT31 (RESET)="Reset Level 4" mini-instruction, OR Machine Rest, OR Console Reset (SPRES);
INT32 (SET)=Trap Request Status F/F (ITRRQ), set AND no higher level status flip-flops set, AND YSCON, OR "Set Program Reset" mini-instruction;
INT32 (RESET)=Reset Program request signal, OR Program Request Status F/F (IPGRQ) set AND no higher level status F/F*s* set AND Manual Mode AND YSCON.

The general logical form for setting and resetting the above interrupts may be illustrated by means of the following example. The "Reset and hangs and requests" mini-instruction term for resetting INT19 is: RG17*x*·RGI*x*6·LMIS·KCP6. The RGI*xx* signals originate in a RGI decide circuit which will be discussed later, and in this example mean that a SOP code of 76 has been decoded. The LMIS means that a miscellaneous instruction performs this operation, and the KCP6 means the INT19 flip-flop 126 is reset at clock time six.

The Job In Progress (JIP*x*) flip-flops 127, 131, 135 and 140 (INT20, INT24, INT28, INT33) for any level are used to store the fact that the last request recognized by the scheduler at this level is still being serviced even though the servicing of such a request may have been temporarily interrupted by a hang condition. The JIP*x* flip-flops are set at KCP0 time by the same conditions that set the current operating level (ICON*x*) flip-flops 155 through 158 as will be discussed. The JIP flip-flops are reset as follows:

INT20 (RESET)=same as INT19 reset, OR Exit from Level 1;
INT24 (RESET)=same as INT19 reset, OR Exit from Level 2;
INT28 (RESET)=same as INT19 reset, OR Exit from Level 3;
INT33 (RESET)=same as INT19 reset, OR Exit from Level 4.

A hang is a condition initiated by a "miscellaneous" mini-instruction which indicates that the scheduler level currently in operation must be temporarily interrupted. The hang condition is useful, for example, in the emulation of certain input/output functions where an input/output operation cannot be initiated because some other input/output operation is already in progress. Due to the hang feature of the scheduler, the time which might be wasted in waiting for the first operation to finish can be utilized to service other requests. The hang flip-flop for any level can be set by the mini-instruction "0654*xx*" where the "06" specifies a miscellaneous mini-instruction, and the "54" specifies hang present level. The *xx* portion of the instruction is not used. Logically, this may be expressed as for any level "*n*" as HANG*n* (SET)=ICON*n*·RGI5X·RGIX4·LMIS·KCP6

In addition to the above logic, the level 4 hang flip-flop 142 may be set by the mini-instruction "0660*xx*" which means "set program halt and hang level 4." This mini-instruction is used to emulate halt instructions of other computers.

The same logic which sets the hang flip-flop for any level also sets the return flip-flop for that level, that is, RETURN, (SET)=HANG*n* (SET). Also, the decoding of the "hang current level" mini-instruction generates the signal YSTS by means of gate 175 (FIG. 6). The decoding of the "set program halt and hang level 4" also generates YSTS by means of gate 176. The YSTS signal starts the wired-in-sequence at state YS0.

The wired-in-sequence proceeds from states YS0 through YS5, storing the contents of certain registers in control memory, as will be explained in the discussion of the wired-in-sequence 44. When the operation is complete, the signal LSCON is generated which sets the YSCON flip-flop (FIG. 7) which returns control to the scheduler, but does not reset the job-in-progress (JIP) flip-flop for the level currently in operation. The job-in-progress flip-flop is usually reset by the signal LEXIT which means exit from current level. Observe on FIGS. *5a* and *5b* that if for any level the hang flip-flop is set and the job-in-progress flip-flop is also set, no status flip-flop for that level can be set at KCP4 time. Thus, any request for a level which has been "hung" is "locked out" temporarily. The signal YSCON will reset the current operating level flip-flop ICON*x* at KCP7 time, and if a request for some other level or levels is stored in the status flip-flops, the appropriate ICON*x* flip-flop will be set at KCP0 time. The level which was "hung" will be ignored by the scheduler until the hang flip-flop for that level is reset. The hang flip-flop for any level is usually reset at some point in time when an emulator routine detects conditions which make it appropriate to continue the emulator program which caused the hang condition. For example, assume that an I/O emulation program at level 2 cannot be continued because of an I/O operation already in progress, so that hang 2 flip-flop 133 is set which also sets the return 2 flip-flop 132 and control passes to the scheduler as previously described. Later, an emulator routine may be entered, for example as the result of a terminate request, which detects that the I/O operation which was in progress has been completed. This routine may then issue a mini-instruction to reset the hang 2 flip-flop 133. When this is done, the level 2 return status flip-flop 147 will be set at KCP4 time by means of gate 163 (FIG. *5a*) since the JIP2 flip-flop 131 and return 2 flip-flop 132 are both set and the hang flip-flop 133 is now reset.

The next time the scheduler regains control, the return from level 2 which is now stored in the status flip-flop 147 will be recognized because level 1 requests are blocked out or interlocked when channel 2 is in a hang condition and, thus, level 2 is the highest priority level at this time.

In reference to the interlock feature, assume that the scheduler has been reset by the SRES and SPRES signals and that no requests (interrupts INT*xx*) are present. Inasmuch as no requests are present, the status flip-flops will not be loaded at KCP4, and therefore none of the ICON flip-flops will be set even though the signal YSCON is true, and YSCON flip-flop having been set by the SPRES signal. Also assuming a channel 1 buffer request occurs, the flip-flop 126 is true, and the flip-flops 127 and 128 are false thereby allowing the channel 1 buffer service status flip-flop 144 to be set at KCP4. At the following KCP0 the ICON1 flip-flop 155 will be set. The signal LSCON also will be true, having been generated by the logic in FIG. 13. The true output of the status flip-flop 144 will be gated by the gate 174 and the LSCON signal thereby generating signal YSTB which causes the wired-in-sequence to enter state YB0, ultimately ending up in sequence state YB5 where an emulator routine may be executed. Now, assuming that this emulator program has a miscellaneous mini-instruction "hang current level" which has been executed, the instruction will cause the hang 1 flip-flop 129 to be set and the save sequence of the wired-in-sequence will be entered. It should be noted that the JIP1 flip-flop 127 is true and prevents any channel 2 requests from setting the status flip-flop 146 through gate 162. Since level 2 has not been in operation during this example, the JIP2 flip-flop 131 will be off which prevents the level 2 return status flip-flop 147 from being set. Accordingly, all the level 2 status flip-flops are reset and will remain so until the JIP1 flip-flop 127 is reset. When the entered save sequence is completed, the signal LSCON will be generated which will return control back to the scheduler which may at this time service any requests from levels 3 and 4. Level 1 is ignored because the JIP1 flip-flop 127 prevents any new buffer service request from setting the status flip-flop 144 through gate 160, and level 2 is locked out as described above. During the same emulator program being serviced in levels 3 or 4 a miscellaneous mini-instruction "reset buffer hang" may occur. This will cause the hang 1 flip-flop 129 to be reset which then allows the output of the return status flip-flop 145 to pass through gate 161 inasmuch as the JIP1 flip-flop 127 is set and the return 1 flip-flop 128 has been set as was discussed earlier. The next time the scheduler is again in control, level 1 will be re-entered because its return status is the highest priority signal present, and the return sequence of the wired in sequence will be entered, ultimately returning control to the emulator program which was interrupted in level 1. When this emulator program is completed, it will return control to the scheduler, e.g., by means of an exit mini-instruction (assuming no subroutine mode is in effect), and the JIP1 flip-flop 128 will be reset.

Similarly, level 1 may be locked out when a hang condition occurs in level 2. As is noted above, no level 2 status requests will be available as long as the JIP1 flip-flop 127 is set. Thus, it follows that if any level 2 request is honored by the scheduler, the JIP1 flip-flop 127 will be in the reset state. When level 2 is in operation, level 1 will be locked out, because the JIP2 flip-flop 131 (INT24) is set which inhibits any buffer service request (INT19–T) from passing through gate 160 into the channel 1 status flip-flop 144. Thus, a request from channel 1 will not reach the status flip-flop 144. Likewise, while channel 2 is in a hang condition the level 1 return flip-flop 145 cannot be set because in order to do so the JIP1 flip-flop 127 must be on and in this case the JIP1 flip-flop 127 must be in a reset state as explained above. Thus, it will be apparent that then level 1 is in a hang condition, level 2 is automatically locked out or ignored by the scheduler and vice versa.

Returning to the I/O emulation program example discussed above, in finishing the emulator routine which is servicing the terminate request, assume that an exit mini-instruction is the last instruction of the routine and that subroutine mode is not in effect. The decoding of the exit mini-instruction ultimately generates the signal LSCON which returns control to the scheduler. Since all of the status flip-flops 144, 145 and 146 are reset and the level 2 return status flip-flop 147 is set (true), the output of gate 171 is true and will pass through gate 172 since signal LSCON is "on," thereby generating the signal YSTR. At KCP6 time, the signal YSTR will set the first rank of the YRET flip-flop in FIG. 9 (this flip-flop as well as the other flip-flops in FIG. 9 will be discussed shortly in the description of the wired-in-sequence). This signal YSTR also sets the first rank of the Y0 flip-flop in FIG. 9. Additionally, at the KCP6 time, the YSCON flip-flop (FIG. 7) is set by the LSCON signal. At KCP7 time, the YSCON signal resets all of the ICON flip-flops 155–158 in FIGS. *5a–5b*. Only one ICON flip-flop can be set at one time, and in this case (since a terminate request is being serviced) only ICON3 was on in this example and thus is reset at KCP7 time.

Immediately following, at KCP0 time, the YSCON signal gates the output of the gate 171 through the gate 173 which in turn sets the ICON2 flip-flop 156. At the same KCP0 time, the first rank of the YRET and first rank of the Y0 flip-flops in FIG. 9 will be gated into the second rank thereof thereby starting the wired-in-sequence at state YR0 which restores the register previously saved, finally ending up in wired-in-sequence state YB5 at which point the emulator routine which had been temporarily interrupted will continue where it left off. Control will then be returned to the scheduler when an exit condition occurs in the emulator routine. Further details of the actions taken in the return portion of the wired-in-sequence states will be described subsequently.

Hang flip-flops 1, 2, and 3 (129, 133 and 137) may be reset by the same logic that resets the request flip-flops, e.g., the same resets as INT19 (flip-flop 126). In addition, the miscellaneous mini-instruction "0662*xx*" termed "reset buffer hang" will reset the hang 1 flip-flop 129 (INT22) if the CHBC flip-flop (which is described subsequently) is reset (false), and this instruction will reset the hang 2 flip-flop 133 (INT26) if the CHBC flip-flop is set. The "06" in the instruction means that this instruction is a miscellaneous POP code, the "62" means to reset buffer hang, and the "*xx*" is not used. The hang 3 flip-flop 137 (INT30) may be reset by miscellaneous instruction "0666*xx*." The "66" means "reset terminate hang." The hang 4 flip-flop 142 (INT35) may be reset in several ways. It may be reset by the console reset switch. It also may be reset by three mini-instructions. It will be reset by the miscellaneous mini-instruction "0674*xx*," wherein "74" means "reset level 4." Miscellaneous instruction "0670*xx*" will reset this flip-flop wherein "70" means "reset hang 4 if halt flip-flop is reset." The hang 4 flip-flop also will be reset by miscellaneous mini-instruction "0676*xx*" wherein "76" means "reset all hangs and requests." However, this instruction will not reset certain interrupts, including the hang 4 flip-flop unless the halt flip-flop is reset. The hang 4 flip-flop also will be reset when the console start switch is pressed if the halt flip-flop is set.

The return flip-flops (INT21, INT25, INT29, INT34) for any level are used to store the fact that the current level had to be temporarily interrupted and must be resumed at a later time. The return flip-flop for any level "*n*" is set by the same logic as the hang flip-flop for that level, that is, RETURN*n* (SET)=HANG*n* (SET). As indicated in the logic of FIGS. *5a* and *5b*, the return request for any level cannot be stored in the status flip-flops if the hang flip-flop of the same level is set. In addition, the return flip-flops for levels 1, 2, and 3 (INT21, INT25, and INT29) may also be set by a "delay" mini-instruction, "54NN*xx*" where the "NN" may be any octal number except 04, 05, or 21 and the "*xx*" is not used. The execution of this delay mini-instruction generates the signal LNSI which generates the signal YSTS by means of the AND gate 177 in FIG. 6 causing the wired-in-sequence save sequence (YS0-YS5) to be performed. Upon completion of YS5, the signal LSCON is generated which sets the YSCON flip-flop (see FIG. 7) returning control to the scheduler. The scheduler then has a period of approximately 100 microseconds in which it may service requests if any are present. Note as above, if the delay occurred in level 2, level 1 will be locked out and vice versa. In about 100 microseconds after the time the delay instruction was executed, the signal IDEL1 for levels 1 and 2; and the signal IDEL3 for level 3 will occur, genreated by timing circuitry. The IDEL1 signal will set the return request flip-flop 128 for level 1 if the delay occurred in level 1, or will set the return request flip-flop 132 for level 2 if the delay occurred in level 2. The IDEL3 signal sets the return flip-flop 136 for level 3. The return status flip-flop for whichever level was temporarily interrupted by the delay is now set at KCP4 time, and the scheduler services this request whenever there are no higher priority requests stored in the status flip-flops when YSCON occurs. The signal YSTR is generated by any one of the return status flip-flops 145, 147, 150, and 153, being set in combination with the signal LSCON, and the return sequence of the wired-in-sequence is entered which has been described previously.

The four ICON flip-flops 155 through 158 determine which scheduler control level is to be serviced next, and are reset and set by the following general logic:

RESET=YSCON·KCP7

SET=YSCON·KCP0·(RETURN STATUS+REQUEST STATUS·(NO HIGHER LEVEL REQUESTS OR RETURNS)

The YSCON signal is generated by an exit condition which is to be described subsequently. Each of the return status flip-flops 145, 147, 150, and 153 has the highest priority within its respective level. The various status flip-flops within a level have a priority according to the level, e.g., the status flip-flops 144 and 145 in level 1 have a higher priority than the status flip-flops 146 and 147 in level 2. For example, the level 3 status flip-flops 148, 149 or 150 being set still will not enable this level to be serviced if any status flip-flop is set in level 1 or 2. The following is the priority of the status flip-flops starting with the flip-flop of highest priority and proceeding in the descending order: Level 1 return flip-flop 145, channel 1 buffer service flip-flop 144; level 2 return flip-flop 147, channel 2 buffer service flip-flop 146; level 3 return flip-flop 150, terminate flip-flop 148, and console flip-flop 149; and level 4 return flip-flop 153, trap flip-flop 151 and program flip-flop 152.

The program halt flip-flop (IHALT) is included in the console request circuit in FIG. 3*b*, and is set when a miscellaneous mini-instruction "0660*xx*" has been decoded. This instruction means "set program halt and hang level 4." The set logic for this flip-flop is:

IHALT=LMIS·KCP6·RGI6X·RGIX0

The reset logic is:

$\overline{\text{IHALT}}$=KCP0·YSCON·(ITRAP+IPGRQ+IRET4)

It should be noted that the TNONE signal input to the gate 165 in level 3 (FIG. 5*b*) is a signal from the console which indicates that no console request switch is on. The ISCRQ signal input to the gate 165 is an output of the console request circuit in FIG. 3*b* and indicates that a console request switch is on. The console request circuit in FIG. 3*b* includes seven console request flip-flops which indicate there is an unserviced request from the console. The outputs of these flip-flops are ORed together giving the signal ISCRQ which is sent to the scheduler. The seven console request flip-flops are set by the console reset switch, clear switch, load card switch, load tape switch, entry switch, display switch, and internal timer, respectively. The general reset logic is:

RESET=SRES+LMIS·RGI7X·RGIX2·KCP6

The SRES term of this equation is from a machine reset switch. The remainder of the reset equation means the request flip-flops are reset by the miscellaneous mini-instruction "0672*xx*." The scheduler console request flip-flops are identified below:

| Switch | Description | Flip-flops |
|---|---|---|
| TKIT | Internal timer | INT08 |
| SPRES | Reset | INT09 |
| TCLR | Clear | INT10 |
| TLDC | Load card | INT11 |
| TLDT | Load tape | INT12 |
| TENTR | Entry | INT13 |
| TDIS | Display | INT14 |

The console request circuit in FIG. 3*b* also includes the postpone trap flip-flop and timing circuitry which generates the signals IDEL1 and IDEL3 which are used with the delayed return which was discussed earlier.

The IPPTR–F signal input to the gate 167 in level 4 is the false output of the postpone trap flip-flop. The AUTO input to the gate 167 is the inverse of the TMAN signal from the console. The latter is generated when the auto/manual switch is in the manual position. The AUTO signal, when true, means that the machine is in the automatic mode.

The scheduler has three general reset terms, which are:

Machine reset (SRES) from the maintenance panel will reset the major elements in all four scheduler priority levels.

Certain elements are also reset by the reset key on the operator's console (SPRES). The flip-flops affected by SPRES–T are:

(1) Interrupt 21, Dam Return;
(2) Interrupt 29, Terminate Return;
(3) Interrupt 31, Channel Trap;
(4) Interrupt 32, Program Request;
(5) Interrupt 33, Program Job-In-Progress;
(6) Interrupt 34, Program Return; and
(7) Interrupt 35, Program Hang.

A general reset is initiated by the use of the miscellaneous POP code 06 with the RINT SOP code 17, which resets all hangs and requests. This instruction will reset all major elements except channel trap, program request, program job-in-progress, and program return.

Generally speaking, the various requests are set by an emulator instruction or the channel hardware. The requests are then recognized by the scheduler, and some wire sequence control state is enabled.

The wired-in-sequence 44 (FIG. 3*a*) is a hardware implementation of certain "housekeeping" subroutines which take care of, for example, fetching the instruction to be emulated and performing indexing and indirect addressing functions. By performing such functions in this manner instead of via an emulator routine in control memory 42, the overall speed of the emulation process is increased, and control memory space is conserved. Also, during the time the wired-in-sequence 44 is in control, the instruction of the machine being emulated is decoded by means of the translators 45 (FIG. 3*f*) and the starting address of the "soft" emulator routine is determined through the entry table in control memory 42. This feature provides the needed flexibility in the emulator program memory allocation, and the ease by which emulator subroutines may be changed.

The wire-in-sequence contains four subroutines or cycles including six steps each. These sequences are YS (Save), YR (Restore), YA (Instruction Fetch), and YB (Operand Fetch) as shown in flow diagram form in FIGS. 8*a*–8*b*. Depending on the type of request which the scheduler 43 has honored, control will be passed to state zero of one of the above sequences. From there, the sequence is stepped from one state to another, although not necessarily in a sequential manner. Sometimes steps are skipped within a sequence and control may be passed from one sequence to another. The various cycles and the operations which are performed during the individual sequence steps are described below.

When the program request is honored by the scheduler 43, control is passed to the YA0 step (FIG. 14*a*) of the wired-in-sequence. The purpose of the YA portion (note FIG. 8*a*) of the wired-in-sequence is to fetch the instruction to be emulated from main memory, decode it, and perform indexing and indirect address operations.

In the YA0 step (FIG. 14*a*) the address pointing to the instruction in main memory to be interpreted is loaded into main engine register PB (FIG. 3*f*) from any one of the three instruction counter registers, namely the IC (FIG. 3*e*), AUX1 and AUX2 registers. The AUX registers are in the control memory core storage unit 68. Normally the address is loaded from the IC register. The AUX1 and AUX2 registers are used when trap conditions exist. If the YAUX1 flip-flop (FIG. 11) is set, a XEC (non I/O) trap condition exists, and the AUX1 register will be loaded into the PB register. If the YAUX2 flip-flop is set, an I/O trap condition exists. In this latter case, the AUX2 register will be used as the address source, unless the YAUX1 flip-flop is set in which case the AUX1 register will be used. If neither the YAUX1 or YAUX2 flip-flop is set, the IC register will be used. The AUX1 and AUX2 registers are loaded by emulator routines. Control is passed to the YA1 step.

In the YA1 step (FIG. 14*b*), the instruction addressed by register PB is fetched from main memory 11 and loaded into main engine registers PC and PD. Control is passed to step YA2.

In the YA2 step (FIG. 14*c*), the operation code of the instruction located in the PD register is decoded by the translators. As a result of the decoding, the entry word corresponding to the classification of the instruction is brought from the control memory entry table and loaded into mini-engine registers RB. The most significant seven bits of this entry word contain information which sets the LK flip-flops shown in FIG. 10. The entry word from the control memory is sent over the main buss 50 and the seven most significant bits (PMB18–24) are sent to the wired-in-sequence and loaded into the LK flip-flops. The remaining eleven bits (PMB25–35) are loaded into the register RB. The seven bits are applied through AND gates (FIG. 10) to the set inputs of the LK flip-flops along with the output of an AND gate 182. The inputs to this gate are the KPC6 clock pulse, a combination of signals indicating state YA2 (YA–T and Y2–T) which come from the general flip-flops in FIG. 9, and a job one signal (LJB1–T) which esesntially is a timing pulse from mini-control (FIG. 3*a*). The gate 183 on the set input of the LK3 flip-flop includes additional inputs pertaining to indirect addressing and transfer. The inputs PD12–T and PD13–T are from bit positions 12 and 13 of the PD register and are a part of the instruction being emulated which indicates that indirect addressing must take place. If these bits are not present (false), the bit from the entry table (PMB20) which indicates that indirect addressing is possible will be inhibited from setting LK3. When the LK3 flip-flop is reset, the wired-in-sequence will skip steps YA4 and YA5 which are concerned with indirect addressing. The LILK3 signal will also inhibit the setting of the LK3 flip-flop if this signal is false. This signal is false if a transfer instruction is decoded and the transfer trap mode indicator (general indicator PIG40) is set thereby indicating that indirect addressing is not to be performed in order to emulate this mode on a well-known second generation computer. The LK flip-flops are reset from the output of a gate 184 at KCP2 time in accordance with the remaining inputs to this gate which have been described. The LJTY–T input to the reset input of the LK4 flip-flop is generated as a result of decoding a TAW instruction which will be discussed shortly.

The LK flip-flops are subsequently used to control skipping of sequence steps within the wired-in-sequence to follow. The general control flip-flops (FIG. 9) are set by the translators during this step YA2. Control is then passed to step YA3.

Turning for the moment to the translators (FIG. 3*f*), the inptus to translator A come directly from the PD register which contains the instruction being emulated. The operation code of the instruction is decoded by the translator A, and one of a possible 77 octal group codes is generated. Instructions are grouped according to the type of emulator routine which is necessary to complete the emulation of the instruction. More than one instruction may belong to a group. Table A below gives the group codes for the instructions of a well-known second generation data processing machine. The group code is combined with other bits to form an address ranging from 200–277 (octal) which is sent over the main buss 50 to the address register 67 in the control memory 42. This address is used to fetch a word from the control memory entry table which resides in mini-locations 200–277. The entry word will be described subsequently. The group code is sent in another form to translator B.

TABLE A

| Instruction emulated | | Translator A, group code | General control flip/flops | | | | | | | |
|---|---|---|---|---|---|---|---|---|---|---|
| Mnemonic | Octal | | SUB | MAG | GOP09 | GOP10 | GOP11 | GEX | GIN | ARI |
| HTR | 0000 | 00 | 0 | 0 | 0 | 1 | 0 | 0 | 0 | 0 |
| HTR | 0000 | 00 | 0 | 0 | 0 | 1 | 0 | 0 | 0 | 0 |
| TIX | 2000 | 01 | 0 | 0 | 0 | 0 | 0 | 1 | 0 | 0 |
| TNX | 6000 | 01 | 0 | 0 | 0 | 0 | 1 | 1 | 0 | 0 |
| TXH | 3000 | 01 | 0 | 0 | 0 | 0 | 0 | 1 | 1 | 0 |
| TXL | 7000 | 01 | 0 | 0 | 0 | 0 | 1 | 1 | 1 | 0 |
| PAI | 0044 | 04 | 0 | 0 | 0 | 0 | 0 | 0 | 0 | 0 |
| IIA | 0041 | 04 | 0 | 0 | 0 | 0 | 1 | 0 | 0 | 0 |
| RIA | 4042 | 04 | 0 | 0 | 1 | 1 | 0 | 0 | 0 | 0 |
| OAI | 0043 | 04 | 0 | 0 | 1 | 0 | 1 | 0 | 0 | 0 |
| IIR | 0051 | 05 | 0 | 0 | 1 | 0 | 0 | 0 | 0 | 0 |
| IIL | 4051 | 05 | 0 | 0 | 0 | 0 | 1 | 1 | 0 | 0 |
| RFT | 0054 | 05 | 0 | 0 | 1 | 0 | 0 | 0 | 0 | 0 |
| LFT | 4054 | 05 | 0 | 0 | 1 | 0 | 0 | 1 | 0 | 0 |
| SIR | 0055 | 05 | 0 | 0 | 1 | 0 | 1 | 0 | 0 | 0 |
| RNT | 0056 | 05 | 0 | 0 | 1 | 1 | 0 | 0 | 0 | 0 |
| LNT | 4056 | 05 | 0 | 0 | 1 | 1 | 0 | 1 | 0 | 0 |
| RIR | 0057 | 05 | 0 | 0 | 1 | 1 | 0 | 0 | 0 | 0 |
| RIL | 4057 | 05 | 0 | 0 | 1 | 1 | 1 | 1 | 0 | 0 |
| TCOA | 0060 | 06 | 0 | 0 | 1 | 1 | 0 | 0 | 0 | 0 |
| TCOB | 0061 | 06 | 0 | 0 | 0 | 1 | 1 | 0 | 0 | 0 |
| TCNA | 4060 | 06 | 0 | 0 | 1 | 0 | 0 | 0 | 0 | 0 |
| TCNB | 4061 | 06 | 0 | 0 | 0 | 0 | 1 | 0 | 0 | 0 |
| TSX | 0074 | 07 | 0 | 0 | 0 | 0 | 0 | 0 | $\overline{\text{YAUX}}$ 1 | 0 |
| CVR | 0114 | 11 | 0 | 0 | 0 | 0 | 0 | 1 | 0 | 0 |
| XCA | 0131 | 13 | 0 | 0 | 0 | 0 | 0 | 0 | 0 | 1 |
| XCL | 4130 | 13 | 0 | 0 | 0 | 0 | 0 | 0 | 0 | 0 |
| CAQ | 4114 | 15 | 0 | 0 | 0 | 0 | 0 | 1 | 1 | 0 |
| CRQ | 4154 | 15 | 0 | 0 | 0 | 0 | 0 | 1 | 0 | 0 |
| TXI | 1000 | 17 | 0 | 0 | 0 | 0 | 0 | 1 | 0 | 0 |
| MPY | 0200 | 20 | 0 | 0 | 0 | 0 | 0 | 1 | 0 | 1 |
| MPR | 4200 | 20 | 0 | 0 | 0 | 0 | 1 | 1 | 0 | 0 |
| VLM | 0204 | 20 | 0 | 0 | 0 | 0 | 0 | 1 | 1 | 1 |

TABLE A.—Continued

| Instruction emulated | | Translator A, group code | General control flip/flops | | | | | | | |
|---|---|---|---|---|---|---|---|---|---|---|
| Mnemonic | Octal | | SUB | MAG | GOP09 | GOP10 | GOP11 | GEX | GIN | ARI |
| HTR | 0000 | 00 | 0 | 0 | 0 | 1 | 0 | 0 | 0 | 0 |
| DVP | 0221 | 22 | 0 | 0 | 0 | 0 | 1 | 1 | 0 | 0 |
| DVH | 0220 | 22 | 0 | 0 | 0 | 0 | 0 | 1 | 0 | 0 |
| VDP | 0225 | 22 | 0 | 0 | 0 | 0 | 1 | 1 | 1 | 0 |
| VDH | 0224 | 22 | 0 | 0 | 0 | 0 | 0 | 1 | 1 | 0 |
| FDH | 0240 | 24 | 0 | 0 | 0 | 0 | 0 | 0 | 1 | 1 |
| FDP | 0241 | 24 | 0 | 0 | 0 | 0 | 0 | 0 | 0 | 1 |
| DFDP | 4241 | 25 | 0 | 0 | 0 | 0 | 0 | 0 | 0 | 1 |
| DFDH | 4240 | 25 | 0 | 0 | 0 | 0 | 0 | 0 | 1 | 1 |
| FMP | 0260 | 26 | 0 | 0 | 0 | 0 | 0 | 0 | 0 | 1 |
| JFM | 4260 | 26 | 0 | 0 | 1 | 0 | 0 | 0 | 0 | 1 |
| DFMP | 0261 | 27 | 0 | 0 | 0 | 0 | 0 | 0 | 0 | 1 |
| DUFM | 4261 | 27 | 0 | 0 | 1 | 0 | 0 | 0 | 0 | 1 |
| FAD | 0300 | 30 | 0 | 0 | 0 | 0 | 0 | 0 | 0 | 1 |
| FAM | 0304 | 30 | 0 | 1 | 0 | 0 | 0 | 0 | 0 | 1 |
| UFA | 4300 | 30 | 0 | 0 | 0 | 0 | 1 | 0 | 0 | 1 |
| FSB | 0302 | 30 | 1 | 0 | 0 | 0 | 0 | 0 | 0 | 1 |
| UAM | 4304 | 30 | 0 | 1 | 0 | 0 | 1 | 0 | 0 | 1 |
| FSM | 0306 | 30 | 1 | 1 | 0 | 0 | 0 | 0 | 0 | 1 |
| UFS | 4302 | 30 | 1 | 0 | 0 | 0 | 1 | 0 | 0 | 1 |
| USM | 4306 | 30 | 1 | 1 | 0 | 0 | 1 | 0 | 0 | 1 |
| DFAD | 0301 | 31 | 0 | 0 | 0 | 0 | 0 | 0 | 0 | 1 |
| DFAM | 0305 | 31 | 0 | 1 | 0 | 0 | 0 | 0 | 0 | 1 |
| DUFA | 4301 | 31 | 0 | 0 | 0 | 0 | 1 | 0 | 0 | 1 |
| DFSB | 0303 | 31 | 1 | 0 | 0 | 0 | 0 | 0 | 0 | 1 |
| DUAM | 4305 | 31 | 0 | 1 | 0 | 0 | 1 | 0 | 0 | 1 |
| DFSM | 0307 | 31 | 1 | 1 | 0 | 0 | 0 | 0 | 0 | 1 |
| DUFS | 4303 | 31 | 1 | 0 | 0 | 0 | 1 | 0 | 0 | 1 |
| DUSM | 4307 | 31 | 1 | 1 | 0 | 0 | 1 | 0 | 0 | 1 |
| ERA | 0322 | 32 | 0 | 0 | 0 | 0 | 1 | 0 | 1 | 0 |
| ANA | 4320 | 32 | 0 | 0 | 1 | 0 | 0 | 0 | 0 | 0 |
| ORA | 4501 | 32 | 1 | 0 | 1 | 0 | 1 | 0 | 0 | 0 |
| CAS | 0340 | 34 | 0 | 0 | 0 | 0 | 0 | 0 | 0 | 1 |
| LAS | 4340 | 34 | 0 | 0 | 0 | 0 | 0 | 0 | 0 | 0 |
| TLQ | 0040 | 35 | 0 | 0 | 0 | 0 | 0 | 0 | 0 | 1 |
| AXT | 0774 | 37 | 0 | 0 | 0 | 0 | 0 | 0 | 1 | 0 |
| AXC | 4774 | 37 | 0 | 0 | 0 | 0 | 0 | 0 | 0 | 0 |
| ADD | 0400 | 40 | 0 | 0 | 0 | 0 | 0 | 0 | 0 | 1 |
| ADM | 0401 | 40 | 0 | 1 | 0 | 0 | 0 | 0 | 0 | 0 |
| SUB | 0402 | 40 | 1 | 0 | 0 | 0 | 0 | 0 | 0 | 1 |
| SBM | 4400 | 40 | 1 | 1 | 0 | 0 | 0 | 0 | 0 | 0 |
| IIS | 0440 | 44 | 0 | 0 | 0 | 0 | 1 | 0 | 0 | 0 |
| LDI | 0441 | 44 | 0 | 0 | 0 | 1 | 0 | 0 | 0 | 0 |
| OSI | 0442 | 44 | 0 | 0 | 1 | 0 | 1 | 0 | 0 | 0 |
| OFT | 0444 | 44 | 0 | 0 | 1 | 0 | 0 | 0 | 1 | 0 |
| ONT | 0446 | 44 | 0 | 0 | 1 | 1 | 0 | 0 | 1 | 0 |
| RIS | 0445 | 44 | 0 | 0 | 0 | 1 | 1 | 0 | 0 | 0 |
| DLD | 0443 | 45 | 0 | 0 | 0 | 0 | 0 | 0 | 0 | 1 |
| CLA | 0500 | 50 | 0 | 0 | 0 | 0 | 0 | 0 | 0 | 1 |
| CAL | 4500 | 50 | 0 | 0 | 0 | 0 | 0 | 0 | 0 | 0 |
| CLS | 0502 | 50 | 1 | 0 | 0 | 0 | 0 | 0 | 0 | 1 |
| ZET | 0520 | 52 | 0 | 0 | 0 | 0 | 0 | 0 | 0 | 1 |
| NZT | 4520 | 52 | 0 | 0 | 0 | 0 | 1 | 0 | 0 | 1 |
| LXA | 0534 | 53 | 0 | 0 | 0 | 0 | 0 | 0 | 1 | 0 |
| LXD | 4534 | 53 | 0 | 0 | 0 | 0 | 0 | 1 | 1 | 0 |
| LAC | 0535 | 53 | 0 | 0 | 0 | 0 | 0 | 0 | 0 | 0 |
| LDC | 4535 | 53 | 0 | 0 | 0 | 0 | 0 | 1 | 0 | 0 |
| RCHA | 0540 | 54 | 0 | 0 | 1 | 1 | 0 | 0 | 0 | 0 |
| LCHA | 0544 | 54 | 0 | 0 | 1 | 0 | 0 | 0 | 0 | 0 |
| RCHB | 4540 | 54 | 0 | 0 | 0 | 1 | 1 | 0 | 0 | 0 |
| LCHB | 4544 | 54 | 0 | 0 | 0 | 0 | 1 | 0 | 0 | 0 |
| TIO | 0042 | 55 | 0 | 0 | 0 | 0 | 0 | 0 | 0 | 0 |
| TIF | 0046 | 55 | 0 | 0 | 1 | 0 | 0 | 0 | 0 | 0 |
| STO | 0601 | 60 | 0 | 0 | 0 | 0 | 0 | 0 | 1 | 1 |
| SLW | 0602 | 60 | 0 | 0 | 0 | 0 | 0 | 0 | 1 | 0 |
| STI | 0604 | 60 | 0 | 0 | 0 | 0 | 0 | 0 | 0 | 0 |
| ANS | 0320 | 61 | 0 | 0 | 1 | 0 | 0 | 0 | 0 | 0 |
| ORS | 4602 | 61 | 0 | 0 | 1 | 0 | 1 | 0 | 0 | 0 |
| SXA | 0634 | 63 | 0 | 0 | 0 | 0 | 0 | 0 | 1 | 0 |
| SXD | 4634 | 63 | 0 | 0 | 0 | 0 | 0 | 1 | 1 | 0 |
| SCA | 0636 | 63 | 0 | 0 | 0 | 0 | 0 | 0 | 0 | 0 |
| SCD | 4636 | 63 | 0 | 0 | 0 | 0 | 0 | 1 | 0 | 0 |
| SCHA | 0640 | 64 | 0 | 0 | 1 | 0 | 0 | 0 | 0 | 0 |
| SCHB | 4640 | 64 | 0 | 0 | 0 | 0 | 0 | 0 | 0 | 0 |
| (ALL) | 0760's | 66 | 0 | 0 | 0 | 0 | 0 | 0 | 0 | 0 |
| (ALL) | 4760's | 66 | 0 | 0 | 0 | 0 | 0 | 0 | 1 | 0 |
| DST | 4603 | 70 | 0 | 0 | 0 | 0 | 0 | 0 | 0 | 1 |
| STZ | 0600 | 71 | 0 | 0 | 0 | 0 | 0 | 0 | 0 | 0 |
| STQ | 4600 | 71 | 0 | 0 | 0 | 0 | 0 | 0 | 1 | 0 |
| PAX | 0734 | 73 | 0 | 0 | 0 | 0 | 0 | 0 | 1 | 0 |
| PDX | 4734 | 73 | 0 | 0 | 0 | 0 | 0 | 1 | 1 | 0 |
| PAC | 0737 | 73 | 0 | 0 | 0 | 0 | 0 | 0 | 0 | 0 |
| PDC | 4737 | 73 | 0 | 0 | 0 | 0 | 0 | 1 | 0 | 0 |
| PXA | 0754 | 75 | 0 | 0 | 0 | 0 | 0 | 0 | 1 | 0 |
| PXD | 4754 | 75 | 0 | 0 | 0 | 0 | 0 | 1 | 1 | 0 |
| PCA | 0756 | 75 | 0 | 0 | 0 | 0 | 0 | 0 | 0 | 0 |
| PCD | 4756 | 75 | 0 | 0 | 0 | 0 | 0 | 1 | 0 | 0 |
| RDS | 0762 | 76 | 0 | 0 | 0 | 0 | 1 | 0 | 0 | 0 |
| WRS | 0766 | 76 | 0 | 0 | 1 | 0 | 1 | 0 | 0 | 0 |
| BSR | 4764 | 76 | 0 | 0 | 1 | 0 | 0 | 0 | 0 | 0 |
| BSF | 4764 | 76 | 0 | 0 | 1 | 0 | 0 | 0 | 0 | 0 |
| WEF | 0770 | 76 | 0 | 0 | 0 | 0 | 0 | 0 | 0 | 0 |
| REW | 0772 | 76 | 0 | 0 | 0 | 0 | 0 | 0 | 0 | 0 |
| RUN | 4772 | 76 | 0 | 0 | 0 | 0 | 0 | 0 | 0 | 0 |
| SDN | 0776 | 76 | 0 | 0 | 1 | 0 | 0 | 0 | 0 | 0 |
| ALS | 0767 | 77 | 0 | 0 | 0 | 1 | 1 | 0 | 0 | 0 |
| ARS | 0771 | 77 | 0 | 0 | 0 | 1 | 0 | 0 | 1 | 0 |
| LLS | 0763 | 77 | 0 | 0 | 1 | 0 | 1 | 0 | 0 | 1 |
| LRS | 0765 | 77 | 0 | 0 | 1 | 0 | 0 | 0 | 0 | 0 |
| LGL | 4763 | 77 | 0 | 0 | 1 | 1 | 1 | 0 | 1 | 0 |
| LGR | 4765 | 77 | 0 | 0 | 1 | 1 | 0 | 0 | 1 | 0 |
| RQL | 4773 | 77 | 0 | 0 | 0 | 0 | 1 | 0 | 1 | 0 |
| NOP | 0761 | 77 | 0 | 0 | 0 | 0 | 0 | 0 | 0 | 0 |

Considering the translators B and C (FIG. 3*f*), the group code from the translator A and the operation code of the instruction being emulated from the PD register are used by the translator B to set the general control flip-flops (FIG. 3*f* and FIGS. 18 and 19*b*). There are eight of these flip-flops, two of which are located on the translator B (FIGS. 3*f* and 18) and the remaining six on the translator C (FIGS. 3*f* and 19*b*). The former two are the subtract (SUB) and magnitude (MAG) flip-flops. The function of the subtract flip-flop is to complement the sign of a word taken from the main memory when it is loaded into the PC register during wired-in-sequence state YB1. The magnitude flip-flop forces the sign of a word taken from the main memory to the same state as the subtract flip-flop when this word is loaded into the PC register during wired-in-sequence state YB1.

The remaining six general control flip-flops, along with the gates necessary to load these flip-flops from the translator B as well as auxiliary gates to load them from the main buss and to output the states thereof to the main buss, are contained in the translator C (FIG. 3 and FIG. 19*b*). These flip-flops are general operation control 9 (GOP09), general operation control 10 (GOP10), general operation control 11 (GOP11), general exchange (GEX), general inhibit (GIN), and arithmetic operation control (ARI). The translator C also contains the LTSAT flip-flop.

The general operation control flip-flops (GOP09–GOP11) are used individualy and in combination to (1) define variations in logic operations, e.g., AND, exclusive OR, when a main engine "do logical" SOP code is used. (2) control shifting operations when a main engine "do shift" SOP code is used, and (3) control skips in the emulator programs when arithmetic test instructions are used. These various instructions will be discussed in detail under a separate heading "mini-instructions." The settings of these flip-flops (as well as the GIN flip-flop) to define the variations in logic operations is set forth below. The mnemonic SOP codes define the operation which occur. The various codes are described in detail in the subsequent discussion of the various mini-instructions. The mini-instructions for which main engine logical SOP codes are valid are used, particularly main engine mini-instructions.

| General control F/F | | | Mnemonic | |
|---|---|---|---|---|
| GOP 09 | GOP 10 | GOP 11 | SOP code | Operation |
| 0 | 0 | 0 | B | C(PB) unaltered. |
| 0 | 0 | 1 | BEC | C(PB) exclusive ORed with C(PC). |
| 0 | 1 | 0 | C | (CPC) unaltered. |
| 0 | 1 | 1 | B.NC | C(PB) ANDed with $\overline{C(PC)}$. |
| 1 | 0 | 0 | B.C | C(PB) ANDed with C(PC). |
| 1 | 0 | 1 | BUC | C(PB ORed with C(PC). |
| 1 | 1 | 0 | NB.C | $\overline{C(PB)}$ ANDed with C(PC). |
| 1 | 1 | 1 | B.NC | C(PB) ANDed with $\overline{C(PD)}$. |

The settings of the general control flip-flops for control of shifting operations is identified below, and the mini-instructions used are described subsequently in the description of shift mini-instructions.

| General control F/F | | | Mnemonic | |
|---|---|---|---|---|
| GOP 09 | GOP 10 | GOP 11 | SOP code | Operation |
| 0 | 1 | 1 | B-L | Shift C(PB), bits 00-35 left. |
| 0 | 1 | 0 | B-R | Shift C(PB), bits 00-35 right. |
| 1 | 0 | 1 | BD-L | Shift C(PB), bits 00-35 and C(PD), bits 00-35, left as one register. |
| 1 | 1 | 1 | BD-L | (Same as preceding). |
| 1 | 0 | 0 | BD-R | Shift C(PB), bits 00-35, and C(PD), bits 00-35, right as one register. |
| 1 | 1 | 0 | BD-R | (Same as preceding). |
| 0 | 0 | 1 | D-ROT | Rotate C(PD), bits 00-35 left; bits shifted out of position 00 enter position 35. |
| 0 | 0 | 0 | NOP | No operation. |

Note, "C(PB)-," for example, means the contents of the PB register. The control skip operations are covered under the subsequent description of arithmetic test mini-instructions.

With respect to the GEX flip-flop, any data on the main buss 50 will be half-exchanged during the execution of certain emulator instructions provided the precondition bit (bit 6) of the mini-instruction is set to one and this flip-flop also is set.

The principal use of the GIN flip-flop is to disable or inhibit certain engine mini-instructions. All mini-instructions for which the GIN flip-flop is effective will functon as a "no operation" (NOP). For example, loading of registers PB, PC and PD may be inhibited. This may occur, for example, when an instruction requires the contents of the PB register to be added to the contents of the PC register, with the result being stored in the PB register. If the GIN flip-flop is on and the mini-instruction bit 6 is on, the addition takes place but the result does not return to the PB register. This allows an addition to be performed without disturbing the contents of the register to determine, for example, if an overflow occurs; or may be used to consume a required amount of time. If the GIN flip-flop has been set previously, the only thing necessary to make it effective is to have bit 6 of certain mini-instructions set to one. The GIN flip-flop may also be used for skip control.

The arithmetic control flip-flop (ARI) is used to control the sign of information transferred between main memory 11 and the PB, PC, or PD registers; or between these registers and the AC or MQ registers. When the ARI flip-flop is set and one of the main engine registers is loaded from memory, for example, bit zero of the receiving register is forced to zero and the sign bit from memory goes into the sign flip-flop of the register. This and the remaining cases are illustrated in FIGS. 16*a*–16*b*.

The test satisfied flip-flop (LTSAT) is in the translator C (see FIG. 19*a*). This flip-flop is set during any of the emulator operations in which an arithmetic or indicator test is made and the conditions of the test are satisfied. These tests will be described later when the specific mini-instructions are discussed. It may also be set during the operation of the wired-in-sequence if a "fast transfer" occurs.

The control memory entry table resides in mini-locations 200–277 in the control memory 42. The last two octal digits of the address of an entry word correspond to the group code (Table A) generated by translator A. The entry table is made up of 64 18-bit words having a format shown in FIG. 17. See also Table B below. When a word from the entry table is fetched during YA2, the seven most significant bits are loaded into the LK flip-flops to control subsequent wired-in-sequence operations, and the remaining bits are loaded into the RB register (mini-instruction counter) as the starting address of the emulator routine necessary to complete the emulation.

TABLE B

| Translator A | Control memory | Entry word | | | | | | | |
|---|---|---|---|---|---|---|---|---|---|
| Group code | Entry table address | LK1 Bit 0 | LK2 Bit 1 | LK3 Bit 2 | LK4 Bit 3 | LK5 Bit 4 | LK6 Bit 5 | LK7 Bit 6 | Mini flow starting address bits 07-17 (octal) |
| 00 | 200 | 1 | 1 | 1 | 1 | | | 1 | 1000 |
| 01 | 201 | | | | 1 | | | 1 | 1020 |
| 02 | 202 | 1 | 1 | 1 | | | | 1 | 2714 |
| 03 | 203 | 1 | 1 | 1 | | | 1 | 1 | 2714 |
| 04 | 204 | | | | | | | | 1276 |
| 05 | 205 | | | | | | | | 1040 |
| 06 | 206 | 1 | 1 | 1 | 1 | | | 1 | 2676 |
| 07 | 207 | | | | 1 | | | 1 | 1030 |
| 10 | 210 | 1 | 1 | 1 | | | | 1 | 2714 |
| 11 | 211 | | | | | | | | 1100 |
| 12 | 212 | 1 | 1 | 1 | 1 | | | 1 | 1000 |
| 13 | 213 | | | | | 1 | 1 | | 1660 |
| 14 | 214 | | | | | | | | 1000 |
| 15 | 215 | | | | | | | 1 | 1124 |
| 16 | 216 | | | | | | | | 1000 |
| 17 | 217 | | | | 1 | | | 1 | 1012 |
| 20 | 220 | 1 | 1 | 1 | 1 | | | | 1156 |
| 21 | 221 | | | | | | | | 1151 |
| 22 | 222 | 1 | 1 | 1 | 1 | 1 | | | 1252 |
| 23 | 223 | | | | | | | | 1050 |
| 24 | 224 | 1 | 1 | 1 | 1 | 1 | | | 1301 |
| 25 | 225 | 1 | 1 | 1 | | 1 | | | 2130 |
| 26 | 226 | 1 | 1 | 1 | 1 | | 1 | | 1762 |
| 27 | 227 | 1 | 1 | 1 | | | | | 1202 |
| 30 | 230 | 1 | 1 | 1 | 1 | 1 | | | 1373 |
| 31 | 231 | 1 | 1 | 1 | | 1 | | | 2026 |
| 32 | 232 | 1 | 1 | 1 | 1 | 1 | | | 1051 |
| 33 | 233 | | | | | | | | 2626 |
| 34 | 234 | 1 | 1 | 1 | 1 | 1 | | | 1662 |
| 35 | 235 | 1 | 1 | 1 | 1 | | | 1 | 1034 |
| 36 | 236 | 1 | 1 | 1 | 1 | 1 | | | 1670 |
| 37 | 237 | | | | | | | | 1672 |
| 40 | 240 | 1 | 1 | 1 | 1 | 1 | | | 1674 |
| 41 | 241 | | | | | | | | 3423 |
| 42 | 242 | | | | | | | | 1000 |
| 43 | 243 | | | | | | | | 1000 |
| 44 | 244 | 1 | 1 | 1 | 1 | | | | 1044 |
| 45 | 245 | 1 | 1 | 1 | | | | | 1676 |
| 46 | 245 | 1 | 1 | 1 | 1 | | | | 1512 |
| 47 | 247 | 1 | 1 | 1 | 1 | 1 | | | 1552 |
| 50 | 250 | 1 | 1 | 1 | 1 | | | | 1473 |
| 51 | 251 | | | | | | | | 2724 |
| 52 | 252 | 1 | 1 | 1 | 1 | | | | 1356 |
| 53 | 253 | | | | | | | | 1362 |
| 54 | 254 | 1 | 1 | 1 | | | | | 2336 |
| 55 | 255 | 1 | 1 | 1 | 1 | 1 | | 1 | 1015 |
| 56 | 256 | 1 | 1 | 1 | 1 | | | | 1471 |
| 57 | 257 | 1 | 1 | 1 | 1 | | | | 2564 |
| 60 | 260 | 1 | 1 | 1 | | 1 | | | 1720 |
| 61 | 261 | 1 | 1 | 1 | 1 | 1 | | | 1724 |
| 62 | 262 | 1 | 1 | 1 | 1 | 1 | | | 1726 |
| 63 | 263 | | | | | | | | 1730 |
| 64 | 264 | 1 | 1 | 1 | | | | | 1734 |
| 65 | 265 | 1 | 1 | 1 | 1 | | | | 1755 |
| 66 | 266 | 1 | | | | 1 | | | 1454 |
| 67 | 267 | 1 | 1 | 1 | 1 | 1 | | | 1760 |
| 70 | 270 | 1 | 1 | 1 | | 1 | 1 | | 1716 |
| 71 | 271 | 1 | 1 | 1 | | | 1 | | 1274 |
| 72 | 272 | 1 | 1 | 1 | | | | | 1122 |
| 73 | 273 | | | | | | | | 1345 |
| 74 | 274 | 1 | 1 | 1 | 1 | 1 | | | 1350 |
| 75 | 275 | | | | | | | | 1352 |
| 76 | 276 | | 1 | | | | | | 2230 |
| 77 | 277 | 1 | 1 | | | 1 | 1 | | 1365 |

Figure 14A:
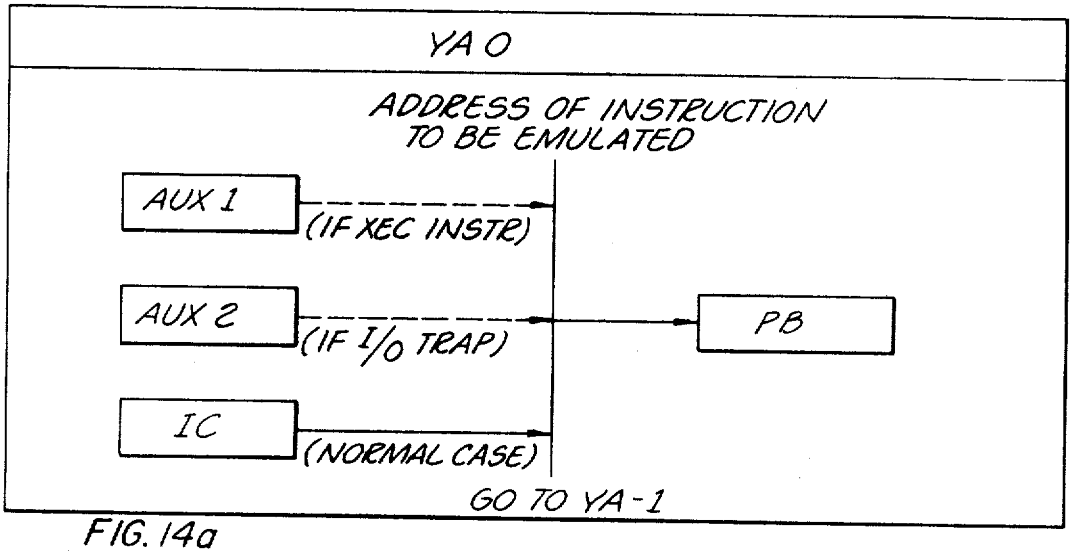
Figure 14B:
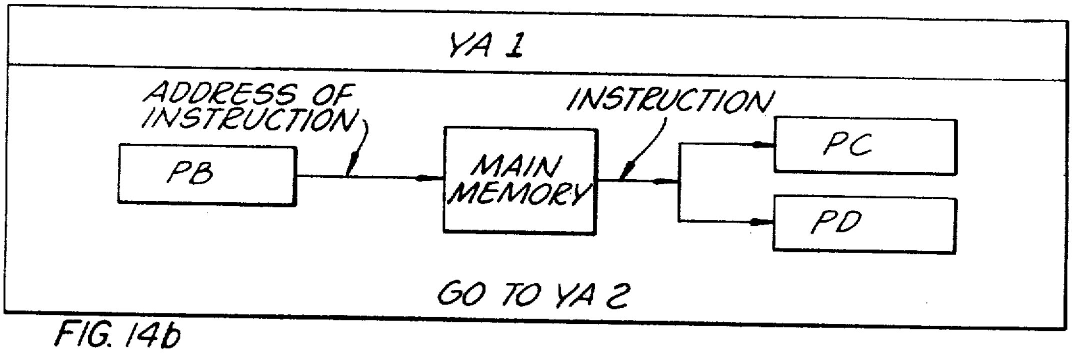
Figure 14C:
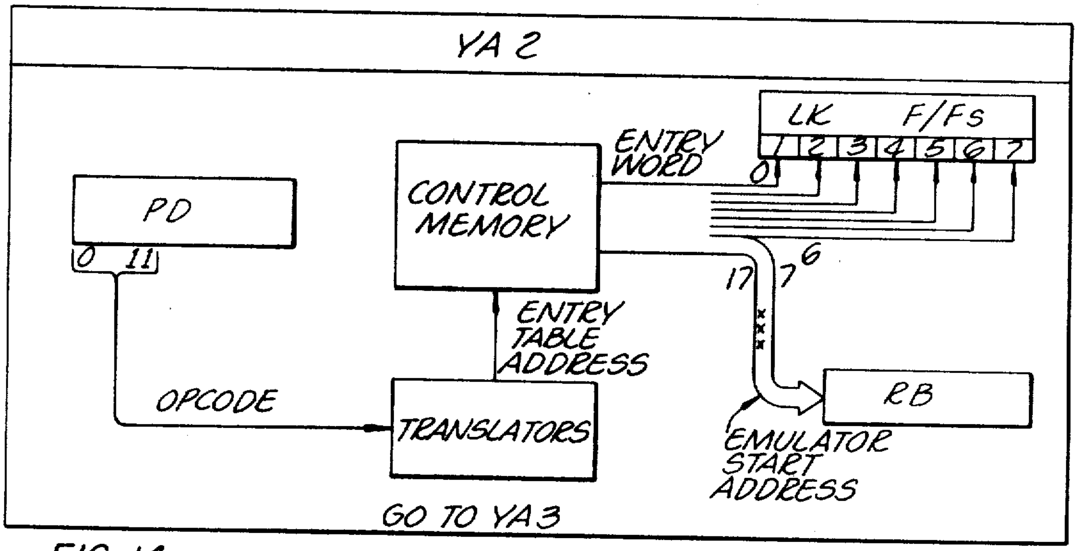
Figure 14D:
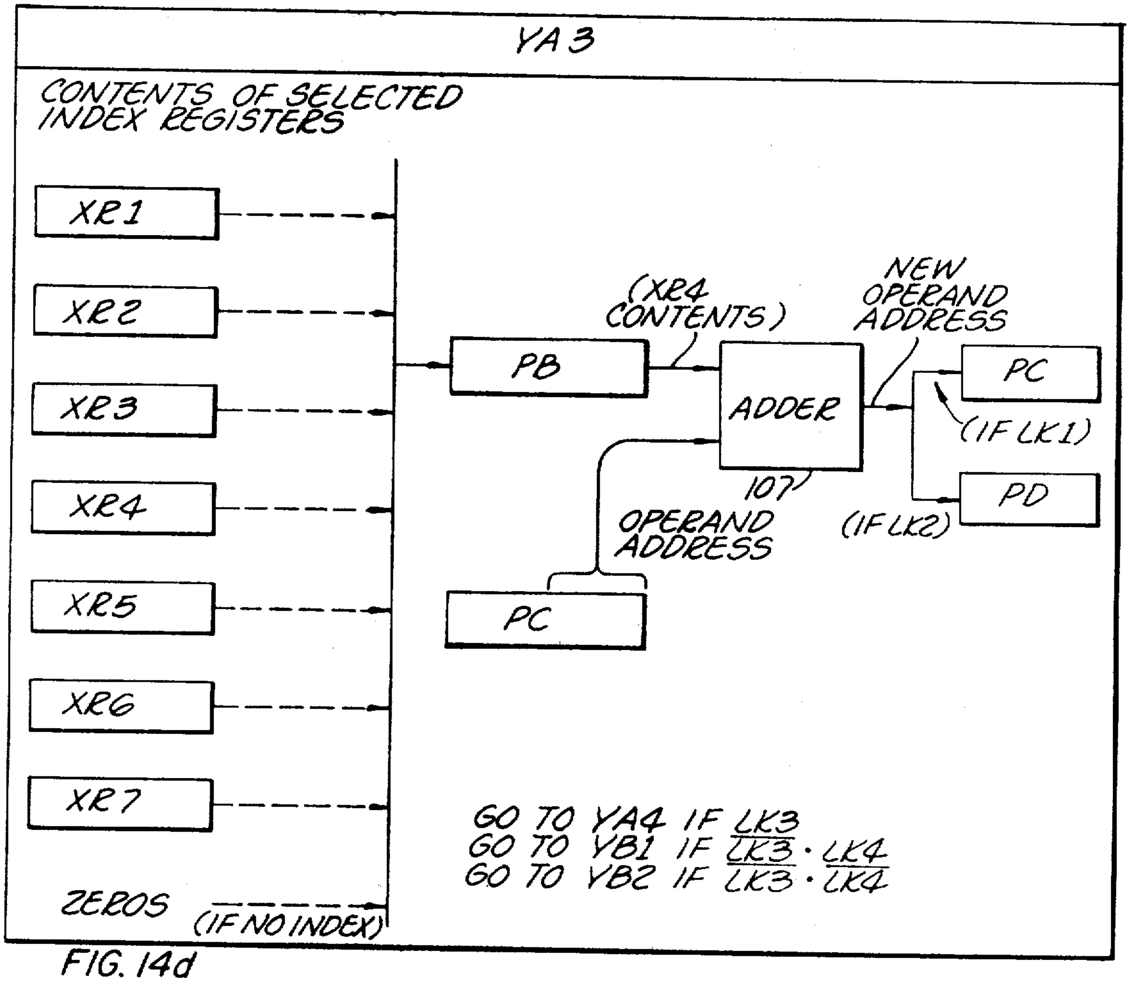
Figure 14E:
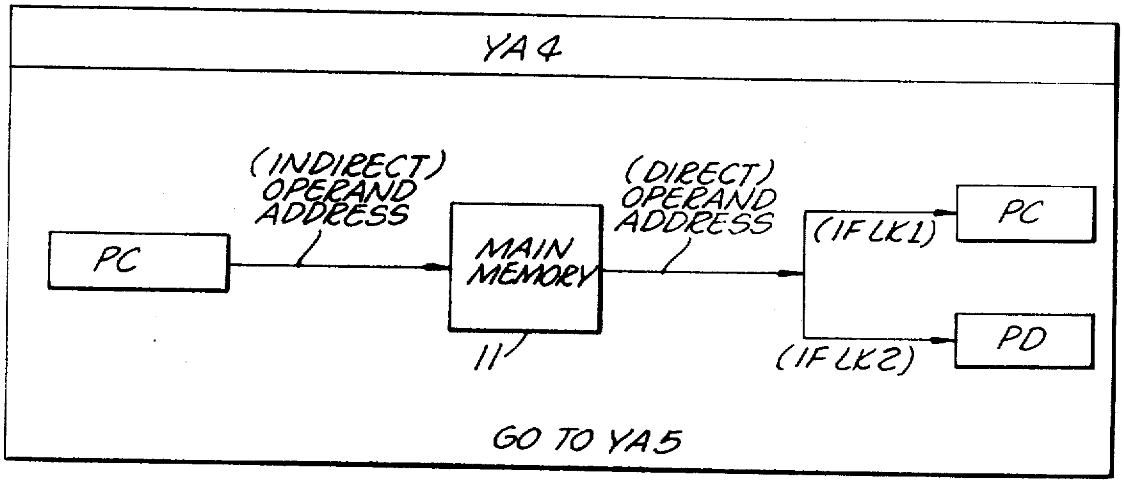

The LK flip-flops are loaded from the seven most significant bits of an entry word during wired-in-sequence state YA2 (see FIG. 14*c* and FIG. 10). The functions of the various LK flip-flops are as follows: (1) if LK1 is set, index the PC register; (2) if LK2 is set, index the PD register; (3) if LK3 is set, indirect addressing may be necessary; (4) if LK4 is set, load the operand from main memory to the PC register; (5) if LK5 is set, move the contents of the AC register to the PB register; (6) if LK6 is set, move the contents of MQ to PD; and (7) LK7 set indicates a transfer instruction is being emulated. If the instruction being emulated (residing in PD) does not call for indirect addressing, the setting of LK3 will be inhibited even though the word in the entry table has the appropriate bit set.

Turning again to the flow diagrams, in YA3 step (FIG. 14*d*) the first level of indexing is accomplished. The contents of the index register specified by the instruction are loaded into the main engine register PB. In the example discussed earlier (instruction "subtract magnitude"), index register four (XR4) is used. The difference between the index register and the operand address residing in the PC register is then generated through the adder 107, and sent to the PC register if the LK1 flip-flop is set and to the PD register if the LK2 flip-flop is set. Control is then passed to step YA4 if the LK3 flip-flop is set; otherwise, control is passed to YB1 step if the LK4 flip-flop is set, or to the YB2 state if the LK4 flip-flop is not set. It is possible under certain conditions to load the inclusive OR of any combination of index registers XR1, XR2 or XR4 during state YA3. One present-day computer includes three index registers from which it is possible to obtain the inclusive OR of any combination of these registers. Another present-day computer includes seven index registers (as in the system described herein), but includes a multiple tag mode to enable the inclusive OR of any combination of three of these registers to be obtained. It will be apparent that it is possible to emulate the inclusive OR operation of either of these two computers.

In the YA4 step (FIG. 14*e*) indirect addressing is accomplished if required. Bits 18–35 of the word in main memory 11 specified by the address residing in the PC register is brought to main engine and loaded into bits 18–35 of the PC register if LK1 flip-flop is set and to bits 18–35 of the PD register if LK2 flip-flop is set. Control is then passed to wired-in-sequence step YA5.

The second level of indexing is performed during YA step (FIG. 14*f*). The operations are identical to those performed during the YA3 step. In the current example, index register 7 (IR7) is used at the second level of indexing. This step is followed by YB1 if the LK4 flip-flop is set or by YB2 if the LK4 flip-flop is not set.

In the YB1 step (FIG. 15*a*) the operand specified by the address residing in the PC register is fetched from the main memory 11 and loaded into the PC register. Step YB1 is followed by step YB2.

During the YB2 step (FIGS. $15b_1$, and $15b_2$), the instruction counter (IC) is updated by one of several methods. Basically, if no trap condition exists and if the instruction being emulated is not a transfer instruction, the IC is incremented by one to point to the next sequential instruction. (Condition A in FIG. $15b_1$). This is the case for the current example under consideration. The contents of IC are loaded into the PB register. These contents then pass through the adder 107 where a one is added, and the result is returned to the IC register.

If the instruction being emulated is a transfer instruction, there are several different methods of updating IC. Transfer instructions may be divided into two groups, i.e., fast transfers and slow transfers. For a fast transfer in which the test or transfer conditions are not satisfied, the IC is incremented by one and control is passed to the scheduler 43. (Condition D in FIG. $15b_2$). If the test or transfer conditions are satisfied and the machine is not in the transfer trap mode, the new instruction address will be taken from the PD register (condition C in FIG. $15b_2$). Control will be passed to the scheduler 43. If the test or transfer conditions are satisfied and the machine is in transfer trap mode, the IC will not be updated and control will be passed to YB5 to enter an emulator program to emulate the trap condition. A slow transfer is one in which all the conditions necessary to emulate the transfer instructions are not present during YB2, i.e., some sort of arithmetic or logical test, for example, must be performed (by an emulator program) before the address of the next instruction can be determined. In this case the IC is not updated, and control passes to wired-in-sequence state YB3, YB4, or YB5 depending on the settings of the LK flip-flops (see FIG. $15b_2$, condition B). During step YB5 an emulator program sets up all the conditions to emulate the transfer and then executes a TAW mini-instruction. This mini-instruction resets the LK4 flip-flop and causes the wired-in-sequence to jump from state YB5 back to YB2. Since the LK4 flip-flop is now reset, the wired-in-sequence proceeds as if a fast transfer were being emulated.

In the YB3 step (FIG. 15*c*), the contents of the AC register are loaded into the PB register if required. The settings of the LK flip-flops determine whether to go to YB4 or YB5.

Figure 15C:
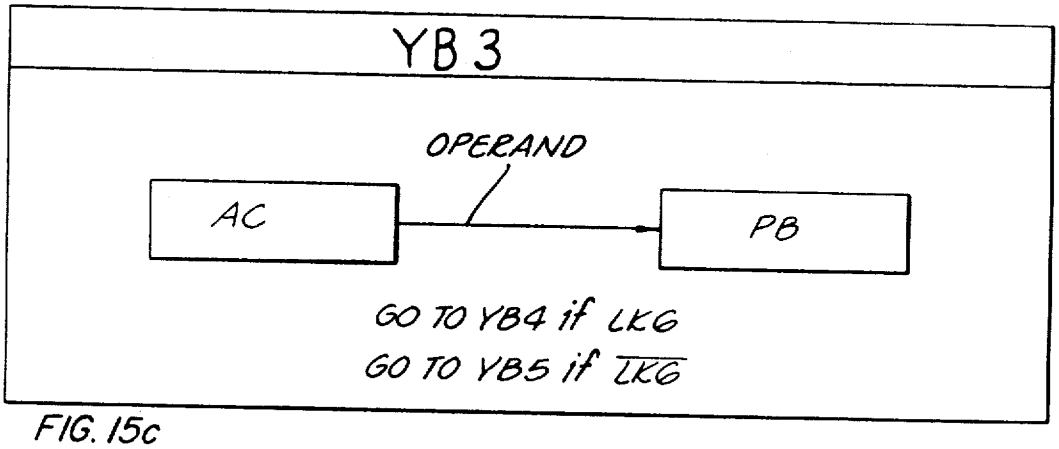
Figure 15D:
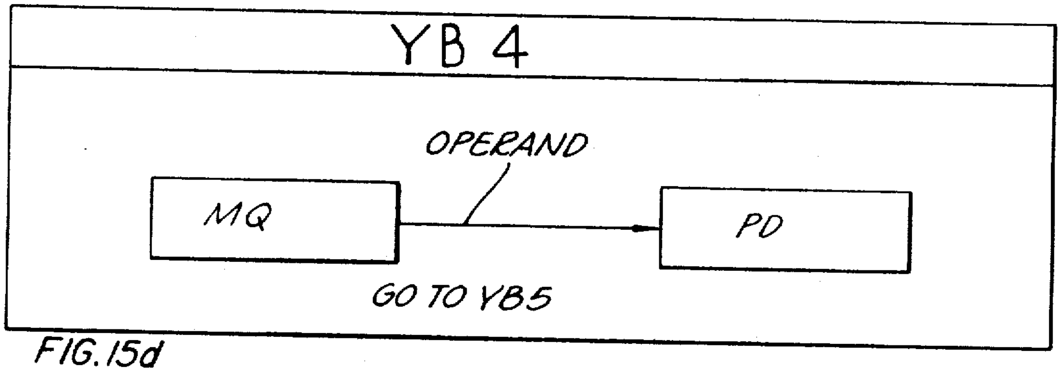

In the YB4 step (FIG. 15*d*), the contents of the MQ register are loaded into the PD register if required. Control passes to step YB5. During the YB5 step (FIG.15*e*) all the emulator instructions necessary to emulate an instruction from main memory or satisfy a scheduler request are executed. Control is passed back to the scheduler when an exit or hang condition is encountered, or back to the wired-in-sequence if a TAW mini-instruction is processed.

Figure 15F:
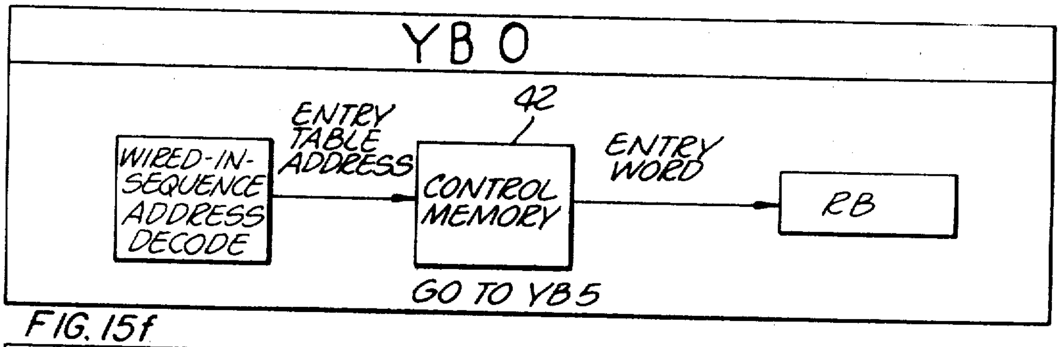
Figure 15A:
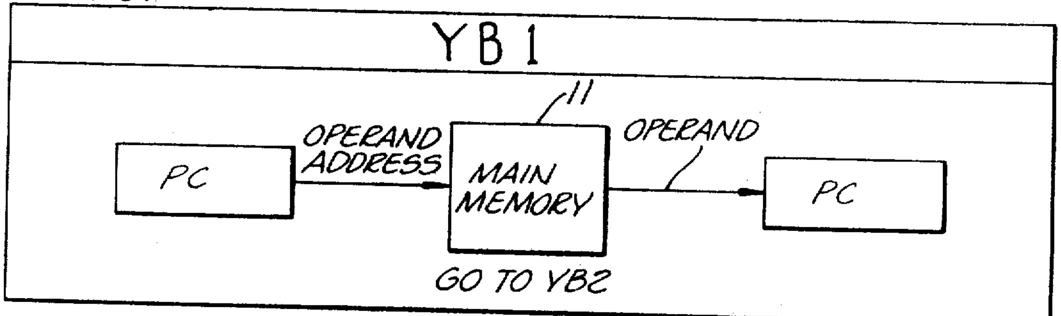

The YB0 step (FIG. 15*f*) is functionally independent of the other steps in the wired-in-sequence. It is entered from the scheduler to handle buffer service, terminate, console, and trap requests. Depending on the type of request which has been honored, an address is generated which points to an entry word in the control memory entry table, as follows:

| Type of request | Mini-Address generated |
|---|---|
| Channel 1 Buffer Service | 251 |
| Channel 2 Buffer Service | 243 |
| Terminate or Console | 241 |
| Trap | 233 |

The entry word is taken from one of the above addresses and loaded into mini-engine register RB. The entry word represents the address of the first emulator instruction in the routine required to service the particular request. The YB0 step is quite similar to step YA2 except that the type of request rather than the type of instruction fetched from main memory determines the location of the entry word. Control now passes to YB5.

The save sequence or cycle (FIG. 8*b*) is used to save certain registers by storing their contents in predetermined control memory locations. The save sequence is entered when an emulator instruction is encountered that causes a hang condition. This means that the current level of emulator execution is temporarily interrupted, to be resumed at some later point in time when the return request at that level is activated. The save cycle steps sequentially from YS0 through YS5, during which the contents of registers RB, RC, RD, PB, PC, and PD, respectively, are stored in the control memory, each scheduler level having a different save area reserved in the memory. Control is then passed to the scheduler.

The function of return sequence (FIG. 8*a*) is to store the registers which were saved during the save sequence. The return sequence is entered at YR0 by the scheduler 43 when a return request has been honored. The level of the return request determines which register's save area in control memory 42 will be accessed. The registers are restored in the same order that they were saved. The sequence steps YR0, YR1, YR2, YR3, YR4, and YR5 are performed sequentially during which respective registers RB, RC, RD, PB, PC, and PD are restored from predefined control memory locations. After step YR5, the control sequence jumps to YB5 where the emulator program which was interrupted by the hang condition begins at the address specified by the RB register.

The wired-in-sequence general flip-flops in FIG. 9 are employed to generate signals which control the various operations of the wired-in-sequence states. To enter a wired-in-sequence state, the various YA, YB, YRET, or YSAVE, and Y0 signals are generated as a result of signals YSTA, YSTB, YSTS or YSTR from the scheduler, and several other signals. It will be noted from FIG. 9 that the outputs of these flip-flops are YSAVE, YRET, YA, YB and Y0–Y5. The signals YA–T and Y0–T, for example, are used in enabling the state YA0. The output of the Y0 flip-flop 188, for example, is returned to an input gate 189 of the Y1 flip-flop 190. Typically, the Y0–Y5 flip-flops are set sequentially to step through the several states. Thus, when a zero state is completed, the Y1 flip-flop 190 will be set provided the input signal YEXP1 to the gate 189 is false. When the first state (YA1, YB1, etc.) is completed, the output from the Y1 flip-flop enables the Y2 flip-flop to be set. The YEXP1 signal, if false, indicates that the sequential counting operation through Y0–Y5 flip-flops occurs. If this signal is true, the sequential count operation is disabled (inhibited) and a jump is enabled. For example, there may be a jump from state YA1 to state YA3, in which case a gate 191 would set the Y3 flip-flop 192. The YST3 signal input to the gate 191 is generated by a matrix.

The outputs of the wired-in-sequence general flip-flops are coupled with a matrix (not shown) which is formed in a conventional manner of AND and OR gates to generate control signals which control the various defined operations which are to take place in the several wired-in-sequence states. As an example, consider state YB3 shown in FIG. 15*c*. Five signals are generated by the matrix to control this operational state. The combination of YB and Y3 (from the respective outputs of the YB flip-flop and the Y3 flip-flop) are Anded to generate these signals. Two of these signals (YHRD1–T and LREG–T) select the AC register (FIG. 3*e*), and the third signal (LOADB–T) directs loading of the PB register. The YB and Y3 signals Anded along with LK6–F (from the LK6 flip-flop in FIG. 10) generate two signals (YST5–T and YEXP1–T) which control the sequence to either step YB4 or YB5. If these control signals are true, a jump to state five occurs by setting the Y5 flip-flop (the YEXP1–T signal inhibits the output of the Y3 flip-flop from setting the Y4 flip-flop). If the output of the LK6 flip-flop is true, the Y4 flip-flop will be set and state YB4 will be entered. The YEXP1 signal indicates a jump operation (not sequential) between the numbered states of the same sequence, i.e., YB3 to YB5. The YEXP2 signal (see input to YSAVE flip-flop) indicates a jump operation (not sequential) between sequences, i.e., from YA to YB or YRET to YB.

It will be noted that the general flip-flops in FIG. 9 comprise pairs of flip-flops (called dual rank flip-flops) with the input of the second flip-flop of the pair being Anded with a signal on a line 194. The dashed line (e.g., 195) indicates that a like circuit and connection is provided in each of the general flip-flops. The signal on the line 194 is provided at KCP0 time when the LEND–T signal is present. This signal indicates the end of a mini step and will be further explained later when the mini control in FIG. 3*a* is discussed. The signal on the line 194 loads the contents of the first rank of flip-flops into the second rank. The SPRES–T signal, which is a console reset signal also appears at the reset inputs of all the first rank flip-flops in FIG. 9, and also appears on line 194. Both ranks will be reset by this signal since it resets the first rank and loads the status of the first rank (in this case, reset) into the second rank.

An exemplary operation is given below wherein it is assumed that the instruction being emulated is contained in main memory location 1574, and this instruction is an SXA instruction, which specifies "store the contents of the XR5 index register in address portion of main memory location 1000." The address portion of a word in main memory is defined as the last or least significant five octal digits or digits 8–12 of the word. There are a total of 12 octal digits per word. The decrement portion of such a word is defined as octal digits 2–6. The memory location 1000 contains the octal number 222222444444. The instruction counter (IC) contains the number 1574, and the XR5 register contains 77777. It is also assumed that no trap mode or subroutine mode is involved. Ultimately, as will be seen, execution of the instruction SXA takes the five sevens in the XR5 register and substitutes these for the last five fours (five least significant octal digits which are the address portion of the word in memory location 1000), giving the result 222222477777.

Assuming that a program request flip-flop has been turned on and no higher level request is present, the scheduler 43 will set the ICON4 flip-flop and generate signal YSTA which starts the wired-in-sequence at step YAO (FIGS. 8*a* and 14*a*). During state YAO, the contents (number 1574) of the IC register are loaded into the main engine PB register (note the flow diagram in FIG. 14*a*). The wired-in-sequence transfers to step YA1 (FIG. 14*b*) where the instruction addressed (the one being emulated) by the contents of the PB register is fetched from main memory location 1574, and the SXA instruction (store index register XR5 in address portion of main memory location 1000) is loaded into the PC and PD registers. Operation transfers to step YA2 (FIG. 14*c*), and the bits representing the operation code (store index register in address) of this instruction is sent to the translators. Recognizing this operation code, the translators B and C set the GIN flip-flop and reset all other general control flip-flops (see Table A, group code 63, "SXA" instruction). The translator A decodes the instruction being emulated and generates group code 63 (binary 110 011), which identifies which group to which the instruction has been assigned. The additional bits (binary 00 010) are appended to the most significant end of the group code to generate the entry table mini-address 0263 (binary 00 010 110 011). This address contains eleven bits. The ten most significant bits (binary 0001011001) of this mini-address are called the control memory address and are sent over PTR26–35 lines to the main buss 50 and then over lines PMB26–35 from the main buss to the control memory address register 67 (FIG. 3*b*). The thirty-six bit control memory word (which contains two entry words of eighteen bits each) addressed is sent to the main buss 50. Bits 25–35 of this entry word are sent from the buss 50 on lines PMB25–35 to the RB register, and the information from bits 18–24 of this entry word are sent over lines PMB18–24 to the LK flip-flops (FIG. 10) in the wired-in-sequence. The RB register contains mini start address 1730 and all LK flip-flops are reset (see Table B, group code 63). The wired-in-sequence transfers to state YA3.

Before discussing state YA3 it should be noted that the least significant bit of the mini-address is used to control half-exchange of the 36-bits of data on the main buss 50 during wired-in-sequence state YA2. If the group code (and hence the mini-address) is odd (e.g., 63), that is the least significant bit is a one, no half exchange takes place because the 18-bit entry word, being in the right half, or bits 18–35, of the 36-bit control memory word sent to the buss, is properly aligned for loading into the LK flip-flops and the RB register. However, if the group code is even (e.g., 62), i.e., the least significant bit is zero, meaning the entry word is located in bits 00–17 of the 36-bit control memory word sent to the buss, a half-exchange is performed on the buss which gates the entry word to lines PMB 18–35.

Considering now state YA3 (FIG. 14*d*), the first level of indexing of an instruction is usually accomplished during this state. However, since the SXA instruction being emulated is never indexed, the results (new operand address from the adder 107) of the operations performed during this step are not loaded into the main engine PC or PD registers because both the LK1 and LK2 flip-flops are reset, operation transfers to the YB2 step (FIG. $15b_1$ and $15b_2$.)

Figure 15E:
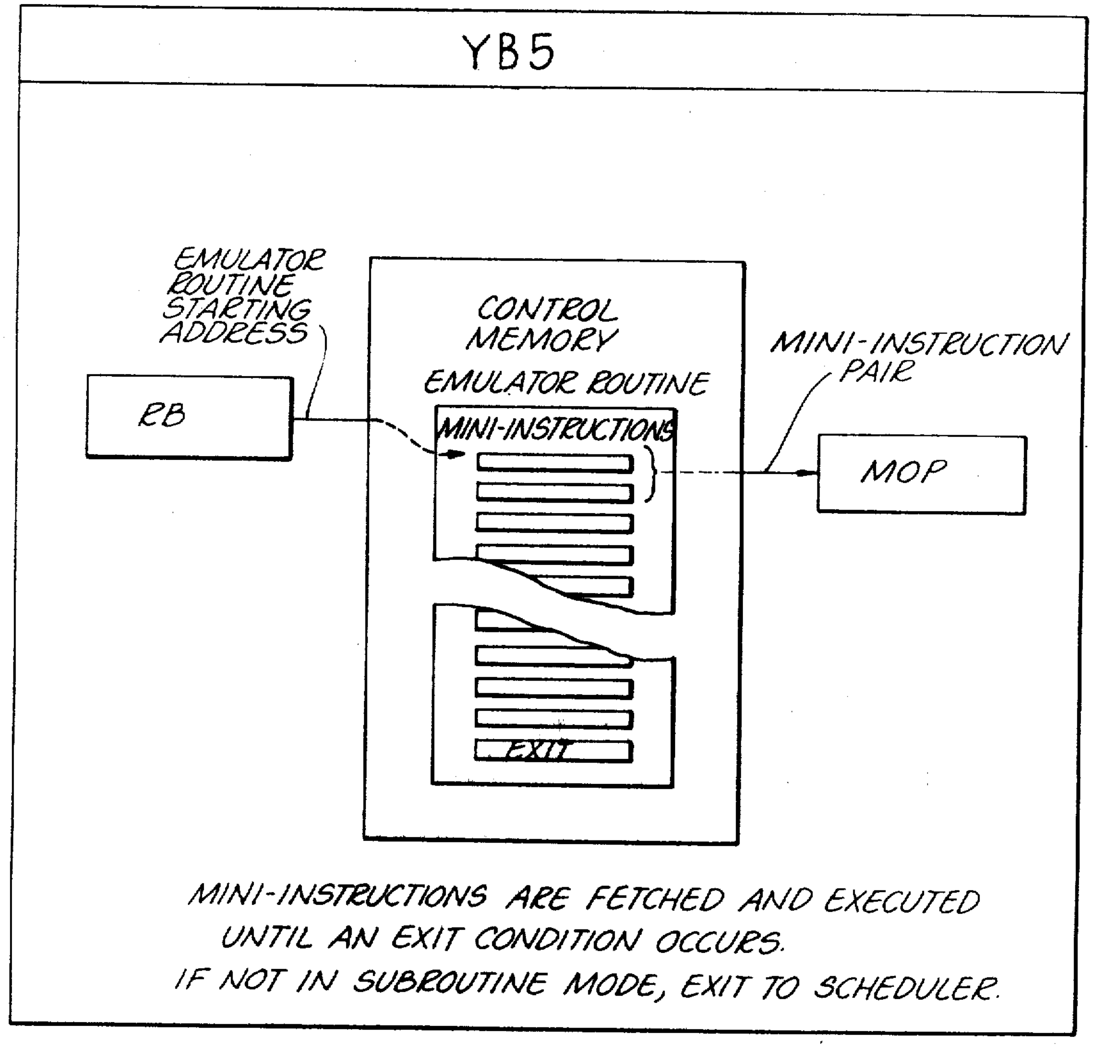

During job zero of step YB2, the IC register (which contains number 1574) is loaded into the main engine PB register. During job one, since the LK7 flip-flop is reset (i.e., the instruction being emulated is not a transfer instruction) and there is no trap, the contents of the PB register are incremented by one in the adder 107, and the result is loaded back into the IC register. The IC register now contains 1575 which is the main memory address of the next sequential instruction to be emulated. Since the LK5 and LK6 flip-flops are reset, there is a jump to state YB5 (FIG. 15*e*).

Figures 20A, 20B, 20C, 20D:
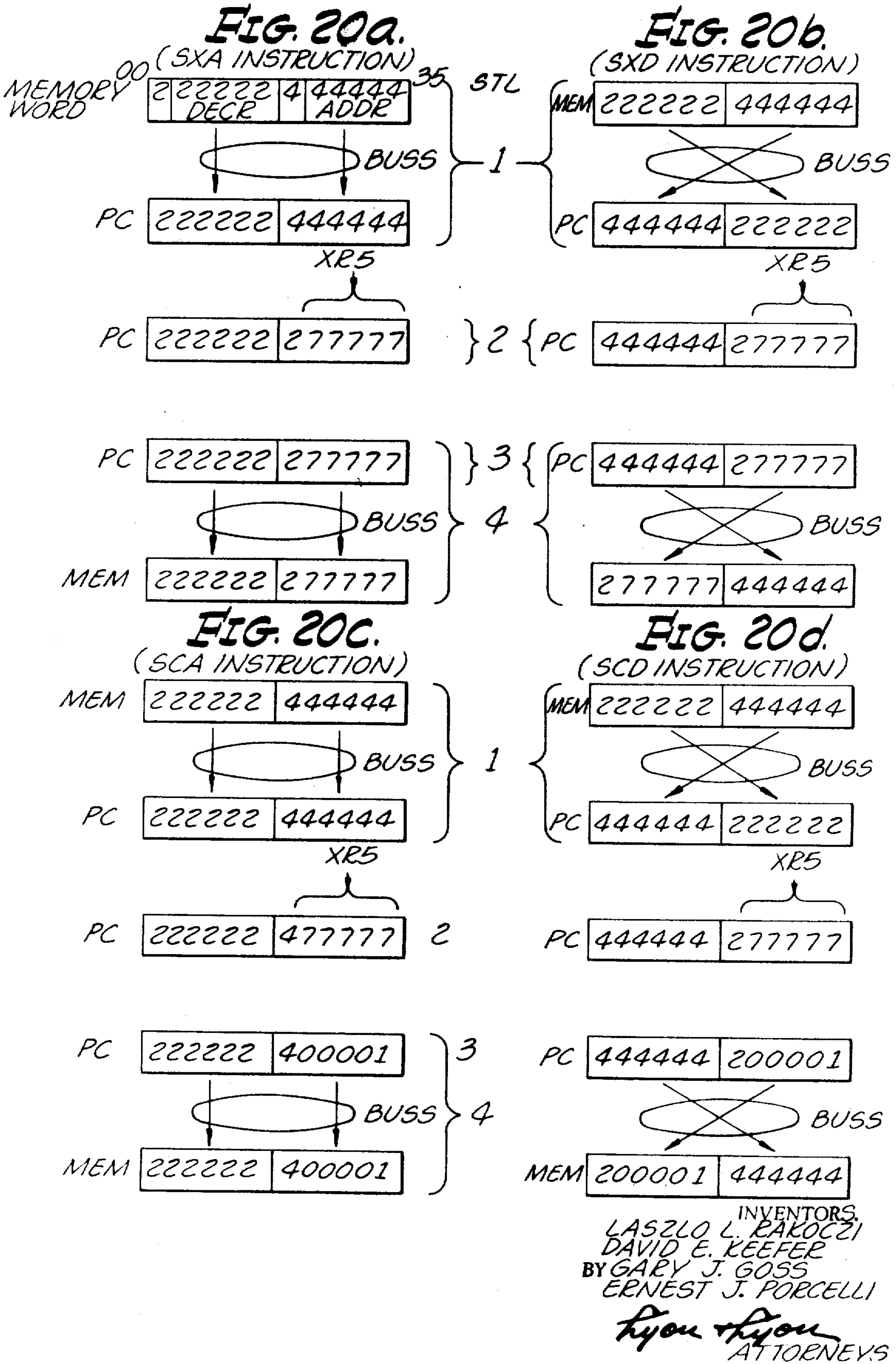

At this point, the execution of an emulator routine is started commencing with the mini-instruction addressed by the contents of the RB register, that is, the mini-instruction residing in mini-location 1730 of control memory as described above. The emulator routine starting in mini-location 1730 includes four mini-instructions to emulate the instruction SXA (FIG. 20*a*). These mini-instructions are:

| Mini-Location | Mini-Instruction |
|---|---|
| **01730** | **676022** |
| **01731** | **440504** |
| **01732** | **514307** |
| **01733** | **676072** |

The first and last of these mini-instructions are memory mini-instructions, the second is an index register mini-instruction, and the third is a main engine mini-instruction. The various mini-instruction formats and functions will be described in a separate section later.

The mini-instruction (676022) in mini-location 1730 means to fetch the word in main memory addressed by bits 21–35 of the PD register and store this word in the PC register. The precondition bit (bit 6) of this mini-instruction is on which means to perform a half-exchange on the main buss 50 if the GEX flip-flop is set. In this example GEX is reset as noted earlier and no half-exchange will occur. The PC register now contains the octal number 222222444444. The second mini-instruction (440504) in mini-location 1731 is executed which means to load the contents of the index register (in this case XR5) specified by bits 18–20 in the PD register into bits 21–35 of the PC register. The remaining bits in the PC register are not disturbed. The PC register now contains 222222477777.

The third mini-instruction (514307) residing in mini-location 1732 performs a two's complement of bits 21–35 of the PC register by the adder 107, and loads the result back into the PC register if the GIN flip-flop is reset. However, in this case the GIN flip-flop is set and the complement takes place but the result does not return to the PC register and thus the contents thereof are not affected as seen in step No. 3 in FIG. 20*a*.

The last mini-instruction (676072) in mini-location 1733 means to store the entire contents of the PC register in the main memory location addressed by bits 21–35 of the PD register. The precondition bit of this instruction is on (as with the instruction in mini-location 1730 above), and thus specifies the performance of a half-exchange if the GEX flip-flop is set. However, as before, no half-exchange is performed since the GEX flip-flop is reset. This last mini-instruction also has an exit bit (bit 12) which is on (set) and which causes signals LEXIT and LSCON to be generated returning control to the scheduler 43 since the subroutine mode is not involved.

The four mini-instructions described above also are used to emulate the three remaining instructions of Group 63 shown in Table A: SXD (FIG. 20*b*), which means to store the contents of XR5 in the decrement portion of the main memory word, SCA (FIG. 20*c*), which means to store the two's complement of XR5 in the address portion of the main memory word, and SCD (FIG. 20*d*), which means to store the two's complement of XR5 in the decrement portion of the main memory word. The settings of the GEX and GIN flip-flops for these three instructions are set forth in Table A. It will be noted that when the index register contents are to be stored in the address portion of the main memory word (as indicated by the "A" in instructions SXA and SCA), the GEX flip-flop is reset (zero) and no half-exchange is performed on the main buss 50. When the contents of the index register are to be stored in the decrement portion or bits 3–17 of the main memory word (SXD and SCD instructions) it will be noted that GEX flip-flop has been set by the translators during the wired-in-sequence operation thereby causing the first mini-instruction of the emulator routine to perform a half-exchange of the memory word as it is loaded into the PC register (see the first step of FIGS. 20*b* and 20*d*). The address portion (4 . . . 4) of the word now is in the left half of the PC register and the decrement portion (2 . . . 2) is in the right half. The second mini-instruction (step 2 in FIGS. 20*b* and 20*d*) loads the contents of the XR5 register into bits 21–35 of the PC register which, as just noted, is the decrement portion of the word as it originally appeared in the main memory. Considering only the instruction SXD shown in FIG. 20*b* for the moment, the contents of the PC register are not affected by the third mini-instruction (as with the SXA instruction described above) because the GIN flip-flop is set and the two's complement result is not returned to the PC register. However, with the SCA and SCD instructions as shown in FIGS. 20*c* and 20*d* the two's complement is performed by the adder 107, and the result is returned to the PC register as a result of the third mini-instruction. The last mini-instruction will not perform a half-exchange for SCA as seen in FIG. 20*c* because the GEX flip-flop is reset. However, this last instruction does cause a half-exchange for SCD and SXD, as seen in FIGS. 20*b* and 20*d*, of the contents of the PC register as they pass through the main buss 50 to the main memory. In this latter case, it will be seen that the original order of the decrement and address portions of the memory word is restored, but with the contents of the decrement portion having been changed.

The address decode circuit shown in FIG. 12 is a conventional decode logic circuit and serves two functions. This circuit generates a mini-address of the entry word in the control memory entry table during state YB0 (see discussion of state YB0 above). For example, during this state, (FIG. 15*f*) when a terminate request is recognized by the scheduler, the mini-address 241 is generated to indicate the location of the entry word which is to be loaded into the RB register so that the RB register will contain the starting address of the emulator routine required to service this request. Additionally, the addresses of the save areas in the control memory required to save the contents of the RB, RC, RD, PB, PC, and PD registers during the save sequence (YS) of the wired-in-sequence are generated by this circuit. For example, if a hang condition is encountered during an operation of level 2 of the scheduler, the registers described above will be loaded into control memory addresses 50 through 55 during the YS states YS0 through YS5, respectively. The addresses 50 through 55 are addressed of full thirty-six bit words and correspond to mini-addresses 0121 through 0133. These same addresses are generated by the YR sequence when the original contents of these registers are restored. The signal PTR30 is a 1 during the YS and YR sequences only.

Turning to the translators in more detail, the translator A contains conventional decoding logic to perform several functions as noted earlier. This translator generates a group code (e.g., 63) and a mini-address, to be sent to the main buss 50, as a result of decoding the instruction being emulated. This operation occurs during state YA2. The input signals YA and Y2 indicate state YA2, and bits from the PD register (PD00–PD11) are used. As a result, the signals PTR29, PTR31–35 and PEVEN are generated. PTR30 is a zero. As noted earlier PTR bits 26–28 also are zeros. The mini-address is defined by PTR26–35 and the group code is PTR31–35 and PEVEN. The PEVEN is the opposite (inverse) of the least significant bit of the group code, and is used to control half-exchange of data on the main buss as has been described previously. The input signals YTA29 and YTA31–35 to the translator A provide the address from the address decode circuit (FIG. 12) and supply this address over the PTR*xx* lines to the main buss 50.

The translator A also decodes the group code and generates signals PTR0X through PTR7X and signals PTRX0 through PTRX7. These sixteen bits are sent to the translator B as another form of expressing the group code. Thus, any combination of the first and second PTR signals denotes a group code, e.g., PTR6X and PTRX3 when both true indicate a group code of 63. These signals are generated during YA2 state using the PTR31–35 and PEVEN signals.

Another function of the translator A is to set or reset the LTSAT flip-flop (FIG. 19*a*) in translator C during the emulation of a fast transfer instruction. The signals RIN02, RIN03, and RIN10, which come from translator B and indicate that a fast transfer instruction has been decided, are combined with the PD00–11 bits and other signals which indicate conditions to be tested to generate the signal RAPID which sets the LTSAT flip-flop if conditions are such that the transfer, or jump, is to be performed in the program being emulated. If the conditions are satisfied the LTSAT flip-flop is set, and if not this flip-flop is reset by translator A. These other signals are from the general indicators (PIG*xx*), sign of MQ (PMQS), overflow (PAC0F), contents of AC are zero (PACQZ), and AC sign (PACS). If the conditions for a fast transfer are satisfied, the address portion (bits 21–35) of the instruction residing in PD is loaded into the IC register (see state YB2, condition C in FIG. 15$b_2$). If the conditions are not satisfied (see condition D in FIG. 15$b_2$), the location of the instruction being emulated is incremented by one and transferred to the IC register thereby indicating that the next sequential instruction is to be emulated. For example, a TZE instruction, which is classified as a fast transfer, may be emulated, which means to transfer control if the entire contents of the AC register is zero, or take the next sequential instruction if the AC register is not zero. If the entire contents of the AC register are zero, this condition will be indicated by the signal PACQZ. If the condition exists (this signal is true) the LTSAT flip-flop is set which causes the operation in condition C (FIG. $15b_2$) of state YB2 to take place. If the contents of the AC register are not zero, PACQZ is false, and the LTSAT flip-flop is reset (condition D) indicating to the program being emulated to use the next sequential instruction. There are certain instructions to be emulated in which indicators are to be tested and reset if they are on in addition to making the jump or transfer as described above. Hence, general indicator inputs (PIG*xx*) and the overflow indicator (PACOF) also are provided as inputs to the translator A, and the translator provides output signals to reset the overflow indicator (REAOV), and signals to reset the general indicators which were tested (RETCK, RTCKB, REEOF and REOFB), and a signal (RTTRA) which indicates there has been decoded a trap transfer instruction which is exempt from any trap mode in effect. This signal sets the RTTR flip-flop. For example, end of file on channel 1 may be tested to determine if the indicator (PIG06) is on. If this indicator is on, not only does the transfer occur, but this indicator also must be turned off (by signal REEOF).

The translator B also contains conventional decode logic. It will be apparent from FIG. 18 that this translator receives the PTR*xx* signals (which have been discussed previously) from the translator A, along with certain bits from the PD register, a general indicator signal (PIG40) and the output of the YAUX1 flip-flop. This translator generates the RIN*xx* signals which are returned to the translator A as described above. Additionally, this translator generates signals (LGQ09–11) to set the general operation flip-flops (GOP09–11, respectively), as well as signals (LGQX, LGQNI and LARQ) to set the GEX, GIN and ARI flip-flops, respectively. The signal LRESQ is used to reset the Q bit of the AC register (FIG. 3*e*), and the LILK3 signal is used to inhibit setting of the LK3 flip-flop as has been described. Additionally, the translator B serves to set the SUB and MAG flip-flops. These flip-flops are reset at KCP2 time as indicated in FIG. 18 (during YA2 and job0), and set thereafter by the inputs supplied to the translator B at the next KCP2 time.

An example of the manner in which the MAG flip-flop in the translator B in FIG. 18 is set may be given considering an add magnitude (ADM) instruction which has an OP code of 0401 (octal). As seen in Table A, this instruction has a group code of 40 which is identified by the translator B by the input signals PTR4XT and PTRX0T. Since the least significant octal digit is a one, the signal PD11 is true. The MAG flip-flop is set by Anding these three signals. Note that the three other instructions in group 40 in Table A all have even OP codes which means that for these, PD11 will be false. Another instruction in this same group 40 has octal code 4400 indicating subtract magnitude (SBM). Inasmuch as none of the other OP codes in this group has a "4" in the first digit, PD00 is true only for this instruction. The decoding of this instruction sets both the MAG and SUB flip-flops by Anding the signals PTR4X, PTRX0 and PD00.

Translator C includes the general control flip-flops GOP09–11, GEX, GIN and ARI which have been discussed. There are three ways in which these flip-flops are set. They may be loaded during wired-in-sequence state YA2 at KCP6 time from the translator B on lines LGO*xx* and LARQ. They may be loaded from the main buss 50 from lines PMB18–23 during state YR0 at KCP6 time. They also may be set by "load preset conditions" mini-instructions over lines RM12–13. These flip-flops are reset (1) upon control returning to the scheduled (YSCON) at KCPO time, (2) during state YA2 at KCP5 time, (3) during state YR0 at KCP5 time, and (4) during execution of "load of preset conditions" mini-instructions (over lines RM*xx*). The set/reset decode logic 200 shown in FIG. 19*b* includes a plurality of conventional logic gates to combine various signals for setting and resetting these flip-flops. The table below indicates the input signals and gate signals which are employed in setting the flip-flops GOP09, 10, 11, GEX, GIN and ARI, respectively.

| Set Input Signals | Gate Signals |
|---|---|
| LGQ**09**–YGQ**11**, LGQX, LGQN, LARQ | YA2·KCP**6**. |
| PMD**18**–PMD**23** | YR**0**·KCP**6**. |
| RM**12**–RM**17** | LPDM·LPDE·RMO8B·RM**09**B–T (Note—the first three terms denote the load preset conditions, mini-instruction, and RM**09**B–T is a set signal; RM**09**B–F is used to reset.) |

The outputs of the general control flip-flops GOP09–11 are applied on respective lines RGP09–11 to the shift control circuit (to generate shift control signals) and to the first decode circuit (to generate logic operations) in FIG 3*a*. These lines also are applied to the translator C decode logic 201 for testing purposes as will be described below. The outputs of the GEX, GIN and ARI flip-flops are used respectively for half-exchange control, general inhibit control and sign control as has been described. These outputs also are applied to the decode logic 201 for testing purposes. The RE18–23 outputs from the AND gates coupled with the outputs of these six flip-flops are enabled during state YSO by signal YRXBNT to save the contents of these flip-flops in bits 18–23 of the control memory save area along with the contents of the RB register (bits 25–35). A gate 202 receives the true output of the BIN flip-flop and signal RMO6A (preconditioned bit), ultimately providing a signal LINEN which goes to the main engine control circuit and the first decode circuit in FIG. 3*a* respectively to inhibit loading of the PB, PC and PD registers during the skip operation and to inhibit loading of these registers following an adder operation.

The other inputs of the translator C are employed in test and skip mini-instructions, and particularly the arithmetic test, general indicator test, and secondary indicator test instructions. These signals merely represent conditions which can be tested, and if the status of these signals matches the conditions or conditions tested, the LTSAT flip-flop is set; and if not, this flip-flop is reset. For example, consider the arithmetic test mini-instruction 610317. The "61" means skip if the test is satisfied, otherwise take the next sequential mini-instruction. The "03" means to test for GOP11 false, and the "17" is the skip distance in the mini-instruction list if the test is satisfied. The POP code (61) is decoded in the translator C in a conventional manner from the signals on lines LPDM and RM05–F. The SOP code (03) is decided from the signals on lines RM07–11. Presuming that the state of the GOP11 flip-flop is false (as indicated by the signal on the RGP11 line) during the time this mini-instruction is executed, the test is considered to be satisfied, and the decode of the instruction plus the false condition of the GOP11 flip-flop causes the LTSAT flip-flop to be set. Meanwhile, the skip distance will have been loaded to the RC register, and since the LTSAT flip-flop has been set, the contents of the RC register are now added to the contents of the RB register giving the mini-address of the next mini-instruction to be executed. If the LTSAT flip-flop were not set (meaning that GOP11 was true in this case), the skip distance in the RC register would be ignored and the contents of the RB register would have been incremented by one to address the next sequential mini-instruction.

Many other conditions can be tested, e.g., P bit "on" (PPBI), existence of a carry (PCAR), and console sense switches "on" (TSSW1–6). To test sense switch No. 1, for example, PD register bits 00–02 must be loaded with the binary number 001 which in turn is decoded by the translator C and Anded with the output (TSSW1) of console switch 1. If this switch is on, the LTSAT flip-flop will be set. The instruction for this test if 6000*xx*. When the SOP code (00) is decoded, since this is a general indicator test, the signal RGI00 is generated by the RGI decode circuit in FIG. 3*b*. The RGI00 signal indicates that the SOP code for "test sense switch" has been decoded. This signal also is Anded with the PD and TSSW1 signals. As will be apparent from FIGS. 19*a* and 19*b*, other signals are applied to the translator C. For example, the LPD*xx* signals (LPDM, LPDTO, LPDDO, LPDM and LPDE) come from the first decode circuit (FIG. 3*a*) which decodes the POP code. The PZERT signal comes from the main engine zero test flip-flop. The RAPID-T comes from translator B and indicates existence of a fast transfer condition as described earlier. The LTGI and CTGI signals are decoded in the RGI and RGS decode circuits, respectively, in FIG. 3*b*. The former signal is generated by Anding the RGI*xx* signal and the true output of a general indicator flip-flop (in general indicator register No. 1 or No. 2 in FIG. 3*b*). That is, LTGI will be true if the selected general indicator flip-flop is true. Thus, this signal indicates the status of a general indicator flip-flop when required by a general test instruction. The CTGI signal is generated in the same manner but applied to the secondary indicators in FIG. 3*b*. The PBS and PCS signals into the translator C indicate the signs of the contents of the respective PB and PC registers and enables the condition of the same to be tested.

As is well-known to those skilled in the art, a number of individual storage elements, e.g., flip-flops, are used in digital equipment to store various items of data or conditions. The same is true in the present system. While many of these flip-flops are shown in the drawings, several which are easily understood to those skilled in the art are not shown in order to simplify the illustration and discussion, and to prevent cluttering the drawings and data flow paths. The operation and function of many of the more important of these flip-flops are described below. One of the most conventional conditions it is desired to store is the existence of a carry from a register. A carry typically results from an arithmetic or shift operation. Various carries will be encountered in the present system when performing internal operations, and sometimes it is desired to store such carries. Similarly carries also result when emulating operations of other computers, and frequently a carry in this case is denoted as an "overflow." Accordingly, carry flip-flops (PCAR and PFCAR) are used in the present system to store carries encountered when performing internal operations. An overflow flip-flop (PACOF) is used to store a carry, when emulating an instruction of another computer, which can be interpreted as an overflow.

Sign flip-flops are provided for the main engine registers PB, PC, PD (PBS, PCS, PDS, respectively) as well as for the MQ (PMQS) and AC (PACS) registers. These flip-flops are used for storing the sign of the contents in the respective registers. Additionally, in connection with the AC register, two additional bits are stored by flip-flops, and these bits are the Q and P bits. The P bit is used when emulating certain logical operations, and the Q bit is a special overflow bit which is used in connection with the AC register when emulating special overflow conditions of a well-known second generation computer. A subroutine flip-flop (PSRM) also is employed, and will be discussed subsequently. This flip-flop stores the fact that a subroutine has been entered and the machine is functioning in a subroutine mode.

Several flip-flops are employed in connection with arithmetic operations. Among these flip-flops are the AC zero (PACQZ), main engine zero test (PZER), mini-engine zero test (RZER), LS bit (PLSBI), and like sign (RLKSN) flip-flops. The AC zero flip-flop indicates that the entire contents of the AC register (including bits Q and P) are equal to zero. The main and mini-engine zero test flip-flops are set if the result of an adder operation in the respective engine is zero. The LS bit flip-flop is set when the least significant bit of the PE register is a one as a result of an adder operation. The like sign flip-flop is set during an adder operation if the operands sets an equal sign flip-flop (PEQSN) which denotes that two operands have the same sign. Many of the foregoing miscellaneous flip-flops are controlled, set and reset by the "decode" circuit in FIG. 3*a*.

During state YS1 when saving the contents of the RC register, the contents of some miscellaneous flip-flops are also saved. The AC zero, carry (PCAR and PFCAR), subroutine mode, main engine zero test, mini engine zero test, and P bit flip-flops ares sent on lines PE18–23 and stored side by side with the contents of the RC register in the control memory save area. During state YS2 when the contents of the RD register are being saved, the contents of the PB sign, PC sign, PD sign, MQ sign, AC sign and equal sign flip-flops, as well as the LS bit flip-flop are saved in a similar manner.

The CHBC flip-flop (which is a secondary indicator) controls the operation of the secondary test POP codes and channel register mini-instructions. The flip-flop acts as a switch to direct the start of an operation in either I/O channel 1 or I/O channel 2. An instruction refers to a channel in general, and if this flip-flop is reset channel 1 is used and if set channel 2 is used. This flip-flop is set and reset as set forth below. In scheduler level 1 (I/O channel 1 to be serviced) it is reset during wired-in-sequence state YB0. In level 2 (I/O channel 2 to be serviced) it is set during state YB0. In level 3 it is reset during state YB0, if a terminate request was from channel 1; and set during state YB0, if the terminate request was from channel 2. In level 4 it is reset during wired-in-sequence state YA1 and also reset during state YB0. It may be set during state YB5 by a TSGS (POP code), CHBC (SOP code), *xx* instruction, coded as 3036*xx*. This flip-flop also is reset by the console reset switch in any level.

Referring to FIG. 13, an Exit may be generated in several ways. During YB2 state if the LK4 flip-flop is false and the LK7 flip-flop is true and PIG40 is false, thereby indicating that a fast transfer is to be executed, or if RTTR is true and indicating that a trap transfer instruction is being emulated (conditions C and D of FIG. 15$b_2$, the signal LEXIT–T will be generated by And gate 220 during job 1 (LJB1). At KCP3 time the LEXIT signal will set a flip-flop 221 generating the signal LEXDL–T. When this latter signal is Anded with signal LNDIN–T from the mini-control circuit (FIG. 3*a*), which means that the mini-instruction being executed is completed, the signal LSCON is generated. The LSCON signal, as noted before, sets the YSCON flip-flop (FIG. 7) at KCP6 time. The signal YSCON passes through a gate forcing LSCON to remain on until the scheduler enters the wire-in-sequence state YO. This is to ensure that the scheduler waits for a request if none is present at the time LSCON is generated. The signals LSCON and YSCON return control to the scheduler as noted earlier in the description of the scheduler operation. The signal LSCON also is generated during state YS5 as indicated by gate 222 in FIG. 13 when state YS5 is completed (note FIG. 8*b*) as denoted by the signal LNDIN–T.

The signal LEXIT also may be generated during state YB5 if the subroutine flip-flop (PSRM) is not set and the signal LEXIN will become true if any one of several mini-instructions are decoded which have the Exit bit (bit 12) set. The LEXIN signal also is generated when the TAE or TGE mini-instruction is executed and the LTSAT flip-flop is reset.

FIG. 13 also illustrates the subroutine flip-flop 225 (PSRM3. This flip-flop will be set upon decoding a SMCT mini-instruction. In addition to setting this flip-flop, this mini-instruction causes the contents of the RB register to be incremented by one and stored in the RD register. The address field of the SMCT mini-instruction is then loaded into the RB register. This causes the next mini-instruction to be fetched from the control memory at the mini-address just loaded into the RB register. When the signal LEXIN is generated as described earlier, for example by an instruction which has its exist bit (bit 6) on, the signal LEXIT will not be generated by gate 223 since the subroutine mode flip-flop is set. The PSRM signal passing through the gate 226 will be inverted to inhibit the signal LEXIT which is the output of the gate 223. Instead, the signals PSRM and LEXIN are Anded together through the gate 224 to generate signal LSBRT. This signal is applied to the mini-control circuit (FIG. 3*a*) and the mini-decode circuit and causes the contents of the RD register to be stored in the RB register. At the end of this operation, the subroutine mode flip-flop 225 will be reset. The next mini-instruction will be taken from the control memory mini-address specified by the contents of the RB register. The mini-address in the RB register is one greater than the address of the SMCT instruction discussed above, and thus the emulator program will continue with the mini-instruction immediately following the SMCT instruction.

When emulating instructions of another computer, usually one or more emulator routines for each group of mini-instructions are involved. Almost invariably, these routines end with either a test mini-instruction (i.e., TGE or TAE) which sets up exit conditions (LEXIN) if the test if false, or with a mini-instruction which has an exit bit on (which also causes LEXIN to be generated). Any such routines may be used as a main emulator program or as a subroutine for some other emulator program. The subroutine mode flip-flop enables this feature to be accomplished. Whenever an emulator routine is used as a main program, it is entered with the subroutine mode flip-flop reset, and when the program is completed (LEXIN generated) the signal LESCON is generated returning control to the scheduler. When an emulator program is used as a subroutine, it is entered by means of SMCT instruction which sets the subroutine mode flip-flop, and when exit conditions utlimately occur control is transferred back to the emulator program containing the SMCT instruction as described above. This feature allows a single emulator program to be used in many types of emulation procedures either independently or as a subroutine without any need for modification by the program calling it as a subroutine.

Referring now to the mini-instruction register and control 46 in FIG. 3*a*, first certain timing aspects will be considered, followed by a description of this portion of the system. The mini-control circuit 232 controls the timing of the mini-steps to be performed. Mini-steps are those increments of time during which specific operations are performed, in order to execute a mini-instruction. They are considered to be all states of the wired-in-sequence including the YB5 state, where multiple mini-steps can be executed.

Mini-steps may be either one job or two jobs in time duration depending on the type of instruction. Job 0 (LJB1–F), which is one clock cycle, is designated as the first job. Job 1 (LJB1–T) which may be either one or more clock cycles in duration is designated as the second job. Mini-steps also include mini-fetch 42 cycle (LMF), during which a mini-instruction pair is fetched from control memory 42 and stored in the MOP register 233 in FIG. 3*a*. During those mini-steps requiring memory accesses, the memory address is provided during job 0, and the data is either read or written during job 1. The following are those mini-instructions which are two jobs. TGF, TGS, TSGF, SMCT, REG, TAW, TGR, TSGS, SHFIT, MEM, TAE, TGE, TSGR, ALG, TA, TG, AND TSGE. All of the wired-in-sequence states consist of two jobs.

The mini-control timing diagram in FIG. 21 illustrates the basic timing for a mini-step with two jobs. Also shown is the case where job 1 is more than one clock cycle in duration.

Four flip-flops are included in the mini-control 232 to control the basic job timing, and these flip-flops are LEND, LTJB, LJB1, and LFCY1. The LEND flip-flop termiantes the previous mini-step and initiates a new mini-step. The mini-step will be terminated in some cases after job 0, in others after a certain condition is reached during job 1. The set and reset logic is shown below:

LEND—T=KSTO+KCP6*
[$\overline{\text{PDVD}}$*RCZER*PSHF1 Not a divide, shift is finished
+MMEM*LJB1 Main Memory, Job 1
+LMF*TGNOP Gen No Op Sw., not on LMF
+LPDD1 Test POP (60, 61, 64, 65, 70, 71, 74, 75), Job 1
+LPDK1*LPDQ SMCT POP 76, Job 1
+LPCK1*LPDQ ALG POP 62, Job 1
+$\overline{\text{LMF}}$*RM00 All POPs of 0X, 1X, 2X,
+$\overline{\text{LMF}}$*RM01 3X, 4X and 5X
+PDV2
+YMEM*LJB1 Job 1, non-mem cycle of WIS
+TRMP*YB5*LMF Repeat Minipair Mode*LMF
+LJB1*LCMEM Control Mem, Job 1
+LJB1*LREG] POP 73 or 77, Job 1
$\overline{\text{LEND}}$=SRES+KCP6

The LTJB flip-flop is the preset condition for setting LJB1. It is set by any one of several conditions specifying a two-job mini-step.

LTJB=KCP6*$\overline{\text{LJB1}}$*(LREG+$\overline{\text{YMEM}}$+LPDK0
+LPDD0+LPT0+LMMEM+LCMEM)
$\overline{\text{LTJB}}$=SRES+KCP2A+LEND The LJB1 flip-flop indicates that Job 1 of a ministep is being executed.

LJB1=KCP0*LTJB
$\overline{\text{LBJ1}}$=KCP0*LEND+SRES

The LFCY1 flip-flop indicates the first cycle of Job 1.

LFCY1=KCP0*LTJB
$\overline{\text{LFCY1}}$=LTJB*KCP7+SRES

Turning to the mini-instruction register and control 46 in FIG. 3*a*, during the YB5 step of the wire-in-sequence, mini-instructions are fetched from the control memory 42 in pairs and stored in the 36-bit mini-instruction operation (MOP) register. Bits 00–09 of the mini-engine RB register (mini-instruction counter) provide the control memory address of the pair of mini-instructions to be accessed. The least significant bit (bit 10) of the RB register specifies which instruction of the pair is to be executed. If this bit 10 is zero, the even or left-hand instruction of the pair is to be executed, and the signal LMSWL gates output bits 00–17 of the MOP register to RM gates. These bits are then decoded to execute the instruction. If RB10 is one, the odd or right-hand instruction of the pair is to be executed and the signal LMSWR gates the outputs of MOP18–35 to RM00–17.

For the purposes of discussion, assume that the MOP register 233 has just been loaded with a mini-instruction pair, both of which are not test and skip instructions. Also assume that the even instruction is to be executed first. In this case RB register bit 10 will be zero and a RB10D flip-flop in mini-control, which indicates which instruction is to be executed (even or odd), will be reset. This flip-flop samples the state of bit 10 of the RB register. The set and reset logic is:

RB10D=KCP7*(RB10+LUPME)
$\overline{\text{RB10D}}$=KCP7*$\overline{\text{RB10}}$*$\overline{\text{LUPME}}$.

The term LMSWL gates the even half of the MOP register through the RM gates to the RM00–17 lines is:

LMSWL=$\overline{\text{RB10D}}$*YBSC*$\overline{\text{LKCL}}$*$\overline{\text{TGNOP}}$*$\overline{\text{LMF}}$.

After the even instruction is executed, bit 10 of the RB register is forced to one by the signal LUPME (meaning mini-counter from even to odd) from mini-control. The logic is:

LUPME=YB5C*$\overline{\text{LKCL}}$*$\overline{\text{LMF}}$*$\overline{\text{LDMF}}$*LEND*
$\overline{\text{LPMF}}$*$\overline{\text{LPJMP}}$.

This term also sets the RB10D flip-flop which indicates that the odd instruction is to be executed. The odd half of the MOP register is gated through the RM gates to the RM lines by:

LMSWR=RB10D*YB5C*$\overline{\text{LKCL}}$*$\overline{\text{TGNOT}}$*$\overline{\text{LMF}}$.

After the odd instruction is executed, the RB register must be incremented by one and the next mini-instruction pair must be fetched. The term which indicates to update the mini-counter from odd to even is:

LUPMO=YB5C*$\overline{\text{LKCL}}$*$\overline{\text{LJBI}}$*LMF

This in turn generates the term RINK which causes a "one" to be added to the RB register. The logic for RINK is:

RINK=LUPMO*$\overline{\text{LJMP}}$ Updated RB, odd to even
+LPKO*LPDN SMCT POP
+$\overline{\text{RM10A}}$*RM9A*LPDE*LPDQ MINI POP
+Y0*YSAVE W–I–S SAVE sequence After each pair of mini-instructions is executed (and more often if test and skip instructions are executed) a new pair of mini-instructions is fetched under control of the LPMF, LMF, and LDMF flip-flops in mini-control. The operation of these flip-flops is described below. The setting of the pre-mini fetch flip-flop (PLMF) is controlled basically by a clock pulse, and the RB10D flip-flop which indicates that the last instruction executed was the odd instruction, and the last control cycle was not an LMF cycle ($\overline{\text{LMF}}$) and the conditions for setting LEND are present (pre-LEND) which indicates that the last cycle is about to terminate. The set and reset logic for the LPMF flip-flop is:

LPMF=KCP5A*RB10D*$\overline{\text{LMF}}$*(pre-LEND)
+KCP5A*LPDQ*RM15A*LPDE
+KCP5A*LOVMF
$\overline{\text{LPMF}}$=SRES+KCP2*LMF.

When the mini fetch ip-flop (LMF) is set, a pair of mini-instructions will be brought from the control memory address specified by bits 00–09 of the RB register and stored in the MOP register. The set and reset logic for this flip-flop is:

LMF=KCP7A*LEND*(LPMF+LPJMP)
$\overline{\text{LMF}}$=SRES+KCP7A*LEND*$\overline{\text{LPMF}}$*$\overline{\text{LPJMP}}$ The purpose of the delay mini-fetch flip-flop (LDMF) is to introduce a delay long enough to prevent the LUPME signal from being generated while the MOP register is being loaded. Otherwise the LUPME signal would set the RD10D flip-flop causing the odd instruction of each pair fetched to be executed every time. The set and reset logic for the LDMF flip-flop is:

LDMF=KCP2A*LMF
$\overline{\text{LDMF}}$=KCP2A*$\overline{\text{LMF}}$

Two flip-flops in mini-control non-sequential execution of emulator instructions are called the pre-jump flip-flop (LPJMP), and the jump flip-flop (LJMP). The pre-jump flip-flop is set at KCP5 time if the LJUMP flip-flop is reset and a variety of conditions indicating that non-sequential instruction execution is to take place.

LPJMP=KCP5A*$\overline{\text{LJMP}}$*
[YSTS Set W–I–S. Save Sequence
+LPDN*LPDK1 SMCT POP, Job 1
+LPDN*LPDE TRU POP
+LPDD1*LTSAT TEST POP, Job 1, Test Satisfied
+LSBRT Exit from Subroutine Mode
+YSJMP*TGNOP] Jump to W–I–S State YB5
$\overline{\text{LPJMP}}$=SRES+LMF*LJMP The jump flip-flop is controlled by the pre-jump flip-flop as follows:

LJMP=KCP7A*LEND*LPJMP
$\overline{\text{LJMP}}$=KCP7A*LEND*$\overline{\text{LPJMP}}$ The setting of the LPJMP flip-flop causes the LMF cycle to be initiated. The address of the mini-instruction pair to be fetched will have been generated by one of two methods during the last mini-instruction executed. Register RB may be loaded with the new address (SMCT and TRU POP codes), or test POP codes. When the test is satisfied, the skip distance is loaded into the RC register, and the contents of the RC register added to or subtracted from the contents of the RB register forming the new address. This new address may, of course, be either even or odd. If it is odd, the right-hand (odd) instruction of the pair just fetched will be executed since bit 10 of the RB register will set the RBIOD flip-flops. The even instruction will be ignored in this case.

The bits gated through the RM gates go to the various decode and control circuits as seen in FIG. 3*a*, to the RGI and RGS decode circuits in FIG. 3*b*, and to the translator C in FIG. 3*f*. The first decode circuit 240 decodes the POP code and generates signals based on this code. These signals are supplied to other decoders in the system to indicate what action is to take place. The mini-decode circuit 241 receives job timing signals from the mini-control circuit 232 and various RM bits, and generates instructions to control the operation (e.g., loading, adding, subtracting, logic operations, transfer switching) of the mini-engine. The miscellaneous decode circuit 242 functions to perform partial decoding of certain miscellaneous mini-instructions, as well as to generate signals to set and reset the miscellaneous flip-flops. The main buss decode circuit 243 controls the gating of the inputs and the outputs of the main buss when required by other parts of the system. The shift control circuit 244 receives the SOP code of a mini-instruction and signals GOP09–11. This circuit decodes signals to indicate the type of shifting to be performed and sends control signals to the main engine 13, and also sends signals to the main engine control 245 indicating which registers are to be affected. The main engine control 245 controls the arithmetic, logic and loading operations of the main engine 13.

The basic machine clock cycle is 500 nanoseconds. Within this cycle there are ten phases, eight of which are distributed through the machine. As shown in FIG. 22, these phases are produced from a 10-bit ring counter, i.e., ten flip-flops in sequence. The ring counter is driven by a 50 nanosecond clock. The flip-flops are labelled A through J.

The output clock signals (FIG. 23) are KCP0 through KCP7, and the logic thereof is as follows:

KCP0=J·A (time 0)
KCP1=A·B (time 1)
KCP2=C·D (time 3)
KCP3=D·E (time 4)
KCP4=E·F (time 5)
KCP5=G·H (time 7)
KCP6=H·I (time 8)
KCP7=I·J (time 9)

The clock is started by depressing the start key (START-T) on the operator's console, and then releasing it (START-F). This triggers the last flip-flop in the ring counter which in turn starts the counter. A stop clock indicator is turned on whenever the 10 ring counter flip-flops are in the reset state simultaneously. A stop clock indication signal is Anded with the start clock signal (START-T) when starting the clock. The system clock will pause between KCP4 and KCP5 for an indefinite period of time to allow for a memory operation such as a memory busy condition. A clock error condition occurs if phase zero is up when any of the other nine phases are up. This condition causes all flip-flops in the ring counter to be reset and stops the clock. The stop clock indicator then indicates this condition to the operator.

The I/O channels 15 and 16 (FIG. 3*d*) serve as the link between the inner computer 10 and the peripheral units. Data transmitted between the control memory 42 and any input/output device passes through an I/O channel. The channels have the responsibility for controlling the quantity and destination of all data transmitted. They also perform limited counting and testing operations concerned with the transmission of data. Emulator routines for channel operation are stored in the control memory 42 just as are emulator routines for instruction emulation.

The operation of an I/O channel is initiated by the execution of one emulator instruction. Once started, the channel operates independently of the program being emulated from the main memory 11. Although a channel operation once started operates asynchronously, the program being emulated may exercise a large degree of supervisory control through instructions which test the status of the channel.

A single channel command may transmit a large block of words between the control memory 42 and a peripheral unit so that many instructions in the main memory 11 may be emulated during the time taken to execute just one command in the channel. All transmission to and from a channel is in thirty-six bit word parallel fashion.

Channel operations are controlled by commands, transferred from the main engine 13 to channel registers by the operation of channel mini-instructions (CH1, CH2). The commands are then decoded into specific channel operations which cause specified I/O devices to transfer data to and from the control memory 42 and to perform non-data transfer type operations, such as magnetic tape back-space operations, typewriter carriage returns, and so forth.

Two channels as illustrated may be employed. The CHBC flip-flop, which was described earlier, controls which of these two channels is to be loaded by the CH1 or CH2 mini-instructions. These mini-instructions refer to channel 1 if the CHBC flip-flop is reset and refer to channel 2 if the CHBC flip-flop is set.

Upon execution of a channel register 1 (either CHR1 in FIG. 3*d* depending on which channel is being serviced) mini-instruction, the contents of the main engine PB register, which contains an I/O command, device type, device number, and mode of operation, are placed on the main buss 50. The channel then loads the information from the buss 50 into channel register No. 1 (either register 300 or 301 in FIG. 3*d* depending on which channel 15 or 16 is selected). Channel register 1 receives only bits 0, 8, 9, and 10 of the instruction op-code (bits 0–11) since the other bits are redundant as far as the I/O channel is concerned. In the case of magnetic tapes, the command is decoded into any one of the channel commands shown in the table below. The tape device number specified by bits 32–35 is addressed and, in the case of a data transfer command, the channel will automatically start transferring data to or from the buffer service area of the control memory 42.

COMMANDS SENT TO I/O CHANNEL

| Instruction OP-Code | | | Bits | | | | |
|---|---|---|---|---|---|---|---|
| Mnemonic | Bits 0-11 (Octal) | Description | 0 | 8 | 9 | 10 | Decode |
| RDS | +0762 | Read Select | 0 | 0 | 0 | 1 | HRDS |
| WRS | +0766 | Write Select | 0 | 0 | 1 | 1 | HWRS |
| BSR | +0764 | Backspace Record | 0 | 0 | 1 | 0 | HBSR |
| BSF | −0764 | Backspace File | 1 | 0 | 1 | 0 | HBSF |
| WEF | +0770 | Write End-of-File | 0 | 1 | 0 | 0 | HWEF |
| REW | +0772 | Rewind | 0 | 1 | 0 | 1 | HREW |
| RUN | −0772 | Rewind and Unload | 1 | 1 | 0 | 1 | HRUN |
| SDN | +0776 | Set Density | 0 | 1 | 1 | 1 | HSDN |
| ERSE | --------- | Erase Tape (Special) | 1 | 0 | 1 | 1 | HERSE |
| ---------- | ---------- | Load Machine from Tape (Special). | 1 | 0 | 0 | 0 | HLDCD |

Bits 28 through 35 of the channel Register 1 designate the device type (e.g., magnetic tape unit, typewriter) and the device number (e.g., tape unit 1, 2, etc.) to be used when performing the channel operation. Bits 28, 29 and 30 define the type of operation (tape, card reader, typewriter); bit 31 defines either the mode (binary, BCD), or the magnetic tape density to be used. Bits 32–35 contain the device number to be addressed by the channel command. The table below contains the address of the input/output devices and the related channel 1 decode signals. Both the binary and the BCD address of the I/O device are included.

DECODE OF I/O INSTRUCTION ADDRESS

| Octal I/O Instruction Address (Bits 24-35) | Device Type (Bits 28-30) | Mode (Bits 31) | Device No. (Bits 32-35), | Description |
|---|---|---|---|---|
| 1201 | 100 | 0 | 0001 | Tapes, BDC or Low Density #1 thru #10. |
| : | : | : | : | |
| 1212 | 100 | 0 | 1010 | |
| 1221 | 100 | 1 | 0001 | Tapes, Binary or Hi Density #1 thru #10. |
| : | : | : | : | |
| 1232 | 100 | 1 | 1010 | |
| 1321 | 110 | 1 | 0001 | Card Read #1 BCD. |
| 1361 | 111 | 1 | 0001 | Printer #1 Normal (Decimal). |
| 1362 | 111 | 1 | 0010 | Printer #1 Binary. |

After the command is stored in the channel register 1, it is further decoded into specific operations and/or checks. These are listed and defined below:

HBS=Tape backspace, a record or a file.
HREV=Reverse tape operation (BSR, BSF, REW, RUN).
HYTP=Typewriter Selected.
HTAP=Magnetic Tape Selected.
HCRS=Card Reader Selected.
HBCD=Binary mode.
HDEOK=Density O.K.
HAWT=Actual write tape operation (WRS or WEF).
HWRT=Write tape operation (WRS, WEF, ERSE).
HRDT=Read tape operation.
HNOP=Acts as a reset term for the channel logic to initialize it prior to going busy.
$\overline{\text{HNOP}}$=Is a check to insure that only available commands have been decoded before the channel goes busy.

The channel register 2 (302 and 303 in FIG. 3*d*) are each seven-bit registers and one is used during a read and a write operation, but it functions differently during each of the operations. During a write operation, an emulator subroutine keeps track of the total number of words to be written. It does this only when the number of words to be written exceeds the total capacity (32 words) of the buffer area in the control memory 42. The buffer area within the core storage unit of the control memory 42 includes buffers A, B, C, and D, each of which has a capacity of eight words. When a channel buffer service request is received, the number eight is subtracted from the total number of words to be written (word count) until the word count is equal to or less than 32. The remaining word count is loaded into the channel register 2 with a CH2 mini-instruction. When an equal compare is reached, the stop writing signal is enabled, which stops the operation. The end address is placed in the channel register 2. This register is not used for a read operation unless an error occurs. When an error condition occurs, the error address is placed in the six least significant bits of the channel register 2.

The channel word buffers 74 and 75 are each thirty-six bits in length. During a write select operation, thirty-six bits of information (HBI00–35) are loaded into one of these buffers from the control memory 42. The outputs of the selected buffer are then gated six bits at a time to its respective write character buffer 306 or 307. During a card reader operation, the data is gated directly to the channel word buffer, twelve bits at a time, at character counts of 0, 1, 2. When the channel word buffer is full (character count of 2) a channel memory request is set so that the word can be written to control memory via lines HDM00–35. Magnetic tape read data is received by the channel word buffer six bits at a time from the associated read buffers, at character counts of 0, 1, 2, 3, 4, and 5. The information is either converted tape read data (BCD conversion) or buffered tape read data (no conversion required). As in the card reader operation, a memory request is needed to transfer the word information to the control memory 42. All data transmissions to and from the peripheral units are routed through the channel word buffer to be either sent to the control memory 42 thirty-six bits at a time or to the peripheral unit via the appropriate write character buffer at the correct character count.

A channel buffer service request (HCBSR–T) is provided on a line 309 to tell the scheduler 43 that one of the four buffers (A, B, C, D) in control memory 42 is full or empty. This occurs during either a read or write operation and is an indication that a transfer of data between the control memory 42 and the main memory 11 is necessary.

In dual channel systems (as shown in FIG. 3*d*), the I/O buffer area for channel 1 includes control memory word locations 200 through 237 (octal). A channel buffer service request is generated every ten octal words for magnetic tape operations. For card reader or printer operations, one buffer service request is genearted for each card record read or typewriter record printed. The channel 2 I/O buffer area includes control memory locations 240 through 277 (octal). A buffer service request is generated every ten octal words for magnetic tape read or write op- During I/O operations, data is actually transferred between an I/O device (magnetic tape, card reader, typewriter) and a buffer area (A, B, C, D) in the control memory 42. All data movement to and from the channel involves the buffer area of the control memory. There are four buffers of eight words each, which are set aside for transmission of data between the peripheral units and any storage area in the main memory 11 designated by the program being emulated. During a read operation, the channel transmits the data to the buffer area starting at the low order address. When the channel has filled the last buffer, it starts over at the low order address and the cycle continues. Each channel buffer service request will be answered by the scheduler 42 and the wired-in-sequence 44 on a priority basis as described earlier. Handling of the data placed into the buffer areas is done by a buffer service emulator routine. Data transmission for write operations is essentially done in reverse of a read operation. On a write operation, the channel extracts information from the buffer areas and sends it on to the designated peripheral unit. That is the channel receives data from the control memory and places this into the channel word buffer. This buffer then dumps the data to the peripheral unit (e.g., tape unit). When dumped, the channel then generates a new address to the control memory to pick out the next word, and this continues until thirty-two words have been taken from the control memory. If the channel is to receive more than eight words, it signals the scheduler that an eight word portion of the control memory buffer area is empty and that the scheduler is to refill the buffer area with new data to be sent to the channel.

The channel control includes terminate logic to terminate either a read or write operation when the address counter in the channel control equals the end address held in the channel register 2. During a write select operation, for example, this occurs when a CH2 POP code and not a load SOP code is decoded which gates the end address from the main buss 50 to the channel register 2. When the two addresses are equal the operation will be terminated, and the signal HTERM–T will be generated and sent to the scheduler.

EMULATOR INSTRUCTIONS

The emulator, or mini, instructions are eighteen bits in length and are loaded into the control memory. They have the following general format:

| Bits 0 5 | 6 11 | 12 17 |
|---|---|---|
| POP | SOP | ZONE |

The first field (bits 0–5) of the mini-instruction is called the primary operation (POP) code which defines the basic operation to be performed. There are forty five basic POP codes which fall into twenty two groups as follows:

| Group | POP description |
|---|---|
| 1 | Main Engine. |
| 2 | Load Immediate. |
| 3 | Load Direct. |
| 4 | Exchange. |
| 5 | Mini Engine. |
| 6 | Mini Exchange. |
| 7 | Algebraic to PB Register. |
| 8 | Index Register and Instruction Counter. |
| 9 | Channel Register. |
| 10 | Delay or Load Address Keys. |
| 11 | Interrupt. |
| 12 | Load Entry Keys. |
| 13 | Memory. |
| 14 | Miscellaneous. |
| 15 | Shift. |
| 16 | Transfer. |
| 17 | Arithmetic Test. |
| 18 | General Test. |
| 19 | Halt. |
| 20 | No Operation. |
| 21 | Load Preset Conditions. |
| 22 | Exit. |

The second field (bits 6–11) of the mini-instruction is called the secondary operation (SOP) code which in general forms an extension of the POP code and further defines the operation to be performed. On some mini-instructions there is no SOP code. In general, certain groups of SOP codes may be used only with certain groups of POP codes. Any illegal combination will be ignored by the inner computer 10 and will have the same effect as a "no operation" code. There are 64 different SOP codes which may be divided into six basic groups, as follows:

| Group | SOP description |
|---|---|
| 1 | Main Engine. |
| 2 | Mini Engine. |
| 3 | Shift. |
| 4 | Miscellaneous. |
| 5 | Arithmetic Test. |
| 6 | General Test. |

The third and final field (bits 12–17) of the mini-instruction is called the Zone field or code. When executing POP codes in groups 1, 2, 4, 5, 7, and in some cases group 14, the Zone field truly represents the "zone" (a particular group of bits) of the register to be affected. With most of the POP codes in the above group, the zone defines 32 separate and distinct fields (see FIG. 4) of operation within the main engine PB, PC and PD registers. For example, these 36-bit registers may be used to perform a 6-bit add operation by zoning off the unnecessary or unwanted bits by means of the proper zone code in bits 12–17 of the mini-instruction. Some zone codes include a Q bit (FIG. 4) which is an overflow bit. For the POP codes not in the above groups, the zone field may take on the characteristics of a third operation code, may be used as a count field, an address field, a data field, or not necessary at all. There are 83 different zone codes, not including shift counts and bit patterns used under a "load immediate" group. The former may be divided into the following six groups:

| Group | Zone description |
|---|---|
| 1 | Main Engine. |
| 2 | Shift. |
| 3 | Mini Engine. |
| 4 | Memory. |
| 5 | Register. |
| 6 | Index Register. |

Bit 6 of the mini-instruction can be used as a "precondition" bit with certain POP codes. The states or conditions of certain General Control flip-flops will be recognized and will affect or alter the operation of certain mini-instructions if bit 6 is set (a "one" is present). In this case the SOP field consists of bits 7–11.

Bit 12 of the mini-instruction can be used as an "exit" bit with most POP codes. When bit 12 is set the emulator routine will exit to control from the scheduler after the instruction is executed, unless the instruction is being executed in a subroutine mode. In the latter case, a transfer or jump is made back to the emulator routine which "called" the subroutine being executed as was discussed previously in connection with the mini-engine and the SMCT mini-instruction. The various specific mini-instructions now will be discussed.

The format of the instructions (group 1) for the main engine 13 is as follows:

| Bits 0 5 | 6 | 7 11 | 12 | 13 17 |
|---|---|---|---|---|
| POP | PRE | SOP | EXIT | ZONE |

These main engine instructions include primary operation (POP) codes, secondary operation (SOP) codes and zone codes. Each of these codes, as well as precondition and exit bits (bits 6 and 12), will be described below. The main engine instructions are used to transfer information from one main engine register to any other main engine register, or to perform arithmetic or logical operations on the contents of the PB or PC registers, or both. The POP code describes the destination register and the SOP code describes the source register, or registers) involved in main engine operation, except when the LDD, LDB, or LDC (listed below) SOP codes are used. For the latter cases, the POP code describes the source and the SOP code describes the destination. When the LDB and LDC SOP codes are used, the information transferred between registers is "half-exchanged" by the main buss 50. This half-exchange occurs regardless of the settings of Pre and the Gex flip-flop. That is, bits 00–17 of the source register are loaded into bits 18–35 of the distination register, and bits 18–35 of the source register are loaded into bits 00–17 of the destination register. For any operation, only that part of the register or registers specified by the zone control code is affected. For arithmetic operations, the data is considered unsigned and true binary arithmetic is performed.

The primary operation (POP) codes (bits 0–5) are:

| Octal Code | Mnemonic | Description |
|---|---|---|
| 50 | PB | Main engine PB register. |
| 51 | PC | Main engine PC register. |
| 53 | PD | Main engine PD register. |
| 52 | PE | Main engine PE register. |

The secondary operation (SOP) codes (bits 7–11) include any main engine SOP code except LDD. The SOP codes are listed below.

| Octal Code | Mnemonic | Description |
|---|---|---|
| Arithmetic: | | |
| 00 | ZERO | Zeros. |
| 30 | B | C(PB). |
| 31 | C | C(PC). |
| 20 | D | C(PD). |
| 34 | B+1 | C(PB) plus 1. |
| 35 | C+1 | C(PC) plus 1. |
| 14 | B−1 | C(PB) minus 1. |
| 15 | C−1 | C(PC) minus 1. |
| 36 | B+C | C(PB) plus C(PC). |
| 16 | B−C | C(PB) minus C(PC). |
| 17 | C−B | C(PC) minus C(PB). |
| 06 | B−C−I | C(PB) minus C(PC) minus borrow. |
| 07 | C−B−I | C(PC) minus C(PB) minus borrow. |
| 26 | B+C+I | C(PB) plus C'PC) plus carry. |
| Logical: | | |
| 22 | NB | $\overline{C(PB)}$. |
| 23 | NC | $\overline{C(PC)}$. |
| 24 | B.C | C(PB) ANDed with C(PC). |
| 32 | BUC | C(PB) ORed with C(PC). |
| 11 | NB.C | $\overline{C(PB)}$ ANDed with $\underline{C(PC)}$. |
| 10 | B.NC | C(PB) ANDed with $\overline{C(PC)}$. |
| 02 | NB+1 | C(PB) plus 1. |
| 03 | NC+1 | C(PC) plus 1. |
| 12 | BEC | C(PB) EXCLUSIVE-ORed with C(PC). |
| 01 | DOL | Do Logical operation (present conditions). |
| Load: | | |
| 04 | LDB | Load PB. |
| 05 | LDC | Load PC. |
| 21 | LDD | Load PD. |

The letters in parentheses (e.g., "PB") indicate the registers involved. Thus, C(PB) means "contents of the PB register"; and $\overline{C(PB)}$ means "the logical NOT or inverse of the contents of the PB register."

The Zone code (bits 13–17) was discussed earlier, and any of the main engine zone control codes as shown in FIG. 4 may be used.

The preconditioned bit (bit 6) functions as a "no operation" (NOP) if the Pre bit is a one and the Gin flip-flop is set, except this does not occur when the PE (octal code 52) POP code or the LDB or LDC SOP codes are used. The exit bit (bit 12) causes an exit to take place after the instruction is executed if this bit is a one.

The format of the load immediate instructions (group 2) is as follows:

| Bits 0 5 | 6 11 | 12 | 13 17 |
|---|---|---|---|
| POP | DATA | CLEAR | ZONE |

This instruction is used to place a constant (the data field) in one of the PB, PC or PD registers of the main engine, and provides an efficient manner to load numbers into a register. The POP codes (bits 0–5) are:

| Octal Code | Mnemonic | Description |
|---|---|---|
| 14 | LIB | Load Immediate to PB. |
| 15 | LIC | Load Immediate to PC. |
| 17 | LID | Load Immediate to PD. |

Any six-bit configuration may be used in the data field (bits 6–11). The six-bit configuration in the data field is repeated six times to make a 36-bit word and then sent over the main buss 50 to the receiving register. Only the bits of this 36-bit word specified by the zone control code will be loaded into the receiving register. The bits in the receiving register outside of the field specified by zone control are not disturbed unless the clear bit (bit 12) of the mini-instruction is set. If the clear bit is set any data outside of the zone is cleared in the receiving register, and if not set this data is left undisturbed. Mini-instruction "153021," for example, causes the octal number 30 to be loaded in the PC register in bit positions 12–17 (as defined by the zone code 21 as seen in FIG. 4).

The format of the load direct instructions (group 3) is

| Bits 0–5 | Bits 6–17 |
|---|---|
| POP | DATA |

The POP codes (bits 0–5) are:

| Octal Code | Mnemonic | Description |
|---|---|---|
| 10 | MOPB | C(MOP) to PB. |
| 11 | MOPC | C(MOP) to PC. |

As discussed earlier, "C(MOP) to BB" means transfer the contents of the MOP register (36-bits) to the PB register. Any twelve-bit configuration may be used as the data field (bits 6–17). The entire eighteen bits of the mini-instruction are loaded into bits 18–35 of the specified main engine register. Bits 00–17 of this register are cleared to zero. The load direct POP code may be used, for example, to provide a means of direct address modification of mini-instructions. Zone control is not used.

The format of the exchange instructions (group 4) is:

| Bits 0–5 | 6 | 7–11 | 12 | 13–17 |
|---|---|---|---|---|
| POP | PRE | SOP | EXIT | ZONE |

These instructions allow the contents of main engine registers to be exchanged at the same time that an arithmetic or logical operation is being performed. The operation specified by the SOP code is performed and sent to the PD register. Meanwhile, the contents of the PD register are loaded into the PB or PC register depending on which POP code is used. Zone control affects each destination register. The POP codes (bits 0–5) are:

| Octal Code | Mnemonic | Description |
|---|---|---|
| 40 | PBD | SOP results to PD; C(PD) to PB. |
| 41 | PCD | SOP results to PD; C(PD) to PC. |

If the Pre bit is a one and the Gin flip-flop is set, this mini-instruction will act as a NOP. Any main engine SOP code except the load SOP codes (LDB, LDC, and LDD) may be used. An exit will occur after this mini-instruction is executed if the exit bit is a one. Any main engine zone control code may be used.

The format of the mini-engine instructions (group 5) is:

| Bits 0–5 | 6 | 7–11 | 12 | 13–17 |
|---|---|---|---|---|
| POP | PRE | SOP | EXIT | ZONE |

The POP codes (bits 0–5) are:

| Octal Code | Mnemonic | Description |
|---|---|---|
| 42 | RC | Mini engine RC register. |
| 46 | RD | Mini engine RD register. |

Data will be half-exchanged on the main buss 50 Pre is a one and the Gex flip-flop is set. Any of the main engine SOP codes may be used. An exit will occur after the mini-instruction is executed if the exit bit is a one.

The zone control bits do not affect data transfered to the mini-engine registers except when a zone code of 32 octal (floating point exponent bits 00–08) is used with an RC POP code. This is discussed below. Normally eleven bits are transfered to or from the RB and RD registers, and six bits (bits 05–10 only are transferred to and from the RC register. Bits 00–04 are cleared when loading the RD register. Zone control bits do affect data transferred from the mini-engine to the main engine (load SOP codes). Main engine zone control codes are used.

The mini-engine POP codes are used to transfer data between the main engine and the mini-engine. When the main engine arithmetic and logical SOP codes are used with the mini-engine POP codes, the contents of a main engine register or the results of a main engine operation are loaded into the mini-engine register. In this case the SOP code specifies the source and the POP code specifies the destination. Only the least significant eleven bits (bits 25–35) are transferred from the main engine on an RB or RD POP code, and only bits 30–35 on an RC POP code. Zone control has no effect for an arithmetic or logical SOP code except when a zone code of 32 (floating zone) is used with an RD POP code as noted above. In this case eight bits (bits PE 01–08) of the main engine are transferred by a line 138 to the RC register (bits 03–01). For the load SOP codes, data is transferred from the mini-engine to the main engine and is affected by zone control. Eleven bits are transferred over the main buss from the RB and RD registers, and normally six bits are transferred over the main buss from the RC register. When an RC POP code is used with a load SOP code and a zone control code of 32 octal (floating zone), eight bits (bits 03–10) are transferred from the RC register by a line 139 to any one of the main engine PB, PC or PD registers (bits 01–08).

The format of the mini-exchange instructions (group 6) is:

| Bits 0–5 | 6–11 | 12 | 13 | 14 | 15 | 16 | 17 |
|---|---|---|---|---|---|---|---|
| 02 | SOP | EXIT | | EXCH | RB | RC | RD |

The POP code (bits 0–5) is:

| Octal Code | Mnemonic | Description |
|---|---|---|
| 02 | MINI | Mini engine operation |

The mini-engine SOP codes defined below are:

| Octal Code | Mnemonic | Description |
|---|---|---|
| 30 | RB | C(RB). |
| 31 | RC | C(RC). |
| 34 | RB+1 | C(RB) plus 1. |
| 35 | RC+1 | C(RC) plus 1. |
| 15 | RC−1 | C(RC) minus 1. |
| 36 | RB+RC | C(RB) plus C(RC). |
| 16 | RD−RC | C(RB) minus C(RC). |

If the exit bit is a one, an exit will occur after the instruction is executed. Bit 13 is not used.

This mini-instruction is used to perform mini-engine arithmetic operations or exchange data between registers of the mini-engine or both. The data exchanged is eleven bits in length (no zone control is used). What normally is a zone field (bits 13–17) is used as an extension of the operation code. The SOP code generally indicates the source of the data and bits 15–17 specify the destination of the data. However, the RD register may also be used as a source. The particular operation to be perfomed is controlled by the exchange bit (bit 14). Valid combinations for the modifier bits are as follows:

| Bit | | | | | | |
|---|---|---|---|---|---|---|
| 14 EX | 15 RB | 16 RC | 17 RD | Octal Code | Mnemonic | Description |
| 0 | 0 | 0 | 0 | 00 | NOP | No data exchange. |
| 0 | 0 | 1 | 0 | 02 | RC | SOP results to RC. |
| 0 | 1 | 0 | 0 | 04 | RB | SOP results to RB. |
| 0 | 1 | 1 | 0 | 06 | ---------- | SOP results to RB and RC. |
| 1 | 0 | 0 | 0 | 10 | ---------- | No data exchange. |
| 1 | 0 | 1 | 0 | 12 | ---------- | C(RD) to RC. |
| 1 | 1 | 0 | 0 | 14 | ---------- | C(RD) to RB. |
| 1 | 1 | 1 | 0 | 16 | ---------- | C(RD) to RB and RC. |
| 1 | 0 | 0 | 1 | 11 | RD | SOP results to RD. |
| 1 | 0 | 1 | 1 | 13 | ---------- | SOP results to RD;C(RD) to RC. |
| 1 | 1 | 0 | 1 | 15 | ---------- | SOP results to RD;C(RD) to RB. |
| 1 | 1 | 1 | 1 | 17 | ---------- | SOP results to RD;C(RD) to RB and RC. |

If this instruction changes the contents of the RB register (mini-instruction counter), an LMF cycle (mini fetch) is forced which essentially causes a transfer control operation, or batch, to take place. As has been described, the RB register usually points to the next sequential instruction. Thus, if the contents thereof are changed by the mini-exchange instruction, the RB register then points to some new instruction. The LMF cycle is forced in order to fetch this instruction for execution. During any LMF cycle, the RB register is updated by one.

The format of the algebraic instructions (group 7) is:

| Bits | 0 5 | 6 | 7 11 | 12 17 |
|---|---|---|---|---|
| | 62 | PRE | 16 | ZONE |

The POP code (bits 0–5) is:

| Octal Code | Mnemonic | Description |
|---|---|---|
| 62 | ALG | Algebraic add; results PB. |

If the Pre bit is a one and the Gin flip-flop is set, this mini-instruction will function as a NOP. Only the main engine B–C SOP (16 octal) is used. Any main engine zone may be used.

An algebraic add is performed on the data in the PB and PC registers. The signs are assumed to be in conventional sign registers (not shown) associated with the PB and PC registers. If the signs of the two operands are alike, an add operation is performed and the result is stored in the PB register. The proper sign is already associated with the PB register. If the signs are not alike, the smaller operand is subtracted from the larger and the result stored in the PB register. The sign of the larger is stored in a sign register associated with the PB register. A carry out of the most significant bit position may be used to set an overflow indicator. The carry may be stored in a conventional manner.

The format of the index register (XR) and instruction counter (IC) instructions (group 8) is:

| Bits | 0 5 | 6 | 7 11 | 12 | 13 | | 15 | 16 | |
|---|---|---|---|---|---|---|---|---|---|
| | 44 | PRE | SOP | EXIT | EXCH | | XR | IC | |

The instruction registers (XR1–XR7) and the index register (IC) are shown in FIG. 3*e*. The POP code (bits 0–5) is:

| Octal Code | Mnemonic | Description |
|---|---|---|
| 44 | XIC | Index Register or Instruction Counter Operation. |

If the Pre bit is a one and the Gex flip-flop is set, a half exchange will be performed on the main buss. Any main engine SOP code may be used. If the Exit bit is a one, an exit will occur after the instruction is executed.

Bits 13–17 are termed modifier bits. Bit 13 set will cause the data as it passes over the main buss 50 to be half-exchanged (regardless of the condition of Pre and Gex). Bits 14 and 17 are not used. Bit 15 set indicates an index register operation is to be performed, and bit 16 set indicates an instruction counter operation.

Zone control is not provided with this instruction. For arithmetic or logical SOP codes, the main engine 13 is the source of data and an XR register or the IC register (see FIG. 3*e*) is the destination; and, for Load SOP codes, an XR register or the IC register is the source and the main engine 13 is the designation. The XR registers and the IC register are short registers and are considered as bits 21–35 with reference to the main buss 50. If an XR register is involved in the instruction, the particular XR register to be operated upon is specified by bits 18–20 of the PD register. If multiple tag mode is in effect it signifies that a certain computer with three index registers (XR*s*) is being emulated which has instructions specifying that the contents of any of these registers may be used individually; or an inclusive OR operation may be performed on any two or all three of these registers. An instruction being emulated specifies the multiple tag mode. The inclusive OR of the specified XR registers will be obtained when PD register bits 18–20 (tag bits of the emulated instruction) are equal to 3, 5, 6, or 7 octal.

The format of the channel register instructions (group 9) is:

| Bits | 0 5 | 6 | 7 11 | 12 | 13 17 |
|---|---|---|---|---|---|
| | POP | PRE | SOP | EXIT | ZONE |

The POP code (bits 0–5) are:

| Octal Code | Mnemonic | Description |
|---|---|---|
| 47 | CH1 | Channel Register No. 1. |
| 45 | CH2 | Channel Register No. 2. |

If the Pre bit is a one and the Gex flip-flop is set, a half-exchange will take place on the main buss 50. Any main engine SOP code may be used. If the Exit bit is a one, an exit will occur after the instruction is executed. A zone code of 00 octal, corresponding to bits 00–35 generally is used, although any main engine zone control code may be used.

The channel register mini-instructions may be used to move data or commands (arithmetic or logical SOP codes) from the main engine 13 to the channel registers (CHR1 or 2 of either I/O channel), or (load SOP codes) from the channel registers to the main engine. The same instructions will affect the specified registers of either channel 1 or 2 depending on whether the CHBC flip-flop is reset or set, respectively.

The use of a CH1 PTP code (except with load SOP codes) will initiate a channel operation. The data sent to the CH1 register should have the following format: An I/O command (bits 0, 8, 9, 10), a device type (bits 28–30), mode (bit 31), and, if necessary (where more than one device of a given type, e.g., plural tape units, are used), a device number (bits 32–35). Standard I/O commands were described in the discussion of the I/O channels. If the command is a data transfer, the channel will automatically start transferring data to or from a buffer service in the control memory 42, starting at the low order buffer address for the particular channel in operation.

Data transfer to the buffer area in the control memory is terminated by means of the CH2 POP code. On a read operation, the data transfer is terminated after transferring the required number of words, but the device, such as a tape unit, proceeds to the End-of Record without transferring further data as is conventional. On the write operation, the CH2 POP code is used to send an end address to the CHR2 register of the selected channel (over bits 29–35 of the main buss). Data transfer will stop when the end address (in the CHR2 register) agrees with the buffer address (HCA02–09) in the associated channel address counter within the channel control.

When an error occurs on a read operation, a flag (ER1 in a secondary indicator register) is set, and the error address may be obtained by using a CH2 POP code with a load SOP code, in order to determine the location of the error. This instruction gates the outputs of the CHR2 register and the address counter to the main buss 50 as follows: CHR2 register bits 3–5 are gated as main buss bits 30–32 (HCH30–32); CHR2 register bits 6–9 are gated as main buss bits 15–17 (HCH15–17); address counter bits 6–9 are gated as main buss bits 24–26 (HCH24–26). If the address counter bits 6–9 are all false (zero), the main buss bit 23 (HCH23) will be true (one).

The format of the load address keys or delay instructions (group 10) is:

| Bits 0–5 | 6 | 7–11 | 12 | 13–17 |
|---|---|---|---|---|
| 54 | PRE | SOP | EXIT | ZONE |

The POP codes (bits 0–5) are:

| Octal Code | Mnemonic | Description |
|---|---|---|
| 54 | LAK | Load Address Keys |
| 54 | DELAY | Hang Current Level Temporarily |

If the Pre bit is a one and the Gex flip-flop is set, a half-exchange of the data will take place. Any main engine SOP code may be used. However, only the load SOP codes are effective in loading the address keys as noted below. If the Exit bit is a one, an exit will occur after the instruction is executed. A zone code of 00 octal, corresponding to bits 00–35 generally is used, although any main engine zone control code may be used.

When a load SOP code is used, the setting of the address keys (on the operator's console 14) is transmitted over the main buss 50 to the main engine PB, PC or PD registers. The use of any other SOP code will cause the save sequence YS0–YS5 of the wired-in-sequence to be performed, and control will return to the scheduler 43 which may then service certain other requests as previously described in connection with the scheduler operation. The return flip-flop for the scheduler level in effect when the delay instruction was executed will be set in approximately 100 microseconds, and control will be returned to that level when this return request is recognized by the scheduler.

The format of the interrupt instructions (group 11) is:

| Bits 0–5 | 6 | 7–11 | 12 | 13–17 |
|---|---|---|---|---|
| POP | PRE | SOP | EXIT | ZONE |

The POP code (bits 0–5) are:

| Octal Code | Mnemonic | Description |
|---|---|---|
| 57 | INT | Load Interrupts into Main Engine. |

If the Pre bit is a one, and the Gex flip-flop is set, a half-exchange will occur on the main buss. Only the main engine load SOP codes may be used. If the exit bit is a one, an exit will occur after this instruction is executed. Any main engine zone control code may be used.

The interrupt instruction is used to load the status of the scheduler (INT19–35) and console (INT08–14) interrupt flip-flops into the main engine. The interrupts and the bit positions they occupy in a register (provided a half-exchange has not taken place) are shown below:

| Bit | Console switch | Flip-flop | Description |
|---|---|---|---|
| 01 | | INT01 | Postpone Trap. |
| 08 | TKIT | INT08 | Interval Timer. |
| 09 | SPRES | INT09 | Reset. |
| 10 | TCLR | INT10 | Clear. |
| 11 | TLDC | INT11 | Load Card. |
| 12 | TLDT | INT12 | Load Tape. |
| 13 | TENTR | INT13 | Execute Entry. |
| 14 | TDIS | INT14 | Execute Display. |
| 19 | | INT19 | Buffer Service Request, Channel 1. |
| 20 | | INT20 | Job in progress, level 1. |
| 21 | | INT21 | Return request, level 1. |
| 22 | | INT22 | Hang, level 1. |
| 23 | | INT23 | Buffer Service Request, Channel 2. |
| 24 | | INT24 | Job in progress, level 2. |
| 25 | | INT25 | Return request, level 2. |
| 26 | | INT26 | Hang, level 2. |
| 27 | | INT27 | Terminate request. |
| 28 | | INT28 | Job in progress, level 3. |
| 29 | | INT29 | Return request, level 3. |
| 30 | | INT30 | Hang, level 3. |
| 31 | | INT31 | Program trap request. |
| 32 | | INT32 | Program request. |
| 33 | | INT33 | Job in progress, level 4. |
| 34 | | INT34 | Return request, level 4. |
| 35 | | INT35 | Hang, level 4. |

This interrupt instruction normally is used to service the console interrupts (INT08–INT14). In a typical application the INT POP code is used to load the console interrupts, then a normalize operation is performed to identify the interrupt of highest priority. Interrupts with lower numbers have higher priority.

The format of the keys instruction (group 12)

| Bits 0–5 | 6 | 7–11 | 12 | 13–17 |
|---|---|---|---|---|
| 55 | PRE | SOP | EXIT | ZONE |

This mini-instruction is used to load the contents of the console entry keys to the main engine register specified by the SOP code. The POP code (bits 0–5) is:

| Octal Code | Mnemonic | Description |
|---|---|---|
| 44 | KEYS | Load console Entry Keys into main engine. |

If the Pre bit is a one, and the Gex flip-flop is set, a half-exchange takes place over the main buss. Only the main engine load SOP codes may be used. If the exit bit is a one, an exit will occur after this instruction is executed. Any main engine zone control code may be used.

The memory instructions (group 13) fall into two categories. The format of the first is:

| Bits 0–5 | 6 | 7–11 | 12 | 13 | 14 | 15 | 16 | 17 |
|---|---|---|---|---|---|---|---|---|
| POP | PRE | SOP | EXIT | CMMM | RD/WR | PB | PC | PD |

The POP codes (bits 0–5) are:

| Octal Code | Mne-monic | Description |
|---|---|---|
| 67 | HEM | Read from memory the main engine; Write from main engine to memory. |
| 63 | MKEY | Read from memory the main engine; Write from entry keys to memory. |

For the MEM POP code, if the Pre bit is a one and the Gex flip-flop is set, a half-exchange takes place on the main buss. Bit 6 is zero for the MKEY POP code. Any main engine SOP code may be used. When the Exit bit is a one, an exit will occur after the instruction is executed.

When the CM/MM bit (bit 13) is a zero, the control memory is to be accessed; and when it is a one, the main memory is to be accessed. When the RD/WR bit (bit 14) is a zero, a read memory operation is to be performed; and when it is a one, a write memory operation is to be performed. When the PB bit is a one, the data is transferred to or from the PB register. When the PC bit is a one, the data is transferred to or from the PC register. When the PD bit is a one, the data is transferred to or from the PD register.

This first category of memory instructions is used to transfer data between the main engine and the control memory or main memory, and from the console entry keys to either memory. The address or core location in memory to be accessed is determined by the SOP code. For arithmetic or logical SOP codes, the address originates in the main engine 13 and is sent over the main buss 50 to the address register (67 or 97) of the appropriate memory. For load SOP codes, the address is taken from the console address keys and sent to the appropriate memory address register. Normally, a load SOP code will affect the specified main engine register, but in the case of the MEM POP code, loading of the main engine with the address from the address keys is inhibited.

For read memory operations (bit 14=0), the data from memory is loaded into the main engine register or registers specified by bits 15–17. More than one register may be loaded with the same data using a single instruction.

For the MEM POP code and a write operation (bit 14=1), zeros will be stored in memory if bits 15, 16, and 17 of the instruction are equal to zero. If one of these bits is set, the data from the indicated register (PB, PC or PD) is stored in memory. If more than one of these bits is set, the logical OR of the data in the specified registers will be stored in memory.

With the MKEYS POP code, bits 15–17 are not meaningful on a write operation since the data originates from the console entry keys instead of a main engine register. However, if a load SOP code also is used on a write operation, the data from the entry keys will be loaded into the specified main engine register.

Mnemonics for combinations of bits 13–17 are shown below:

| Octal Code | Binary bits 13 | 14 | 15 | 16 | 17 | Mne-monic | Description |
|---|---|---|---|---|---|---|---|
| | | | | | | | Read operations (MEM and MKEY POP code) |
| 04 | 0 | 0 | 1 | 0 | 0 | ARB | C(Control memory) to PB. |
| 02 | 0 | 0 | 0 | 1 | 0 | ARC | C(Control memory) to PC. |
| 01 | 0 | 0 | 0 | 0 | 1 | ARD | C(Control memory) to PD. |
| 24 | 1 | 0 | 1 | 0 | 0 | SRC | C(Main memory) to PB. |
| 22 | 1 | 0 | 0 | 1 | 0 | SRC | C(Main memory) to PC. |
| 21 | 1 | 0 | 0 | 0 | 1 | SRD | C(Main memory) to PD. |
| | | | | | | | Write operations (MEM POP code only) |
| 14 | 0 | 1 | 1 | 0 | 0 | AWB | C(PB) to control memory. |
| 12 | 0 | 1 | 0 | 1 | 0 | AWC | C(PC) to control memory. |
| 11 | 0 | 1 | 0 | 0 | 1 | AWD | C(PD) to control memory. |
| 10 | 0 | 1 | 0 | 0 | 0 | AWZ | Zeros to control memory. |
| 34 | 1 | 1 | 1 | 0 | 0 | SWB | C(PB) to main memory. |
| 32 | 1 | 1 | 0 | 1 | 0 | SWC | C(PC) to main memory. |
| 31 | 1 | 1 | 0 | 0 | 1 | SWD | C(PD) to main memory. |
| 30 | 1 | 1 | 0 | 0 | 0 | SWZ | Zeros to main memory. |
| | | | | | | | Write operations (MKEY POP code only) |
| 1X | 0 | 1 | X | X | X | AWK | C(Console entry keys) to control memory. |
| 3X | 1 | 1 | X | X | X | SWK | C(Console entry keys) to main memory. |

X is equal to any value (0–7 octal or 0, 1 binary).

The format of the second category of memory instructions is:

| Bits 0–5 | 6 | 7–11 | 12 | 13–17 |
|---|---|---|---|---|
| 77 | PRE | SOP | EXIT | ADDR |

The POP code (bits 0–5) is:

| Octal Code | Mne-monic | Description |
|---|---|---|
| 77 | REG | Read or write to special registers. |

If the Pre bit is a one and the Gex flip-flop is set, a half-exchange will occur on the main buss. Any main engine SOP code may be used. If the Exit bit is a one, an exit will occur after this instruction is performed. The five ADDR bits (bits 13–17) specify the address of the register to be accessed.

The registers operated on by the REG POP code consist of the accumulator (AC), multiplier-quotient (MQ), sense indicators (SI), and absolute (full 36 bit words with no reference to the right or left half thereof) core locations 00 and 04–37 (octal) of control memory. With the exception of the AC register, all of these registers are 36 bits in length. The addresses and functions of the registers are as follows:

| Octal address | Mne-monic | Description |
|---|---|---|
| 00 | REGO | Working Storage. |
| 01 | AC | Accumulator (hard register). |
| 02 | MQ | Multiplier-Quotient (hard register). |
| 03 | SI | Sense Indicators (hard register). |
| 04 | AUX1 | Execute Register No. 1. |
| 05 | REG5 | Temporary Storage. |
| 06 | BCWA | Buffer Control Word, Channel 1. |
| 07 | BCWB | Buffer Control Word, Channel 2. |
| 10 | AUX2 | Execute Register No. 2. |
| 11 | DATE | Printer Date. |
| 12 | RCWA | Retry Control Word, Channel 1. |
| 13 | RCWB | Retry Control Word, Channel 2. |
| 14 | DCWA | Data Control Word, Channel 1. |
| 15 | DCWB | Data Control Word, Channel 2. |
| 16 | IWA | Initialize Word, Channel 1. |
| 17 | IWB | Initialize Word, Channel 2. |
| 20 | CPA | Command Pointer Word, Channel 1. |
| 21 | CPB | Command Pointer Word, Channel 2. |
| 22 | CWA | Command Word, Channel 1. |
| 23 | CWB | Command Word, Channel 2. |
| 24 | ---------- | To Save CAO; CAQ; CRQ Instruction. |
| 25 | REG25 | Temporary Storage. |
| 26 | DSRA | Data Select Register, Channel 1. |
| 27 | DSRB | Data Select Register, Channel 2. |
| 30 | NSRA | Non-data Select Register, Channel 1. |
| 31 | NSRB | Non-data Select Register, Channel 2. |
| 32 | ACPA | Auxiliary Comm. and Pointer, Channel 1. |
| 33 | ACPB | Auxiliary Comm. and Pointer, Channel 2. |
| 34 | IPW | Initialize Print Word. |
| 35 | ---------- | (Not used). |
| 36 | ---------- | Do. |
| 37 | ---------- | Do. |

Arithmetic and logical SOP codes cause a write operation, i.e., data from the main engine as specified by the SOP code is stored in a register. A load SOP code indicates a read operation, i.e., information is read from a register and loaded into the main engine. When addresses of 01, 02, and 03 are used, the hard registers (AC, MQ, and SI) are accessed instead of the control memory. When addresses 00, and 04–37 are used in the instruction, control memory locations having these addresses are accessed, subject to the state of the CHBC flip-flop. If this is set, the least significant bit of the address (core locations only) will be forced to a one. Thus, an address of 20 would cause control memory location 21 to be addressed if the CHBC flip-flop were set. In particular, an address of 00 with the CHBC flip-flop set would cause core location 01 to be accessed, not hard register 01 (AC). In this way, the same instruction may be used to service two different registers, depending on the setting of the CHBC flip-flop.

When registers 04 (AUX1) and 10 (AUX2) are written into using a REG POP code, the respective YAUX1 and YAUX2 flip-flops in the wired-in-sequence will be set. When the YAUX1 flip-flop is set in this manner, the trap postpone flip-flop is also set. However, if the REG POP code which caused the trap postpone flip-flop to be set also has the exit bit on, the exit occurs and the scheduler gains control before the trap postpone flip-flop has time to set, which means that this flip-flop will not affect the next decision of the scheduler.

The format of the miscellaneous instructions (group 14) is:

| Bits 0 5 | 6 11 | 12 | 13 17 |
|---|---|---|---|
| 06 | SOP | EXIT | (NOT USED) |

This instruction is used to set and reset various flip-flops in the system. The SOP field defines the operation to be performed. Bits 13–17 are not used. Zone control does not apply. The POP code (bits 0–5) is:

| Octal Code | Mnemonic | Description |
|---|---|---|
| 06 | MISC | Set and reset specified flip-flop or indicator. |

The following SOP codes may be used:

| Octal Code | Mnemonic | Description |
|---|---|---|
| 12 | RT1 | Reset Interval Timer. |
| 16 | TRER | Reset Terminate. |
| 42 | SR1 | Set Buffer Request (Channel 1). |
| 46 | SR3 | Set Terminate Request. |
| 50 | SRT | Set Channel Trap Request. |
| 52 | SR4 | Set Program Request. |
| 54 | HANG | Hang Present Level. |
| 56 | POST | Set Trap Postpone. |
| 60 | HALT | Set Program Halt and Hang Level 4. |
| 62 | RH1 | Reset Buffer Hang. |
| 66 | RH3 | Reset Terminate Hang. |
| 70 | RH4 | Reset Program Hang. |
| 72 | RCN | Reset Console Request. |
| 76 | RINT | Reset All Hangs and Requests (will not reset Console Request, JIP3, Trap Request, Program Request, JIP4, and Hang 4 unless Halt flip-flop is set). |
| 20 | RAQ | Reset Q-Bit. |
| 21 | SAQ | Set Q-Bit. |
| 22 | TAQ | Toggle Q-Bit. |
| 23 | FOFA | Set Floating Overflow (AC). |
| 24 | RAS | Reset AC Sign. |
| 25 | SAS | Set AC Sign. |
| 26 | TAS | Toggle AC Sign. |
| 27 | FOFQ | Set Floating Overflow (MQ). |
| 33 | RSQ | Reset AC Sign and Q-Bit. |
| 37 | ACK | Acknowledge Buffer Request. |
| 74 | RESL4 | Reset Level 4 (resets HALF flip-flop, JIP4, HANG 4, RETURN 4 and Program Request). |

If the exit bit is a one, an exit will occur after the instruction is executed.

The format of the shift instructions (group 15) is:

| Bits 0 5 | 6 | 7 11 | 12 17 |
|---|---|---|---|
| 66 | PRE | SOP | SHIFT COUNT |

The POP code (bits 0–5) is:

| Octal Code | Mnemonic | Description |
|---|---|---|
| 66 | SHIFT | Performs shift, multiply, and divide operations. |

If the Pre bit is a one, and the Gin flip-flop is set, this instruction will function as a NOP. The shift SOP codes defined below are used.

| Octal Code | Mnemonic | Description |
|---|---|---|
| 02 | B-L | Shift C(PB), bits 00-35, left. |
| 03 | B-R | Shift C(PB), bits 00-35, right. |
| 22 | C-L | Shift C(PC), bits 00-35, left. |
| 23 | C-R | Shift C(PC), bits 00-35, right. |
| 04 | D-L | Shift C(PD), bits 00-35, left. |
| 05 | D-R | Shift C(PD), bits 00-35, right. |
| 06 | BD-L | Shift C(PB), bits 00-35, and C(PD), bits 00-35, left as one register. |
| 07 | BD-R | Shift C(PB), bits 00-35, and C(PD), bits 00-35, right as one register. |
| 26 | CD-L | Shift C(PC), bits 00-35, and C(PD), bits 00-35, left as one register. |
| 27 | CD-R | Shift C(PC), bits 00-35, and C(PD), bits 00-35, right as one register. |
| 12 | D-ROT | Rotate C(PD), bits 00-35, left; bits shifted out of position 00 enter position 35. |
| 24 | D-LS | Save sign (PD bit 00); Shift PD left. |
| 25 | D-RS | Shift PD right; Restore sign previously saved to PD bit 00. |
| 10 | DIV | Fixed-point divide. |
| 11 | MULT | Fixed-point multiply. |
| 16 | BD-LF | Shift C(PB), bits 09-35, and C(PD), bits 09,-35 left as one register (floating-point mantissa). |
| 17 | BD-RF | Shift C(PB), bits 09-35, and C(PD), bits 09-35, right as one register (floating-point mantissa). |
| 30 | FDIV | Floating Divide. |
| 31 | FMUL | Floating Multiply. |
| 14 | BD-N | Normalize (floating) C(PB), bits 09-35, and C(PD), bits 09-35, as one register. |
| 32 | BD-L9 | Shift C(PB), bits 09-35, and C(PD), bits 09-35, left as one register if PB bit 09=0. |
| 33 | BD-R9 | Shift C(PB), bits 09-35, and C(PD), bits 09-35, right as one register then set PB bit 09. |
| 20 | DOS | Do Shift specified by general control flip-flop. |

The shift count (bits 12–17) is loaded into the RC register (shift counter) unless a code of 77 octal is used. In the latter case (77 octal), whatever value is present in the RC will be used as a shift count. The following table summarizes the shift count possibilities:

| Octal Code | Mnemonic | Description |
|---|---|---|
| 00 OO | OO | Causes all shifts except BD-N and DOS to act as a NOP. |
| XX | XX | Shift XX bits, where XX is an octal number. |
| 77 | RC | Use present RC contents as the number of bits to be shifted. |

The shift POP code is used for all operations which require shifting, including fixed and floating-point multiply and divide operations. The SOP field specifies the registers involved in the shift operation, as well as the specific operation to be performed. The shift count field (bits 12–17) gives the number of bits to be shifted as explained above. In a multiply or divide operation, the shift count is also the number of bits in the operands which will be operated upon.

In the normalize operation (BD-N), the bits 09–35 of the PB register and bits 09–35 of the PD register are transferred together to the shift gates 102 and 103 (FIG. 3*f*) effectively as one register (PB is the most significant half) and shifted left until bit 09 of the PB register contains a one. Each time the data is shifted left one bit, the RC register is incremented by 1, using any value previously loaded into the RC register as the base.

For fixed point divide, the dividend must be in the PB register (most significant half) and PD (least significant half), and the divisor in the PC register. At the end of the divide operation, the quotient is in the PD register and the remainder in the PB register. For floating-point divide, the operation is the same as fixed-point divide except only bits 09–35 of the registers are affected.

For fixed point multiply, the multiplier must be in the PD register and the multiplicand in the PC register. At the end of the multiply operation, the most significant partial product is in the PB register and the least significant partial product is in the PD register. For floating-point multiply, the operation is the same as fixed point multiply except only bits 09–35 of the register are affected.

The general control flip-flops control the type of shift to be performed by the DOS SOP code. In this case, the shift count will be taken from bits 28–35 of the PD register instead of the shift count portion of the mini-instruction. The operations performed are as follows:

| Instruction emulated | General control F/Fs | | | |
|---|---|---|---|---|
| | GIN | GOP09 | GOP10 | GOP11 |
| ALS—Accumulator Left Shift | 0 | 0 | 1 | 1 |
| ARS—Accumulator Right Shift | 1 | 0 | 1 | 0 |
| LLS—Long Left Shift | 0 | 1 | 0 | 1 |
| LRS—Long Right Shift | 0 | 1 | 0 | 0 |
| LGL—Logical Left Shift | 1 | 1 | 1 | 1 |
| LGR—Logical Right Shift | 1 | 1 | 1 | 0 |
| RQL—Rotate MQ Left | 1 | 0 | 0 | 1 |
| NOP—No Operation | 0 | 0 | 0 | 0 |

The format of the transfer instructions (group 16) is:

| Bits 0–5 | 6 | 7–17 |
|---|---|---|
| POP | O | ADDRESS |

The POP code (bits 0–5) are:

| Octal Code | Mne-monic | Description |
|---|---|---|
| 16 | TRU | Transfer unconditionally. |
| 76 | SMCT | Store-Mini Counter and transfer. |

Bit 6 is a zero for both POP codes. The next mini-instruction will be taken from the control memory address (mini-location) specified by the address field (bits 7–17).

The TRU POP code will cause the eleven bit address field to be loaded into the RB register (mini-counter). The next instruction will be executed from the control memory and mini-location specified by the contents of the RB register.

The SCMT POP code, which was discussed earlier, will cause C(RB)+1 to be stored in the RD register. The address field of the mini-instruction is loaded into the RB register and the next instruction will be taken from the mini-location specified by RB. The subroutine mode flip-flop will be set. When the next exit occurs, control will not pass to the scheduler. Instead, C(RD) will be loaded into the RB register and the next instruction will be executed from the mini-location specified by RB. In this way, control returns to the instruction immediately following the SMCT instruction.

The format of the arithmetic test instructions (group 17) is:

| Bits 0–5 | 6–11 | 12 | 13–17 |
|---|---|---|---|
| POP | SOP | DIR | SKIP DISTANCE |

The POP code (bits 0–5) are:

| Octal Code | Mne-monic | Description |
|---|---|---|
| 61 | TA | Test Arithmetic condition; skip if test satisfied, otherwise take next sequential instruction. |
| 65 | TAE | Test Arithmetic condition; skip if test satisfied, otherwise exit. |
| 75 | TAW | Test Arithmetic condition and transfer to wire-in-sequence. |

The arithmetic test SOP codes below are used.

| Octal Code | Mne monic | Test condition |
|---|---|---|
| 00 | NO | No skip. Test unconditionally false. |
| 40 | YES | Skip. Test unconditionally true. |
| 01 | CF | Skip if no carry. (Note—the carry F/F will be set by a carry out of the MSB of the zone on a mian engine operation). |
| 41 | CAR | Skip if carry. (See note above.) |
| 02 | CX11F | Skip if carry F/F and GOP11 are equal. (This instruction sets LTSAT if Rapid Transfer, Carry, and GOP11 are true.) |
| 42 | CX11 | Skip if carry F/F and GOP11 are not equal. |
| 03 | G11F | Skip if GOP11 is false. |
| 43 | G11 | Skip if GOP11 is true. |
| 04 | NZ | Skip if PE is nonzero. (Note—the contents of PE register, including bit 0 are tested. PE is loaded under zone control). |
| 44 | Z | Skip if PE is zero. (See note above.) |
| 05 | N901F | Skip if GOP09 or NOT GOP10 is true. |
| 45 | N910 | Skip if NOT GOP09 and GOP10 are true. |
| 06 | G9F | Skip if GOP09 is false. |
| 46 | G9 | Skip if GOP09 is true. |
| 07 | G10F | Skip if GOP10 is false. |
| 47 | G10 | Skip if GOP10 is true. |
| 10 | RNZ | Skip if RE register (bits 3–10) are non-zero. |
| 50 | RZ | Skip if RE register (bits 3–10) are zero. |
| 11 | FCF | Skip if first carry is false. |
| 51 | FC | Skip if first carry is true. |
| 12 | GINF | Skip if GIN is false. |
| 52 | GIN | Skip if GIN is true. |
| 13 | FOFF | Skip if no floating overflow. |
| 53 | FOF | Skip if floating overflow. |
| 14 | C9F | Skip if no carry out of bit 9 in floating point operation. |
| 54 | C9 | Skip if carry out of bit 9 in floating point operation. |
| 15 | LSF | Skip if unlike signs in PB and PC registers (enabled by SMCT, SHIFT, ALG, REG, MEM, or KEYS POP codes). |
| 55 | LS | Skip if like signs in PB and PC registers. |
| 16 | AQF | Skip if Q-bit false. |
| 56 | AQ | Skip if Q-bit true. |
| 20 | ZX11F | Skip if zero test (result of arithmetic operation is zero) and GOP11 are equal. |
| 60 | ZX11 | Skip if zero test and GOP11 are not equal. |
| 21 | MSBF | Skip if PE bit 0 is false. |
| 61 | MSB | Skip if PE bit 0 is true. |
| 22 | LSBF | Skip if PE bit 35 is false. |
| 62 | LSB | Skip if PE bit 35 is true. |
| 24 | LESSF | Skip if PC not less than PB. (Sign bits are used). |
| 64 | LESS | Skip if PC is less than PB. (Sign bits are used.) |
| 77 | SAT | Skip if pervious test satisfied. |

If the Dir bit is a zero, the skip distance is to be added to the RB register (forward or positive skip). If the DIR bit is a one, the skip distance is to be subtracted from the RB register (backward or negative skip). The skip distance (bits 13–17) may be any number from 0 through 37 octal.

The arithmetic test instructions are used to test various arithmetic conditions or indicators specified by the SOP field, and then skip up to a maximum of 31 instructions either forward or backward or perform the next sequential instruction or exit depending on the outcome of the test. In any case, the contents of the RC register are unconditionally destroyed by the use of these POP codes. The exit bit is not used by this group.

The TA POP code tests the condition specified by the SOP code. If the test condition is satisfied, the skip distance (bits 13–17) will be added or subtracted from the RB register (mini-instruction counter) and the next instruction will be taken from the mini-location specified by the RB register. A skip distance of plus or minus zero results in repeating the same mini-instruction. If the test condition is not satisfied, the RB register is updated by one, and the next sequential instruction is executed.

The TAE POP code is used to test the condition specified by the SOP code, and if the test condition is satisfied, a skip is accomplished identical to that of the TA POP code. If the test condition is not satisfied, an exit will occur.

The TAW POP code causes an unconditional exit to state YB2 of the wired-in-sequence. The RB register is always updated by the skip distance and the LK4 flip-flop is reset. If the test specified by the SOP code is satisfied the LTSAT flip-flop in the translator C will be set.

The test instructions (group 18) fall into the categories of general test and secondary test instructions. The format of the general test instructions is:

| Bits 0–5 | 6–11 | 12 | 13–17 |
|---|---|---|---|
| POP | SOP | DIR | SKIP DISTANCE |

The POP code (bits 0–5) are:

| Octal Code | Mnemonic | Description |
|---|---|---|
| 60 | TC | Test General Indicator; skip if set, otherwise take next sequential instruction. |
| 64 | TGE | Test General Indicator; skip if set, otherwise exit. |
| 71 | TGF | Test General Indicator; skip if not set, otherwise take next sequential instruction. |
| 70 | TGS | Test and set General Indicator; skip if originally set, otherwise take next sequential instruction. |
| 74 | TGR | Test and reset General Indicator; skip if originally set, otherwise take next sequential instruction. |

The general test SOP codes below are used.

| Octal Code | G.I. reg. | Gated to Display Reg. bit | Mnemonic | Description |
|---|---|---|---|---|
| 00 | --- | --- | SSW | Sense switch (operation console) test. |
| 01 | --- | --- | | |
| 02 | --- | --- | | |
| 03 | --- | --- | | |
| 04 | 1 | 30 | MQO | MQ overflow. |
| 05 | 2 | 30 | | Unassigned. |
| 06 | 1 | 31 | EOFA | End-of-file, Channel 1.* |
| 07 | 2 | 31 | | Unassigned. |
| 10 | 1 | 18 | | Unassigned. |
| 11 | 2 | 18 | PASS1 | Temporary program control. |
| 12 | 1 | 06 | ECI | Enter Current Instruction. |
| 13 | 2 | 06 | | Unassigned. |
| 14 | 1 | 24 | EOFB | End-of-file, Channel 2.* |
| 15 | 2 | 24 | CCKB | Command Check, Channel 2. |
| 16 | 1 | 12 | DCTM | Divide Check Trap Mode. |
| 17 | 2 | 12 | RSPT | Read Select Printer Mode. |
| 20 | 1 | 19 | PDATE | Read Printer Date. |
| 21 | 2 | 19 | RNOT | Suppress Printer. |
| 22 | 1 | 07 | TCEB | Tape Check Enable, Channel 2.* |
| 23 | 2 | 07 | LOD | Load indicator. |
| 24 | 1 | 25 | CTEB | Command Trap Enable, Channel 2.* |
| 25 | 2 | 25 | | Unassigned. |
| 26 | 1 | 13 | | Unassigned. |
| 27 | 2 | 13 | | Unassigned. |
| 30 | 1 | 20 | DCK | Divide Check.* |
| 31 | 2 | 20 | | Unassigned. |
| 32 | 1 | 08 | TCEA | Tape Check Enable, Channel 1.* |
| 33 | 2 | 08 | | Unassigned. |
| 34 | 1 | 26 | CTEA | Command Trap Enable, Channel 1.* |
| 35 | 2 | 26 | | Unassigned. |
| 36 | 1 | 14 | IOC | I/O Check.* |
| 37 | 2 | 14 | DFAC | Double Add carry from bit 9. |
| 40 | 1 | 21 | TRAP | Transfer Trap Mode.* |
| 41 | 2 | 21 | ENT | Enter from Keys. |
| 42 | 1 | 09 | DIS | Display. |
| 43 | 2 | 09 | CCKA | Command Check, Channel 1. |
| 44 | 1 | 27 | TCKA | Tape Check Error, Channel 1.* |
| 45 | 2 | 27 | | Unassigned. |
| 46 | 1 | 15 | TCKB | Tape Check Error, Channel 2.* |
| 47 | 2 | 15 | | Unassigned. |
| 50 | 1 | 22 | SL4 | Sense Lite 4.* |
| 51 | 2 | 22 | SFD | Single Floating Divide. |
| 52 | 1 | 10 | SL1 | Sense Lite 1.* |
| 53 | 2 | 10 | | Unassigned. |
| 54 | 1 | 28 | SL2 | Sense Lite 2.* |
| 55 | 2 | 28 | NFT | Not Floating Trap Mode. |
| 56 | 1 | 16 | SL3 | Sense Lite 3.* |
| 57 | 2 | 16 | | Unassigned. |
| 60 | 1 | 23 | MTM | Multiple Tag Mode.* |
| 61 | 2 | 23 | | Unassigned |
| 62 | 1 | 11 | FMQ | MQ Factor Exceeded. |
| 63 | 2 | 11 | | Unassigned. |
| 64 | 1 | 29 | FPO | Floating Point Overflow. |
| 65 | 2 | 29 | | Unassigned. |
| 66 | 1 | 17 | FAC | AC Overflow. |
| 67 | 2 | 17 | | Unassigned. |
| 70 | 1 | 32 | TCN | Trap Control.* |
| 71 | 2 | 32 | FCFA | First Carry Fist Add. |
| 72 | 1 | 33 | PCD | Pre Divide Check. |
| 73 | 2 | 33 | | Unassigned. |
| 74 | 1 | 34 | CON | Console Request. |
| 75 | 2 | 34 | | Unassigned. |
| 76 | 1 | 35 | CIF | Current Instruction off. |
| 77 | 2 | 35 | | Unassigned. |

NOTE.—An * denotes a register bit, specified by the SOP code, which also controls a lamp on the operator's console.

If the Dir bit is a zero, the skip distance is to be added to the RB register (forward or positive skip). If the Dir bit is a one, the skip distance is to be subtracted from the RB register (backward, or negative skip). The skip distance (bits 13–17) may be any number from 0 through 37 octal.

The general test instructions are used to test the status of the general indicators (FIG. 3*b*) as specified by the SOP field, and then skip up to 31 instructions (either forward or backward) or perform the next sequential instruction, or exit, depending on the outcome of the test. The exit bit is not used with this group of instructions. All general indicators will be reset when the reset switch on the console is pressed.

The TG POP code will test the general indicator specified by the SOP field and skip if the indicator flip-flop is set (true). The skip is performed by either adding or subtracting (depending on bit 12 of the instruction) the skip distance to or from the RB register (mini-instruction counter) to obtain the location of the next mini-instruction. A skip disance of plus or minus zero results in repeating the same mini-instruction. If the indicator is reset (false) when the test is made, the RB register is updated by one causing the next sequential instruction to be taken.

The TGE POP code will test the general nidicator specified by the SOP field and skip if the indicator is true, or exit if the indicator is false. The TGF POP code will test the general indicator specified by the SOP field and skip if the indicator is false, or take the next sequential instruction if the indicator is true.

The TGR POP code performs like the TG POP code but also resets the specified indicator after the test is made. The TGS POP code performs like the TG POP code but also sets the specified indicator fater the test is made.

The format of the secondary test instructions is:

| Bits 0–5 | 6–11 | 12 | 13–17 |
|---|---|---|---|
| POP | SOP | DIR | SKIP DISTANCE |

The POP code (bits 0–5) are:

| Octal Code | Mnemonic | Description |
|---|---|---|
| 20 | TSG | Test Secondary Indicator; skip if set, otherwise take next sequential instruction. |
| 24 | TSGE | Test Secondary Indicator; skip if set, otherwise exit. |
| 31 | TSGF | Test Secondary Indicator; skip if not set, otherwise take next sequential instruction. |
| 30 | TSGS | Test and set Secondary Indicator; skip if originally set, otherwise take nest sequential instruction. |
| 34 | TSGR | Test and reset Secondary Indicator; skip if originally set, otherwise take next sequentila instruction. |

The secondary test SOP codes below are used.

| Octal Code | Mnemonic | Description |
|---|---|---|
| 00 | ER1A | Error. |
| 01 | ER2A | Transfer Timing Error. |
| 02 | | Unassigned. |
| 03 | CIOA | Channel in Operation. |
| 04 | WRSA | Write Select. |
| 05 | | Unassigned. |
| 06 | RHWA | Wait for reset and load channel instructions (RCH). |
| 07 | NSUA | Non Data Select Register in use. |
| 10 | BOTA | Beginning of Tape.* |
| 11 | EOTA | End of Tape.* |
| 12 | DSUA | Data Select Register in use. |
| 13 | D1A | End Data. |
| 14 | D2A | Error Processed. |
| 15 | D3A | Error This Block. |
| 16 | WEFA | Write End-of-File in Process. |
| 17 | BSFA | Backspace File. |
| 20 | CEFA | Channel End-of-File. |
| 21 | EORA | Channel End-of-Record. |
| 22 | FTMA | First Time Mark. |
| 23 | LCWA | Wait for load channel instruction (LCH). |
| 24 | LCPA | Load channel instruction present (LCH). |
| 25 | | Unassigned. |
| 26 | DSPA | Data Select in Process.* |
| 27 | IOPA | I/O in Process.* |
| 30 | RDYA | Channel Ready. |
| 31 | TERA | Terminate on Channel. |
| 32 | T1A | End of IOR. |
| 33 | T2A | End of Record. |
| 34 | T3A | End of Select. |
| 35 | FTUA | First Time Command Used. |
| 36 | CHBC | CHB Control F/F. |
| 37 | COP | Card or Print (Channel 1 only). |

NOTE.—The * denotes a register bit, specified by the SOP code, which also controls a lamp on the operator's console.

If the Dir bit is a zero, the skip distance is to be added to the RB register (forward or positive skip). If the Dir bit is a one, the skip distance is to be subtracted from the RB register (backward, or negative skip). The skip distance (bits 13–17 may be any number of 0 through 37 octal.

The secondary test POP codes are used to test the status of the secondary indicator flip-flops (FIG. 3*b*) under control of the CHBC flip-flop. There are actually two groups of 32 indicators, one group for channel 1 and one group for channel 2. Which group is tested depends on the state of the CHBC flip-flop. If the CHBC flip-flop is reset, the indicator group for channel 1 will be tested, and may be set or reset by the secondary test POP codes; and if the CHBC flip-flop is set, the indicator group for channel 2 will be tested and may be set or reset by these POP codes. The individual indicator affected is determined by the SOP code. Indicators of either group having SOP codes ending in 0 or 1 will be set by I/O channel control whenever the specified condition (for example, end-of-file) occurs on a particular I/O channel, and may be tested, set or reset by these mini-instructions.

Whenever a channel register CH1 POP code is executed, all the channel 1 indicators having SOP codes ending in 0 or 1 will be reset if the CHBC flip-flop is reset, and all the channel 2 indicators having SOP codes ending in 0 or 1 will be reset if the CHBC flip-flop is set. All secondary indicators (both groups) will be reset when the reset switch on the console is pressed, provided the system clock is not stopped.

The TSG POP code will test the secondary indicator specified by the SOP field and the CHBC flip-flop, and will skip if the indicator flip-flop is set (true). The skip is performed by either adding or subtracting the skip distance to the RB register (mini-instruction counter) to form the location of the next mini-instruction. A skip distance of plus or minus zero results in repeating the same mini-instruction. If the indicator is reset (false) when the test is made, the RB register is updated by one causing the next sequential instruction to be taken.

The TSGE POP code will test the secondary indicator specified by the SOP field and the CHBC flip-flop, and will skip if the indicator is true, or exit if the indicator is false.

The TSGF POP code will test the secondary indicator specified by the SOP field and the CHBC flip-flop, and will skip if the indicator is false, or take the next sequential instruction if the indicator is true.

The TSGR POP code performs like the TSG POP code, but also resets the specified indicator after the test is made. The CHBC flip-flop (SOP code 36) is not reset by this instruction. The TSGS POP code performs like the TSG POP code but also sets the specified indicator after the test is made.

The format of the halt instruction (group 19) is:

| Bits | 0 5 | 6 17 |
|---|---|---|
| | CO | (NOT USED) |

The POP code (bits 0–5) is:

| Octal Code | Mnemonic | Description |
|---|---|---|
| 00 | HALT | Stop machine |

Bits 6–17 are not used with this instruction.

This instruction stops the execution of instructions by stopping the machine clock. This is done regardless of whether any I/O operations are in progress. Halting with an I/O operation in progress may result in positioning errors. The machine may be restarted with the next sequential mini-instruction by pressing the start switch on the console.

The format of the no operation instruction (group 20) is:

| Bits | 0 5 | 6 17 |
|---|---|---|
| | 01 | (NOT USED) |

The POP code (bits 0–5) is:

| Octal Code | Mnemonic | Description |
|---|---|---|
| 01 | NOP | No operation. |

Bits 6–17 are not used with this instruction. The execution of this instruction results in no operation taking place. Any illegal (undefined) POP code will be treated as a NOP mini-instruction.

The format of the load preset conditions instructions (group 21) is:

| Bits 0 5 | | 8 | 9 | | 12 | | 14 | 15 | 16 | 17 |
|---|---|---|---|---|---|---|---|---|---|---|
| 12 | | LOAD | R/S | | GOP09 | | GOP11 | GEX | GIN | ARI |

The POP code (bits 0–5) is:

| Octal Code | Mnemonic | Description |
|---|---|---|
| 12 | PRE | Set or reset General Control F/F. |

If the Load bit is a zero, this instruction will function as a NOP. If the Load bit is a one, the operation specified by the remaining bits will be performed.

If the R/S bit (bit 9) is a zero, the specified flip-flops will be reset; and if a one, the specified flip-flops will be set. Bits 12 and 14–17 are explained below.

This instruction is used to set or reset the general control flip-flops. The flip-flops to be loaded are specified by bit 12 (GOP09), bit 14 (GOP11), bit 15 (GEX), bit 16 (GIN), and bit 17 (ARI). Each of the above flip-flops will be operated upon if a one appears in its particular bit position in the mini-instruction format above. If the bit corresponding to any flip-flop is zero, the flip-flop will not be affected by this instruction. The GOP10 flip-flop is not set or reset with this instruction. Bits 6, 7, 10, 11, and 13 are not used.

The format of the exit instruction (group 22) is:

| Bits | 0 5 | 6 11 | 12 17 |
|---|---|---|---|
| | 65 | 00 | (NOT USED) |

The POP code (bits 0–5) is:

| Octal Code | Mnemonic | Description |
|---|---|---|
| 65 | EXIT | Exit. |

The SOP field (bits 6–11) is zero. Bits 12–17 are not used.

This instruction is not actually a separate primary operation code, but is a special case of the TAE POP code. The zero SOP field causes the test to be false which unconditionally causes an exit to occur. This special case is given a separate mnemonic (EXIT) because of its frequent use.

Turning now to the indicators and display registers 48 in FIG. 3*b*, two registers, designated general indicator No. 1 and general indicator No. 2 comprise the general indicators. All general indicators with even SOP codes are in general indicator register No. 1, and all odd SOP codes in general indicator register No. 2. The general indicator registers are set, reset and tested by the general test mini-instructions. Four of the flip-flops in the general indicator register No. 1 are set by conditions in the system, such as by console switches, in addition to being set, reset and tested by the general test instructions. These flip-flops are divide check trap mode (PIG 16), console request (PIG74), display (PIG42), and pre-divide check (PIG72). The general indicators associated with the operator's console are listed in the table below.

The signal LSGI when true specifies register number 1 or even numbered outputs, and when false specifies register number 2 or odd outputs. For example, PIG46 (register No. 1) is selected by the combination RGI4*x*, RGI*x*6, and LSGI–T. The indicator PIG47 (register No. 2) is selected by the combination RGI4*x*, RG*x*6, and LSGI–F. The signal LSIM means set general indicator, and LRIM means reset general indicator. KCP6 is a timing pulse.

The RGI decode circuit in FIG. 3*b* functions to decode the SOP code into meaningful control signals in a manner similar to decode of the group codes by the translators. Two output signals identify each of the various general indicators. The SOP code is applied on lines RM06–10, and this is decoded in a conventional manner to obtain signals RGI1X–7X and RGIX0, X2, X4 and X6 which are used for identifying the general indicators in the general indicator register number 1. For example, general indicator PIG46 is identified by a combination of signals RGI14X and RGIX6. A signal LSGI serves to select either the general indicator register number 1 or number 2 depending upon whether this signal is true or false. This signal is derived from RM11 which is the least significant bit of the SOP code, and when true the register number 1 is selected by the RGI signals as noted just previously, thereby indicating that an even SOP code has been decoded. If the signal LSGI is false, the general indiactor register number 2 is selected, meaning that an odd SOP code has been decoded. For example, indicator

CONSOLE INDICATOR LAMPS

| Indicator | | Signal | Source |
|---|---|---|---|
| I/O Check | | PIG36–T | General Indicator Register 1, bit 14. |
| Divide Check | | PIG30–T | General Indicator Register 1, bit 20. |
| AC Overflow | | OACOF–T | PACOF flip/flop. |
| Transfer Trap Mode | | PIG40–T | General Indicator Register 1, bit 21. |
| Channel Trap Permit | | PIG70–T | General Indicator Register 1, bit 32. |
| Multiple Tag Mode | | PIG60–T | General Indicator Register 1, bit 23. |
| Program Halt | | OHLT–T | IHLT flip/flop. |
| Internal Check | | OERR–T | Memory Parity Errors (MERR–T plus NERR–T). |
| Maint. Enable | | SMAINT | Maintenance Enable Switch. |
| Sense Light 1 | | PIG52–T | General Indicator Register 1, bit 10. |
| Sense Light 2 | | PIG54–T | Genral Indicator Register 1, bit 28. |
| Sense Light 3 | | PIG56–T | General Indicator Register 1, bit 16. |
| Sense Light 4 | | PIG50–T | General Indicator Register 1, bit 22. |
| Displays Bits S, 1–35 | | OD100–35 | Display register, bits 00–35. |
| Display Bit P | | OPBIT–T | P-bit flip/flop. |
| Display Bit Q | | OQBIT–T | Q-bit flip/flop. |
| Tape Check | Channel 1 | PIG44–T | General Indicator Register 1, bit 27. |
| | Channel 2 | PIG46–T | General Indicator Register 1, bit 15. |
| EOT | Channel 1 | OEOTA–T | Secondary Indicator Register 1, SOP 11. |
| | Channel 2 | OEOTB–T | Secondary Indicator Register 2, SOP 11. |
| BOT | Channel 1 | OBOTA–T | Secondary Indicator Register 1, SOP 10. |
| | Channel 2 | OBOTB–T | Secondary Indicator Register 2, SOP 10. |
| EOF | Channel 1 | PIG06–T | General Indicator Register 1, bit 31. |
| | Channel 2 | PIG14–Y | General Indicator Register 1, bit 24. |
| Channel Selected | Channel 1 | OIOPA–T | Secondary Indicator Register 1, SOP 27. |
| | Channel 2 | OIOPB–T | Secondary Indicator Register 2, SOP 27. |
| RD/WR Select | Channel 1 | ODSPA–T | Secondary Indicator Register 1, SOP 26. |
| | Channel 2 | ODSPB–T | Secondary Indicator Register 2, SOP 26. |
| Command Trap Enable | Channel 1 | PIG34–T | General Indicator Register 1, bit 26. |
| | Channel 2 | PIG24–T | General Indicator Register 1, bit 25. |
| Tape Check Trap Enable | Channel 1 | PIG32–T | General Indicator Register 1, bit 08. |
| | Channel 2 | PIG22–T | General Indicator Register 1, bit 07. |
| Tape Not Ready | Channel 1 | HLIT2–T | Channel 1 Hardware (Control). |
| | Channel 2 | BLIT2–T | Channel 2 Hardware (Control). |
| No Write Ring | Channel 1 | HLIT3 | Channel 1 Hardware (Control). |
| | Channel 2 | BLIT3–T | Channel 2 Hardware (Control). |
| Tape Multi-Selected | Channel 1 | HLIT4–T | Channel 1 Hardware (Control). |
| | Channel 2 | BLIT4–T | Channel 2 Hardware (Control). |
| Tape Unit Requested 8 | Channel 1 | OCD8A–T | Channel 1 Hardware (Control). |
| Tape Unit Requested 4 | Channel 1 | OCD4A–T | Channel 1 Hardware (Control). |
| Tape Unit Requested 2 | Channel 1 | OCD2A–T | Channel 1 Hardware (Control). |
| Tape Unit Requested 1 | Channel 1 | OCD1A–T | Channel 1 Hardware (Control). |
| Tape Unit Requested 8 | Channel 2 | OCD8B–T | Channel 2 Hardware (Control). |
| Tape Unit Requested 4 | Channel 2 | OCD4B–T | Channel 2 Hardware (Control). |
| Tape Unit Requested 2 | Channel 2 | OCD2B–T | Channel 2 Hardware (Control). |
| Tape Unit Requested 1 | Channel 2 | OCD1B–T | Channel 2 Hardware (Control). |
| CR Not Ready | Channel 1 | HLIT5–T | Channel 1 Hardware (Control). |
| Typewriter Not Ready | Channel 1 | HLIT6–T | Channel 1 Hardware (Control). |

The SOP code for each indicator may be found under the general test instruction description. The bit number listed above under the heading "SOURCE" in reference to general indicators specifies the bit position of the display register (and hence the display indicators on the operator's console) in which the indicator may be displayed for maintenance purposes.

The set and reset logic for any general indicator PIG*mm* may be expressed as follows:

| | Register No. 1 (even numbered outputs) |
|---|---|
| PIGmn (SET) equal | RGImx·RGIxn·LSGI–T·KCP6·LSIM |
| PIGmn (RESET) equal | RGImx·RGIxn·LSGI–T·KCP6·LRIM |

| | Register No. 2 (odd numbered outputs) |
|---|---|
| PIGmn+1 (SET) equal | RGImx·RGIxn·LSGI–F·KCP6·LSIM |
| PIGmn+1 (RESET) equal | RGImx·RGIxn·LSGI–F·KCP6·LRIM |

PIG47 is selected by the signals RGI4X, RGIX6 and LSGI–F. Several RGI signals are sent to the scheduler, as indicated in FIG. 6, and employed to generate the YSTS signal when the LMIS signal is true. The RGI decode circuit decodes the SOP code of every mini-instruction currently being executed. When combined with other signals which indicate the POP codes, specific operations can be performed. For example, the signal LMIS (indicating a miscellaneous mini-instruction) along with RGI5X and RGIX4 indicate which mini-instruction, in this case "hang present level," is going to be executed (note FIG. 6).

The RSG decode circuit in FIG. 3*b* is used for the secondary indicators, and decodes somewhat in the same manner as the RGI decode circuit. Two RSG signals specify a single secondary indicator in either secondary indicator register number 1 or number 2. The signals on lines RM06–11 which completely specify the SOP code along with a signal LTBTB, which specifies a secondary test mini-instruction, are employed to provide outputs RSGOX–3X and RSGXO–X7 to select a particular secondary indicator. The CHBC flip-flop indicates which of the two secondary indicator registers is involved (i.e., if false register number 1 and if true register number 2). The RSG*xx* signals specify a particular SOP code (as with the RGI*xx* signals), but are only present when a secondary test POP code is being executed.

There are two groups of secondary indicators. One group is in secondary indicator register number 1 and is for I/O channel 1, and the other group is in secondary indicator register number 2 and is for I/O channel 2. There are thirty-two indicators (flip-flops or high-speed storage elements) in each group. These indicators may be tested, set, and reset by the secondary test POP codes. For each SOP code (00–37 octal), there are two indicators, one for channel 1 and the other for channel 2. The status of the CHBC flip-flop determines which indicator register is being operated upon, as noted in the prior description of secondary test POP codes. The indicators whose SOP codes end in 0 or 1 are also set and reset by the channel control (indicator control lines) in FIG. 3*d*. Some of the secondary indicators are connected to console lamps, and these are shown in the table "Console Indicator Lamps" above.

The display register in FIG. 3*b* enables the following information to be displayed on the operator's console display indicator lamps:

(1) The contents of the general indicator register No. 1 (PIG*xx*-even);
(2) The contents of the general indicator register No. 2 PIG*xx*-odd);
(3) The contents of the mini-instruction operation register (MOP00–35);
(4) Data going to Control Memory (MDA00–35); and
(5) Data on the Main Buss (PMB00–35).

The above information is supplied to the console 14 by lines ODI00–35, and may be displayed statically or dynamically. During static operation (maintenance functions) the system clock must be stopped in order to see the display. A selector switch F127 (not shown) is provided on a maintenance panel to enable the above inputs to be gated to the display register. In addition, the selector switch gates data from various sources on to the main buss so that the mini-engine registers, main engine registers, entry keys, etc., may also be displayed.

Dynamic display occurs whenever any one of the following switches on the operator's console is on during normal system operation (see FIGS. 24 and 25): XR1–XR7, Main Storage, AC, MQ, SI, Current Instruction, and IC. Any time the data corresponding to the switch which is "on" appears on the main buss, a signal KPMB is generated which gates the data into the display register. If the program being emulated is halted, the data corresponding to one of the operator's console switches may be displayed by pressing an Execute Display switch on the operator's console. This action generates control signals which gate the specified data (except the current instruction being emulated) onto the main buss and into the display register.

Turning now to the operator's console and display 14, the console display unit is illustrated in FIG. 24. The function of the keys, switches, and lamps on the console will be explained in groups beginning in the upper right-hand portion of a display unit and proceeding generally from right to left. The console functions are similar, if not identical, to those of a well-known second generation computer.

All indicators are neon lamps. When a lamp on the console is illuminated, it indicates the program or equipment condition specified in the legend above or below the lamp. When a register is displayed, a lamp being ON signifies a "one," while a lamp being OFF signifies a "zero." Generally, a switch is ON or indicates a "one" when it is down, and is OFF or indicates a "zero" when up.

In the discussion to follow, the paragraph numbers relate to the groups of switches and indicators shown in FIG. 24. FIG. 25 is a schematic diagram of the console switches which are shown in an off position. The output signals of these switches are buffered and shaped. The labels for the switch signals being with an "S," and after being buffered and shaped the same signal notation is used, but beginning with the letter "T" rather than "S."

(1) *Power*.—This group consists of two switches and one indicator located within a border (red) in the upper right hand corner of the console.

(a) POWER ON Indicator (yellow). This lamp turns on during the final step of the power-on sequence and remains on as long as the system is energized. It turns off during the first step of the power-off sequence.

(b) POWER ON/OFF Switch. The power-on sequence will be initiated when this switch is turned on. Assuming the system is already on, turning this switch off initiates a normal power-off sequence.

(c) EMERGENCY OFF Button (red). All power is immediately removed from the system when the EMERGENCY OFF button is pressed.

(2) *Machine and Program Status*.—This group (see FIGS. 24 and 25) consists of two rows of switches and indicators located to the left of the power group. The bottom row is enclosed in a border (red).

(a) I/O CHECK Indicator (yellow). This indicator is turned on by general indicator signal PIG36–T.

(b) DIVIDE CHECK Indicator (yellow). This indicator is turned on by general indicator signal PIG30–T.

(c) AC OVERFLOW Indicator (yellow). This indicator is turned on by signal OACOF–T.

(d) TRANSFER TRAP MODE Indicator (yellow). This indicator is turned on by general indicator PIG40–T.

(e) CHANNEL TRAP PERMIT Indicator (yellow). This indicator is turned on by general indicator signal PIG70–T.

(f) MULTIPLE TAG MODE Indicator (yellow). This indicator is turned on by general indicator signal PIG60–T.

(g) EXECUTE ENTRY Key. Pressing this key causes information in the ENTRY KEYS to be loaded into one of the index registers, the AC, MQ, IC, or SI (sense indicator) registers, or into the main storage depending on which of these switches in the "Register Selection for Entry or Display" group is on. The EXECUTIVE ENTRY key may also be used to cause immediate execution of an instruction. Pressing this key generates the console interrupt signal TENTR. The above functions are performed by a group of mini-instruction routines when this interrupt is recognized by the scheduler.

(h) PROGRAM HALT Indicator (red). This lamp turns on when the computer emulates a halt instruction.

(i) MANUAL OR ADDRESS STOP Indicator (red). This indicator illuminates when the computer is placed in manual mode or stops because an address stop condition is encountered. (See "Address Stop Control").

(j) INTERNAL CHECK Indicator (red). This lamp turns on when a memory parity error has been detected.

(k) MAINT. ENABLE Indicator (red). This lamp turns on when the Field Engineering Maintenance Panel is enabled.

(l) CLEAR STORAGE Key. This key generates the signal TCLR (console request).

(3) *Address Keys.*—These switches, located just below center on the right side of the console are used in conjunction with the "Register Selection For Entry or Display" switches and the EXECUTE ENTRY key to alter and display memory. Under dynamic operating conditions the address keys may be used by mini-instructions such as the LAK and MEM POP codes.

(4) *Controls Keys and Switches.*—This group of keys and switches is located on the bottom row on the right side of the console.

(a) START Key. When pressed this key generates the signal TTART–T which starts the system clock (if the clock is stopped), sets the scheduler program request flip-flop if the Program Start Inhibit switch (maintenance panel) is not on.

(b) AUTO/MANUAL Switch. In the manual position this switch generates the signal TMAN–T which resets the scheduler program request flip-flop, if the scheduler is in level 4.

(c) RESET Key. This key generates the signal SPRES (console request).

(d) LOAD CARD Key. This key generates the signal TLDC (console request).

(e) LOAD TAPE A1 Key. This key generates the signal TLDT (console request).

(f) CARD EOF Key. When all the cards of a deck have been read by the card reader, the operator must press this key to indicate that no more cards are to be loaded. A card EOF (end-of-file) is not generated automatically after the last card is read.

(g) STORAGE CLOCK OFF Switch. When this switch is up, the storage clock (interval timer) in memory location 5 will be updated by an emulator routine every 1/60 of a second. When down (off) the storage clock will not be updated. When off, this switch inhibits the timing circuitry which generates the console interrupt TKIT.

(5) *Sense Lights and Switches.*—This group is enclosed in a border (white) located on the bottom two rows and to the left of the address keys.

(a) SENSE LIGHTS (yellow). The four sense lights are turned on by the signals PIG52–T, PIG54–T, PIG56–T and PIG50–T from the general indicators.

(b) SENSE SWITCHES. The six sense switches may be set by the operator and tested by a general test POP code with a zero SOP code.

(6) *Entry Keys.*—There are thirty-six entry keys (switches) on the console which correspond to bit positions S, 1–35 of a register or a word in storage. Depressing a key sets a "one" in that position; leaving a key normal (up) puts a "zero" in that position. These switches generate the signals TEK00–TEK35.

(7) *Display Indicators.*—The display indicators, located immediately below the entry keys, consist of thirty-eight lamps corresponding to bit positions, S, Q, P, 1–35 of a register or a word in storage. Information may be displayed either dynamically or statically (Automatic Mode or Manual Mode). These indicators are turned on by the signals ODI00–ODI35. OPBIT–T, and OQBIT–T.

(8) *Register Selection For Entry Or Display.*—This group consists of thirteen switches and one key located within a border (blue) to the left of the sense lights and switches. The switches are used to select the particular register or memory location to be loaded with information from the entry keys or displayed on the display indicators.

(a) XR1–XR7 Switches. When one of these switches is down, the contents of the specified index register (FIG. 3*e*) may be displayed or altered by means of the entry keys. Only bits 21 through 35 are meaningful.

(b) MAIN STORAGE Switch. When this switch is down, the core location specified by the address in the ADDRESS KEYS may be displayed or altered.

(c) AC, MQ, SI Switches. When one of these switches is down the contents of the specified register (FIG. 3*e*) may be displayed or altered.

(d) IC Switch. When this switch is down, the contents of instruction counter (IC) may be displayed or altered. Only bits 21 through 35 are meaningful.

(e) CURRENT INSTRUCTION Switch. This switch is used to execute an instruction from the ENTRY KEYS or to display the current instruction being executed. Hence the current instruction cannot be displayed in manual mode unless executed from the console.

(f) EXECUTE DISPLAY Key. In the manual mode, pressing this key will cause the contents of a register or core storage location to be displayed (depending on which of the above switches is on). The EXECUTE DISPLAY key has no effect when the CURRENT INSTRUCTION switch is on.

(9) *Address Stop Control.*—This group of four switches is used to cause the computer to stop when the core memory location specified by the ADDRESS KEYS is accessed. When the computer stops, the MANUAL OR ADDRESS STOP indicator will illuminate. At least one switch on the top row and one switch on the bottom row must be on before any action will take place.

(1) To stop the computer when data is read from a certain memory location.
- (a) Set desired memory address in ADDRESS KEYS.
- (b) Turn on STOP ON READ CYCLE Switch.
- (c) Turn on STOP ON DATA Switch.

(2) To stop the computer when an instruction is executed from a certain memory location.
- (a) Set desired memory address in ADDRESS KEYS
- (b) Turn on STOP ON READ CYCLE Switch.
- (c) Turn on STOP ON INSTRUCTION Switch.

(3) To stop the computer when information is written into a certain memory location.
- (a) Set desired memory address in ADDRESS KEYS.
- (b) Turn on STOP ON WRITE CYCLE Switch.
- (c) Turn on STOP ON DATA Switch.

(4) To stop the computer when data is read from or written into a certain memory location.
- (a) Set desired memory address in ADDRESS KEYS.
- (b) Turn on STOP ON READ CYCLE Switch.
- (c) Turn on STOP ON WRITE CYCLE Switch.
- (d) Turn on STOP ON DATA Switch.

(5) To stop the computer when data is read or an instruction is executed from a certain memory location.
- (a) Set desired memory address in ADDRESS KEYS.
- (b) Turn on STOP ON READ CYCLE Switch.
- (c) Turn on STOP ON DATA Switch.
- (d) Turn on STOP ON INSTRUCTION switch.

(6) To stop the computer when a certain memory location is accessed for any reason.
- (a) Set desired memory address in ADDRESS KEYS.
- (b) Turn on all four Address Stop Control Switches.

(10) *Input/Output Channels.*—The group of indicators and switches for the input/output channels is located within a border (green) at the upper left of the console. There are two rows of identical switches and indicators, the top row being for channel 1 and the bottom row for channel 2.

(a) TAPE WORD INCOMPLETE Switch. When this switch is on, the INTERNAL CHECK indicator will illuminate if the last word appearing on a magnetic tape record is an incomplete binary word (that is, a word containing less than six 6-bit characters).

(b) TAPE CHECK Indicator (yellow). This lamp will be turned on by the signal PIG44–T (channel 1) and PIG46–T (channel 2).

(c) EOT Indicator (yellow). When the end-of-tape marker has been detected on the selected tape drive on channel 1, a secondary indicator will be set which generates the signal OEOTA–T which turns on the lamp. When a similar situation occurs on channel 2, a secondary indicator will be set which generates OEOTB–T which turns on the channel 2 EOT lamp.

(d) BOT Indicator (yellow). When the beginning-of-tape marker has been detected on the selected tape drive on channel 1, a secondary indicator will be set which generates the signal OBOTA–T which turns on the lamp. When a similar situation occurs on channel 2, a secondary indicator generates OBOTB–T which turns on the channel 2 BOT lamp.

(e) EOF Indicator (yellow). This indicator is turned on by the signal PIG06–T (channel 1) and PIG14–T (channel 2).

(f) CHANNEL SELECTED Indicator (yellow). This lamp is turned on by the secondary indicator signal OIOPA–T (channel 1) and OIOPB–T (channel 2).

(g) RD/WR SELECT Indicator (yellow). This indicator is turned on by the secondary indicator signal ODSPA–T (channel 1) and ODSPB–T (channel 2).

(h) COMMAND TRAP ENABLE Indicator (yellow). This lamp is turned on by the general indicator signal PIG34–T (channel 1) and PIG24–T (channel 2).

(i) TAPE CHECK TRAP ENABLE Indicator (yellow). This lamp is turned on by the general indicator signal PIG32–T (channel 1) and PIG22–T (channel 2).

(j) TAPE NOT READY Indicator (red). When illuminated, this lamp indicates the selected tape drive is not ready (tape not loaded, loss of vacuum, in local mode of operation, etc.). It is turned on by channel hardware (channel control).

(k) NO WRITE RING Indicator (red). This lamp illuminates when a write tape operation is attempted and the selected tape drive has its write ring removed. It is turned on by channel control.

(l) TAPE MULTI-SELECTED INDICATOR (red). This lamp illuminates if more than one tape drive is online and set to the same address. It is turned on by channel control.

(m) TAPE UNIT REQUESTED Indicators (yellow). This group of four lamps indicates the binary address of the tape unit selected. These lamps remain on after the tape operation is completed and are not changed until a different tape unit on the same channel is selected. They are turned on by channel control.

(n) CR NOT READY Indicator (red). This lamp illuminates when the card reader is not ready (no cards in the input hopper, card failing to register, etc.). It is turned by channel control.

(o) TYPEWR NOT READY Indicator (red). This lamp illuminates when the typewriter is not ready (power off, etc.). It is turned on by channel control.

It is desired to emulate the operator's environment as well as the specific arithmetic, logic, etc., functions of the machine being emulated. As is known, the environment includes displaying certain registers, memory locations, and so forth in a dynamic fashion (i.e., while the machine is executing a program) or in a static fashion (i.e., wherein a program to be emulated is loaded but not being executed). In the latter case, the operator may desire to observe information about the program, such as the contents of registers, memory locations, flags, and so forth, which may have been set as a result of some prior execution of the program. This is principally for debugging purposes. Additionally, certain switches which perform various start-up procedures and which may control various options in a program which is being emulated are provided to select certain registers to be displayed at any particular time. Other switches may perform certain hardware functions, such as clear storage, or resetting of certain registers or indicators. In order to emulate this environment in a flexible and changeable manner, the various indicators and switches are not directly connected to the hardware components involved. Instead, they are connected to indicator registers or flip-flops which may be tested, set and reset by mini-instructions. The function to be performed, which is normally performed by a direct connection to hardware in present-day computers, is performed by an emulator program. The apparent function of a switch or indicator as far as the operator is concerned is identical to that of the machine being emulated. However, the assigned function of a particular switch or indicator may be changed when emulating a different computer by simply changing the emulator routine which test, sets and resets the switches and indicators. Certain switches on the console, namely the clear, reset, load card, load tape, enter and display switches causes a signal ISCRQ to be generated when any one of these switches is operated. This signal ISCRQ is sent to the scheduler and denotes a console request. When the scheduler determines that this request is of the highest priority available, it will start the wired-in-sequence with control ultimately being passed to an emulator routine to service the console request. Reference should be made to the previous discussion of the wired-in-sequence, state YB. In state YBO, the mini-address of the entry word for a console request is generated. At state YB5 the RB register contains the mini-address of the first mini-instruction to be executed. This mini-instruction will be the first instruction of the console request servicing routine. A test is made to determine if any indicators are on, and if so a transfer is made to a console routine which is followed by another instruction which directs the console interrupts to be loaded into the PB register. Bits representing which switches are on are then examined to detect a particular switch, and then a branch is made to a routine to emulate the function of this switch. For example, a key on the console may be labelled "clear," and the function of this switch may be to zero the contents of all core storage locations and arithmetic and working registers of the computer being emulated. The emulator routine to perform this operation will include several instructions which first generate a zero and then store the zero in these memory locations and registers. Then, an exit will be generated which returns control to the scheduler. When emulating the environment of a different computer it may be desired to assign a different function to the clear swtich. This is easily accomplished by simply changing the routine which caused zeros to be stored in the memory locations and registers, and substitute therefore appropriate mini-instructions which perform the newly assigned function of this switch.

The logical construction of the main buss 50 is illustrated in greater detail in FIGS. 26*a* and 26*b*. Although the buss is constructed of conevntional logical circuitry, further details of the buss are illustrated to ensure that the operation thereof, particularly the half-exchange feature, is abundantly clear. The buss control decode circuit receives signals LMBCO–3 which are decoded to provide control signals (identified on the vertical lines 01–17 in FIG. 26*a*) to gate the appropriate information from the input lines (horizontal inputs) to output lines PMB00–18. FIG. 26*a* illustrates in detail the gating logic for the first bits (00 and 18) of the various input signals. Similar logic is provided for the remaining signals (01–17 and 19–25) as illustrated in FIG. 26*b*. The lines LMBC, as will be apparent, control the half-exchange operation. Note FIG. 26*a* wherein a first bit (e.g., MBI00) may be gated as PMB00 if signal LMBC is false, or gated as PMB18 if signal LMBC is true. The chart below lists the control lines (line 00 is not shown in FIG. 26), input signal lines and corresponding output signal lines (without half-exchange).

MAIN BUSS INPUTS

| 00 | 01 | 02 | 03 | 04 | 05 | 07 | 10 | 11 | 12 | 15 | 17 | |
|---|---|---|---|---|---|---|---|---|---|---|---|---|
| Zeros | Memory | Main eng. | Broadcast | Index reg. | Mini-eng. | Translator | Mini-eng. offset | Interrupt | Channel | Address Keys | Entry Keys | Main buss outputs |
| ---------- | MBI00 | PE00 | RBR00 | ---------- | ---------- | ---------- | ---------- | INT00 | HCH00 | ---------- | TEK00 | PMB00 |
| ---------- | MBI01 | PB01 | RBR01 | ---------- | ---------- | ---------- | ---------- | INT01 | HCH01 | ---------- | TEK01 | PMB01 |
| ---------- | MBI02 | PE01 | RBR02 | ---------- | ---------- | ---------- | ---------- | INT02 | KCH02 | ---------- | TEK02 | PMB02 |
| ---------- | MBI03 | PE03 | RBR03 | ---------- | ---------- | ---------- | ---------- | INT03 | HCH03 | ---------- | TEK03 | PMB03 |
| ---------- | MBI04 | PE04 | RBR04 | ---------- | ---------- | ---------- | ---------- | INT04 | HCH04 | ---------- | TEK04 | PMB04 |
| ---------- | MBI05 | PE05 | RBR05 | ---------- | ---------- | ---------- | ---------- | INT05 | HCH05 | ---------- | TEK05 | PMB05 |
| ---------- | MBI06 | PE06 | RBR06 | ---------- | ---------- | ---------- | ---------- | INT06 | HCH06 | ---------- | TEK06 | PMB06 |
| ---------- | MBI07 | PE07 | RBR07 | ---------- | ---------- | ---------- | ---------- | INT07 | HCH07 | ---------- | TEK07 | PMB07 |
| ---------- | MBI08 | PE08 | RBR08 | ---------- | ---------- | ---------- | ---------- | INT08 | HCH08 | ---------- | TEK08 | PMB08 |
| ---------- | MBI09 | PE09 | RBR09 | ---------- | ---------- | ---------- | ---------- | INT09 | HCH09 | ---------- | TEK09 | PMB09 |
| ---------- | MBI10 | PE10 | RBR10 | ---------- | ---------- | ---------- | ---------- | INT10 | HCH10 | ---------- | TEK10 | PMB10 |
| ---------- | MBI11 | PE11 | RBR11 | ---------- | ---------- | ---------- | ---------- | INT11 | HCH11 | ---------- | TEK11 | PMB11 |
| ---------- | MBI12 | PE12 | RBR12 | ---------- | ---------- | ---------- | ---------- | INT12 | HCH12 | ---------- | TEK12 | PMB12 |
| ---------- | MBI13 | PE13 | RBR13 | ---------- | ---------- | ---------- | ---------- | INT13 | HCH13 | ---------- | TEK13 | PMB13 |
| ---------- | MBI14 | PE14 | RBR14 | ---------- | ---------- | ---------- | ---------- | INT14 | HCH14 | ---------- | TEK14 | PMB14 |
| ---------- | MBI15 | PE15 | RBR15 | ---------- | ---------- | ---------- | ---------- | INT15 | HCH15 | ---------- | TEK15 | PMB15 |
| ---------- | MBI16 | PE16 | RBR16 | ---------- | ---------- | ---------- | ---------- | INT16 | HCH16 | ---------- | TEK16 | PMB16 |
| ---------- | MBI17 | PE17 | RBR17 | ---------- | ---------- | ---------- | ---------- | INT17 | HCH17 | ---------- | TEK17 | PMB17 |
| ---------- | MBI18 | PE18 | RBR18 | ---------- | RE18 | PTR18 | ---------- | INT18 | HCH18 | ---------- | TEK18 | PMB18 |
| ---------- | MBI19 | PE19 | RBR19 | ---------- | RE19 | RTR19 | ---------- | INT19 | HCH19 | ---------- | TEK19 | PMB19 |
| ---------- | MBI20 | PE20 | RBR20 | ---------- | RE20 | RTR20 | ---------- | INT20 | HCH20 | ---------- | TEK20 | PMB20 |
| ---------- | MBI21 | PE21 | RBR21 | PXR21 | RE21 | RTR21 | ---------- | INT21 | HCH21 | TAK21 | TEK21 | PMB21 |
| ---------- | MBI22 | PE22 | RBR22 | PXR22 | RE22 | RTR22 | ---------- | INT22 | HCH22 | TAK22 | TEK22 | PMB22 |
| ---------- | MBI23 | PE23 | RBR23 | PXR23 | RE23 | RTR23 | ---------- | INT23 | HCH23 | TAK23 | TEK23 | PMB23 |
| ---------- | MBI24 | PE24 | RBR24 | PXR24 | RE24 | RTR24 | ---------- | INT24 | HCH24 | TAK24 | TEK24 | PMB24 |
| ---------- | MBI25 | PE25 | RBR25 | PXR25 | RE00 | RTR25 | ---------- | INT25 | HCH25 | TAK25 | TEK25 | PMB25 |
| ---------- | MBI26 | PE26 | RBR26 | PXR26 | RE01 | RTR26 | RE00 | INT26 | HCH26 | TAK26 | TEK26 | PMB26 |
| ---------- | MBI27 | PE27 | RBR27 | PXR27 | RE02 | RTR27 | RE01 | INT27 | HCH27 | TAK27 | TEK27 | PMB79 |
| ---------- | MBI28 | PE28 | RBR28 | PXR28 | RE03 | RTR28 | RE02 | INT28 | HCH28 | TAK28 | TEK28 | PMB28 |
| ---------- | MBI29 | PE29 | RBR29 | PXR29 | RE04 | RTR29 | RE03 | INT29 | HCH29 | TAK29 | TEK29 | PMB29 |
| ---------- | MBI30 | PE30 | RBR30 | PXR30 | RE05 | RTR30 | RE04 | INT30 | HCH30 | TAK30 | TEK30 | PMB30 |
| ---------- | MBI31 | PE31 | RBR31 | PXR31 | RE06 | RTR31 | RE05 | INT31 | HCH31 | TAK31 | TEK31 | PMB31 |
| ---------- | MBI32 | PE32 | RBR32 | PXR32 | RE07 | RTR32 | RE06 | INT32 | HCH32 | TAK32 | TEK32 | PMB32 |
| ---------- | MBI33 | PE33 | RBR33 | PXR33 | RE08 | RTR33 | RE07 | INT33 | HCH33 | TAK33 | TEK33 | PMB33 |
| ---------- | MBI34 | PE34 | RBR34 | PXR34 | RE09 | RTR34 | RE08 | INT34 | HCH34 | TAK34 | TEK34 | PMB34 |
| ---------- | MBI35 | PE35 | RBR35 | PXR35 | RE10 | RTR35 | RE09 | INT35 | HCH35 | TAK35 | TEK35 | PMB35 |

The present embodiment of this invention is to be considered in all respects as illustrative and not restrictive, the scope of the invention being indicated by the appended claims rather than by the foregoing description and all changes which come within the meaning and range of equivalency of the claims therefore are intended to be embraced therein.

What is claimed is:

1. A digital data processor including an outer and inner computer for emulating the operation of another computer system by emulating a group of multiple machine instructions thereof through use of a single emulator routine comprising main memory means in the outer computer for storing said group of multiple machine instructions, said instructions having predetermined common characteristics and at least one uncommon characteristic, means for controlling the fetch of said instructions from said main memory means and for generating signals indicative of the uncommon characteristics of said instructions, translator means and control storage elements, said translator means receiving said signals and causing said signals to be stored in a predetermined combination of one or more of said control storage elements, and control memory means in the inner computer for storing said emulator routine, and means for controlling predetermined operations of said processor as a function of the information stored in said control storage elements in combination with operations directed by said emulator routine.

2. A digital data processor for emulating the operation of a computer system through the use of the instruction repertoire thereof, said data processor having a main memory, arithmetic unit, storage registers, console, and input/output devices, and including an inner computer comprising scheduler means for receiving requests from said input/output devices and said console and for generating control signals to commence a starting sequence, control memory means for storing emulator routines including mini-instructions, sequence means responsive to said scheduler means for sequencing through states of operation to fetch mini-instructions from said control memory means, subroutine control means responsive to a predetermined mini-instruction in a first emulator routine, and means responsive to said subroutine means and a condition of a mini-instruction in said first emulator routine for causing another emulator routine to be fetched and performed, at the end of which said scheduler means initiates control signals to said sequence means which in turn causes continued execution of said first emulator routine.

3. In a digital data processor having an outer and inner computer for emulating the operation of computer systems, means for emulating the operational environment thereof comprising console and display means in said outer computer including switch means which may be positioned by an operator for controlling operations of said processor and including indicia means for indicating to an operator operational conditions of functional units of said processor, first register means coupled with said switch means and indicia means for respectively receiving signals therefrom and supplying signals thereto, second register means coupled with operational units of said processor for storing the existence of operational conditions of said functional units, and control memory means in said inner computer for storing an emulator program of the inner computer for controlling the inneraction between said first and second register means and for causing setting of the operational function of said switch means and said indicia means to simulate switches and indicators of the computer system being emulated.

4. A digital data processor for emulating the operation of conventional computer systems through the use of the instruction repertoire thereof, said data processor including an outer computer and an inner computer comprising said outer computer including main storage means for storing instructions of another computer and for communicating with said inner computer, said outer computer including input/output means for receiving and supplying data from and to said inner computer, console means for enabling control of said data processor and for displaying information therein and operational states thereof, said inner computer means including control means, engine means, control memory means and register means, said inner computer including control memory means for storing emulator routines which are utilized by said inner computer in performing operations as directed by said instruction repertoire of another computer, said inner computer including control means comprising a scheduler for receiving requests from said input/output means, and said console means and main memory means, and comprising sequence means to which operational control is passed by said scheduler for automatically performing operations of said inner computer in fetching an instruction to be emulated from said main storage means and directing emulator operations to be performed by an emulator routine stored in said control memory means, said inner computer including engine means for determining addresses of emulator instructions in said emulator routine and for performing arithmetic, logic and shift operations, and said inner computer including register means for receiving said addresses of emulator instructions in said emulator routine and for supplying signals to cause operations required by said emulator instructions.

5. A digital data processor including an outer and inner computer for emulating the operation of conventional computer systems through the use of the instruction repertoire thereof, main memory means in said outer computer for storing said instruction repertoire, control memory means in said inner computer for storing an emulator routine, sequencer means in said inner computer for fetching an instruction to be emulated from said main memory means and generating an address of an instruction in said control memory means, register and gate means for storing said instruction from said control memory means and for generating groups of data representative of a portion of said instruction, and engine means having register means for receiving said groups of data from said register and gate means, said engine means including zone means for preventing selected portions of said data from entering said register means thereof.

6. A method of emulating the operation of a plurality of computer systems through the use of an outer and inner computer and the respective instruction repertoires of said systems, comprising the steps of storing in a main memory of an outer computer instructions of an instruction repertoire including a series of subject instructions of one computer system, storing in a control memory of an inner computer an emulator routine comprising a plurality of mini-instructions for interpreting the subject instructions of said one system to enable emulation of said one system, and storing in said control memory an entry table defining addresses of said mini-instructions, sequentially examining subject instructions, checking operation codes thereof for generating respective addresses pointing to respective words in said entry table, and selecting predetermined mini-instructions from said emulator routine in said control memory at respective addresses defined by said words to determine operations to be performed in emulating said one system, and performing the indicated operations, and repeating the foregoing steps for another computer system for emulating the operation thereof through the use of the instruction repertoire thereof and another emulator routine.

7. A digital data processor for emulating the operation of a computer system by means of emulator routines which interpret the instruction repertoire of said system, comprising outer computer means for performing operations similar to those of said computer system, said outer computer means including data input/output means and main memory means communicating therewith, said main memory means having stored therein instructions from said instruction repertoire including a sequence of subject instructions, said outer computer means including a processor, inner computer means communicating with said outer computer means, said inner computer means including control memory means having stored therein emulator routines for interpreting said subject instructions main memory means, the data input/output means, main memory means and processor of said outer computer means being coupled with and controlled by said inner computer means as a function of said emulator routines, and said inner computer means having sequence means for fetching said subject instructions from said main memory means and performing indexing and addressing operations thereon, and having means for decoding said subject instructions and addressing said control memory means to commence an emulator routine for directing said inner computer means through a series of steps to execute the subject instructions.

8. A digital data processor for emulating the operation of a computer system by means of emulator routines which interpret subject instructions of an instruction repertoire of said system, comprising outer computer means for performing operations like those of the computer system being emulated, said outer computer means including intercommunicating main memory means, storage registers, input/output means, and an arithmetic unit, said main memory means functioning to receive an instruction repertoire for said system, inner computer means communicating with said outer computer means, said inner computer means including control memory means for receiving and storing emulator routines for interpreting said subject instructions from an instruction repertoire stored in said main memory means, said inner computer means including scheduler means for servicing requests from said input/output means, said inner computer means including hardwired sequence means for automatically performing predetermined subroutines and sequences upon command by said scheduler means, said inner computer means including translator means for decoding subject instructions and for determining the starting address of emulator routines necessary to complete the emulation of said subject instructions, and mini-register means for receiving instructions from said emulator routine and providing control signals for operation of said processor.

9. A data processor as in claim 8 including console means coupled with said inner and outer computer means, said inner computer means including display register means for controlling the function of displays and controls of said console means, said display register means communicating with said mini-register means for storing in said display register means information selected by said emulator routines.

10. A data processor as in claim 8 wherein said control memory means is a read/write memory for allowing new emulator routines to be stored therein for interpreting instructions from the instruction repertoire of other computer systems.

11. A data processor as in claim 8 wherein said translator means includes storage element means which are settable to store predetermined information about code characteristics of subject instructions.

12. A digital data processor for emulating the operation of a computer system by means of emulator routines which interpret the instruction repertoire of said system, comprising outer computer means for performing operations like those of the computer system being emulated, said outer computer means including an intercommunicating main memory means, storage registers, input/output means and an arithmetic unit, said main memory means functioning to receive an instruction repertoire, including a series of subject instructions, for said system supplied by said input/output means said storage registers having assignable functions to duplicate those available in the computer system being emulated, console means for controlling the operation of said data processor, said console means having indicators and control switches, inner computer means communicating with said outer computer means and said console means, said inner computer means including control memory means for storing (a) emulator routines including mini-instructions for emulating the instruction repertoire of said system and for controlling the operation of said input/output means, and (b) an entry table which defines emulator routine addresses for performing said subject instructions, said inner computer means including scheduler means which responds to requests of said input/output means, said console and mini-instructions, sequencing means including plural hardwired logic means for performing subroutines each having steps of operation, one subroutine having steps for controlling access of said main memory means and said control memory means and another subroutine having steps for saving and restoring the contents of registers in said data processor, said sequence means and said scheduler intercommunicating to cause said scheduler means to pass operational control to predetermined steps of said subroutines of said sequence means to thereby cause said sequence means to sequence automatically through predetermined steps of a subroutine, said inner computer means including translator means for receiving subject instructions from said main memory means and decoding said subject instructions and addressing a word in said entry table in said control memory means, said word addressed in said entry table establishing the sequence of operation of said sequence means and providing a starting address in said control memory means of an emulator routine necessary to complete the emulation of said subject instruction, and mini-register means for receiving mini-instructions from said control memory means and decoding such mini-instructions and providing control signals for directing the operation of said data processor.

13. A data processor as in claim 12 wherein said entry table of said control memory means defines both emulator routine addresses and the sequences and steps of said sequences to be performed by said sequence means for said subject instructions.

14. A data processor as in claim 13 wherein said sequence means includes a plurality of storage elements, said storage elements being settable in predetermined combinations to select the steps of said subroutines of said sequence means to be performed in the emulation of a subject instruction.

15. A data processor as in claim 12 wherein said translator means includes a plurality of storage elements which are settable in response to certain predetermined characteristics of subject instructions, said storage elements being sensable to enable the emulation of subject instructions of a predetermined group of subject instructions without requiring emulation of each such subject instruction of said group.

16. A data processor as in claim 12 including mini-engine means for performing emulator routine sequence and shift counting.

17. A data processor as in claim 12 including indicator and display register means coupled between said inner computer means and said console means for storing states of operation of said sequence means and status of emulator routines, said indicator and display register means being settable and resettable by mini-instructions of an emulator routine for enabling an emulator routine to control the function of the indicators and control switches of said console means.

18. A method of emulating the operation of a computer system through the use of an outer and inner computer, and the environment of the computer system by simulating the console thereof with a console of the outer computer, by interpreting an instruction repertoire for the computer system, comprising the steps of storing instructions of an instruction repertoire of a computer system in a main memory of an outer computer, storing an emulator routine in a control memory of an inner computer, and performing indexing and addressing operations thereon, decoding respective instructions and initiating an emulator routine in said control memory, executing instructions within said emulator routine for performing operations indicated by instructions fetched from said main memory, and controlling the function of console indicators and control switches of the outer computer to simulate the console functions of said computer system.

19. A method of emulating the operation of a computer system through the operations of a data processor including an outer and inner computer by interpreting an instruction repertoire for the computer system through the use of an emulator routine, comprising the steps of (a) storing instructions of said instruction repertoire of a computer system in a main memory of an outer computer, said instruction repertoire including subject instructions, (b) storing an emulator routine in a control memory of an inner computer, said emulator routine having mini-instructions, and storing an entry table in said control memory defining addresses of said mini-instructions in said emulator routine, (c) receiving and honoring by said inner computer a request from a functional station of the outer computer of said processor, (d) fetching subject instructions from said main memory, (e) sensing an operation code of each subject instruction and generating an address pointing to a word in said entry table, each such word addressing a mini-instruction and defining a starting address for completing a subject instruction interpretation, (f) executing a plurality of said mini-instructions in said inner computer, and (g) honoring another request for operation and repeating steps (d) through (f) until a predetermined number of subject instructions have been interpreted.

20. A method as in claim 19 wherein at least one mini-instruction defined by said word from said entry table is a subroutine instruction, and mini-instructions preceding said subroutine instruction are executed according to step (f) until said subroutine instruction is reached, then the mini-instructions of another emulation routine are executed, followed by execution of the remaining mini-instructions in said emulator routine having said subroutine instruction.

21. A method as in claim 19 wherein said step (e) of sensing an operation code includes sensing of uncommon portions of a group of plural subject instructions which are otherwise common to allow such group of subject instructions to be emulated without determining all the characteristics of the instructions in said group of instructions.

References Cited

UNITED STATES PATENTS

| | | | |
|---|---|---|---|
| 3,400,371 | 9/1968 | Amdahl | 340—172.5 |
| 3,374,466 | 3/1968 | Hanf et al. | 340—172.5 |
| 3,315,235 | 4/1967 | Carnevale et al. | 340—172.5 |
| 3,364,473 | 1/1968 | Reitz et al. | 340—172.5 |
| 3,346,851 | 10/1967 | Thornton et al. | 340—172.5 |
| 3,325,788 | 6/1967 | Hackl | 340—172.5 |
| 3,323,110 | 5/1967 | Oliari et al. | 340—172.5 |
| Re26,171 | 3/1967 | Falkoff | 340—172.5 |

GARETH D. SHAW, Primary Examiner